US008436598B2

(12) United States Patent
Miyamae

(10) Patent No.: US 8,436,598 B2
(45) Date of Patent: May 7, 2013

(54) OUTPUT-VOLTAGE CONTROL DEVICE, OUTPUT-VOLTAGE CONTROL METHOD, AND ELECTRONIC APPARATUS

(75) Inventor: Toru Miyamae, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 787 days.

(21) Appl. No.: 12/568,245

(22) Filed: Sep. 28, 2009

(65) Prior Publication Data

US 2010/0079123 A1    Apr. 1, 2010

(30) Foreign Application Priority Data

Sep. 30, 2008  (JP) .................................. 2008-253179
Feb. 18, 2009  (JP) .................................. 2009-035443

(51) Int. Cl.
*G05F 1/40*           (2006.01)
(52) U.S. Cl.
USPC .......................................... 323/282; 323/271
(58) Field of Classification Search .................. 323/222, 323/225, 268, 271, 282, 285, 288, 299, 303
See application file for complete search history.

(56) References Cited

U.S. PATENT DOCUMENTS

| | | | |
|---|---|---|---|
| 5,705,919 A | | 1/1998 | Wilcox |
| 6,246,220 B1 * | | 6/2001 | Isham et al. .................. 323/224 |
| 6,492,794 B2 * | | 12/2002 | Hwang .......................... 323/285 |
| 7,400,127 B2 * | | 7/2008 | Steele ............................ 323/288 |
| 7,508,181 B2 * | | 3/2009 | Chen et al. ..................... 323/282 |
| 7,592,792 B2 * | | 9/2009 | Ryu et al. ....................... 323/284 |
| 7,839,126 B2 * | | 11/2010 | Lee ................................ 323/222 |

FOREIGN PATENT DOCUMENTS

| | | |
|---|---|---|
| CN | 1286520 A | 3/2001 |
| JP | 2003-219638 A | 7/2003 |

OTHER PUBLICATIONS

Chinese Office Action issued Dec. 13, 2012, in counterpart Chinese Patent Application No. 200910173587.5 (14 pages including English Translation).
Notification of Reasons for Refusal issued Mar. 26, 2013, in counterpar Japanese Patent Application No. 2009-035443 (7 pages including English Abstract).

\* cited by examiner

*Primary Examiner* — Matthew Nguyen
(74) *Attorney, Agent, or Firm* — Arent Fox LLP

(57) ABSTRACT

An output-voltage control device includes a comparator which generates a comparison result after a given time passes from first timing of a first periodic signal, the comparison result being obtained by comparing a difference between an output voltage and a reference voltage with the first periodic signal, a first signal generator which generates a timing control signal which is at a first level before the given time passes from the first timing and which changes from the first level to a second level in a period in which the comparator outputs the comparison result after the given time passes, and a second signal generator which generates a control signal for controlling the output voltage in accordance with the comparison result and the timing control signal.

20 Claims, 48 Drawing Sheets

220

120

OUTPUT-VOLTAGE CONTROL DEVICE, OUTPUT-VOLTAGE CONTROL METHOD, AND ELECTRONIC APPARATUS

CROSS-REFERENCE TO RELATED APPLICATIONS

This application is based upon and claims the benefit of priority of the prior Japanese Patent Application No. 2008-253179, filed on Sep. 30, 2008, and the prior Japanese Patent Application No. 2009-035443, filed on Feb. 18, 2009, the entire contents of which are incorporated herein by reference.

FIELD

The embodiment discussed herein relates to an output-voltage control device, an output-voltage control method, and an electronic apparatus.

BACKGROUND

One example of known output-voltage control devices is a switching regulator that calculates a logical NAND of an output signal of an oscillator (OSC) and an output signal of a PWM (pulse width modulation) control circuit, or a PWM controller, to forcibly produce an OFF period in an ON period of a driver for driving a switching transistor.

In such a know output-voltage control device, however, the ON period of the driver is dependent on, for example, the response time of a current-controlling element, such as a comparator, provided in the PWM control circuit. Thus, in principle, the ON period of the driver does not become shorter than the response time. Typically, step-up DC-DC converters satisfy:

$$\frac{Vin}{Vout} = \frac{toff}{T} = \frac{T-ton}{T} \qquad (1)$$

where Vin indicates is an input voltage Vin, Vout indicates an output voltage, T indicates one cycle period, toff indicates the OFF period of the driver, and ton indicates the ON period of the driver.

According to expression (1), when a desired output voltage Vout is to be obtained at a given switching frequency, a reduction in the ON period ton is a requirement for increasing the range of the input voltage Vin that allows for control of the output voltage Vout. In addition, when a desired output voltage is to be obtained with a desired input-voltage range, the switching frequency is limited by a minimum ON period. These problems also apply to step-down DC-DC converters. Step-up/step-down DC-DC converters also have problems in that the output voltage fluctuates greatly during mode switching, and as such, the operating efficiency in a step-up/step-down mode decreases.

SUMMARY

According to an aspect of the embodiments, an output-voltage control device includes a comparator which generates a comparison result after a given time passes from first timing of a first periodic signal, the comparison result being obtained by comparing a difference between an output voltage and a reference voltage with the first periodic signal, a first signal generator which generates a timing control signal which is at a first level before the given time passes from the first timing and which changes from the first level to a second level in a period in which the comparator outputs the comparison result after the given time passes, and a second signal generator which generates a control signal for controlling the output voltage in accordance with the comparison result and the timing control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
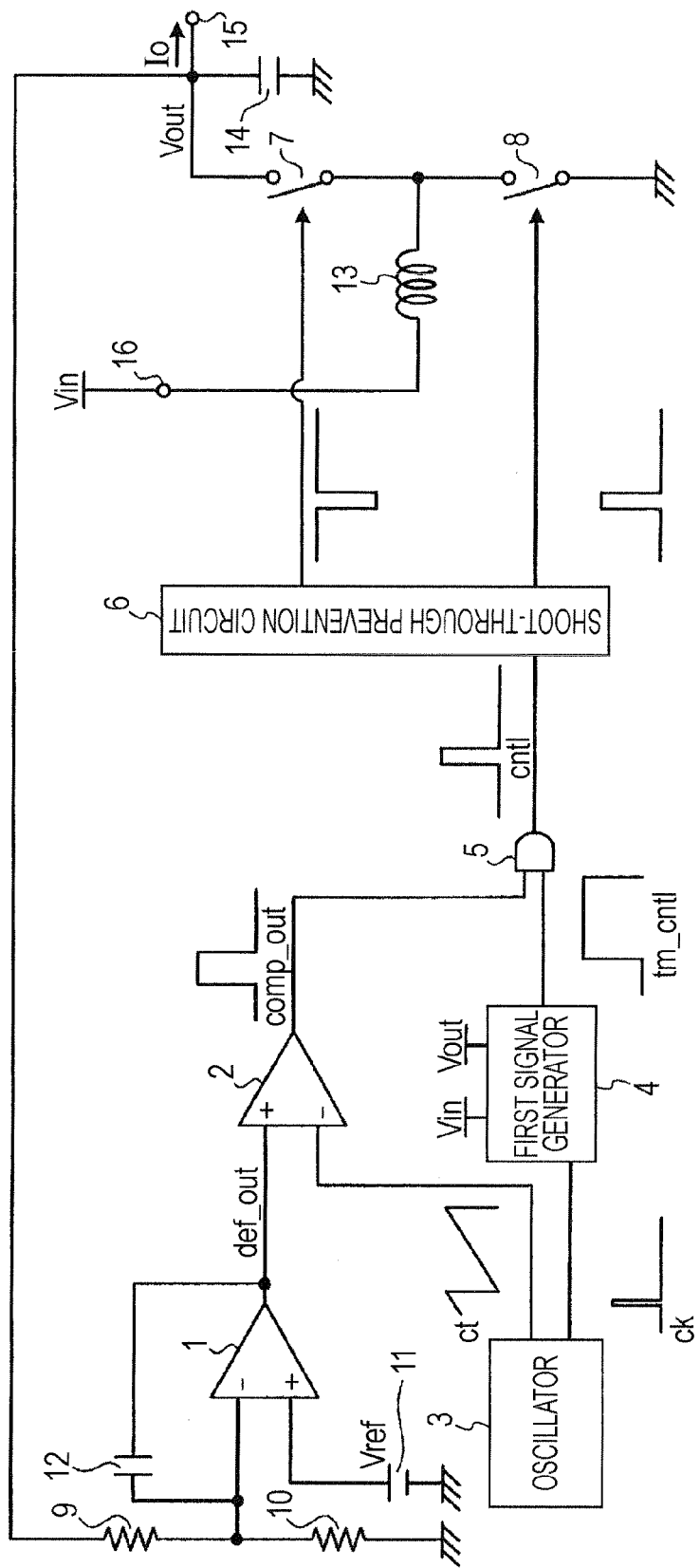
FIG. 1 illustrates a first example of an electronic apparatus including a step-up DC-DC converter according to an embodiment.

An output-voltage control device, an output-voltage control method, and an electronic apparatus according to an embodiment will be described below in detail with reference to the accompanying drawings. Now, a description will be given of an example in which an output-voltage control device controls an output voltage of a DC-DC converter in an electronic apparatus. In the description below, the similar configurations are denoted by the similar reference numerals and redundant descriptions are omitted for clarifty purposes.

FIG. 1 illustrates a first example of an electronic apparatus including a step-up DC-DC converter according to an embodiment.

As illustrated in FIG. 1, a step-up DC-DC converter 100 is configured such that an ON period of a comparison result signal comp_out, the ON period varying in accordance with the output voltage Vout, is partly masked by a timing control signal tm_cntl having change timing that vary in accordance with an input voltage Vin. With this arrangement, the ON period of the control signal cntl for controlling an output voltage Vout becomes shorter than the ON period of the comparison result signal comp_out. A step-down DC-DC converter described below is also configured in the similar manner.

The step-up DC-DC converter 100 includes a first differential amplifier 1, a comparing unit 2 such as a comparator, an oscillator 3, a first signal generator 4, a second signal generator 5 such as an AND circuit, a shoot-through prevention circuit 6, a first switch 7, a second switch 8, a first resistor 9, a second resistor 10, a reference voltage source 11, a first capacitor 12 for phase compensation, a coil 13, and an output capacitor 14. The first switch 7 and the second 8 are implemented by, for example, transistors. The first differential amplifier 1, the comparing unit 2 such as a comparator, the oscillator 3, the first signal generator, 4, the second signal generator 5 such as an AND circuit, and the shoot-through prevention circuit 6 are integrated into, for example, a single IC (integrated circuit). The first switch 7, the second switch 8, the first resistor 9, the second resistor 10, the reference voltage source 11, and the first capacitor 12 may be externally attached to the IC or may be integrated into the IC. For example, the coil 13 and the output capacitor 14 may be externally attached to the IC.

The output voltage Vout is divided by the first resistor 9 and the second resistor 10 and the resulting voltage is input to an inverting input terminal of the first differential amplifier 1. A reference voltage Vref is input from the reference voltage source 11 to a non-inverting input terminal of the first differential amplifier 1. The first differential amplifier 1 outputs a difference output signal def_out as a difference between the two input voltages. The difference output signal def_out is fed back to the inverting input terminal of the first differential amplifier 1 via the first capacitor 12. The differential output signal def_out is also input to a non-inverting input terminal of the comparator 2. A first periodic signal ct having a given cycle is input from the oscillator 3 to an inverting input terminal of the comparator 2. The comparator 2 compares the two input voltages and outputs the comparison result signal comp_out. The oscillator 3 outputs the first periodic signal ct and a clock signal ck, which has a substantially similar cycle as the first periodic signal ct. On the basis of the clock signal ck, the first signal generator 4 outputs the timing control signal tm_cntl having a substantially similar cycle as the clock signal ck. The second signal generator 5 calculates a logical AND of the comparison result signal comp_out and the timing control signal tm_cntl and outputs the control signal cntl.

The control signal cntl is input to the shoot-through prevention circuit 6. On the basis of the control signal cntl, the shoot-through prevention circuit 6 outputs a first switch signal and a second switch signal, which is an inverted signal of the first switch signal. When the first signal is high, for example, when the potential level of the first switch signal is relatively high, the first switch 7 is closed (i.e., is turned on), and when the first signal is low, for example, when the potential level of the first switch signal is relatively low, the first switch 7 is opened (i.e., is turned off). When the second switch signal is high, the second switch 8 is closed, and when the second switch signal is low, the second switch is opened. As such, although not particularly limited, for example, the polarity of the first switch signal and the polarity of the control signal cntl are opposite to each other. The first switch 7 is coupled to an output terminal 15 of the DC-DC converter. The second switch 8 is serially coupled to the first switch 7. The coil 13 is coupled between an input terminal 16 of the DC-DC converter and the node of the first switch 7 and the second switch 8. The input voltage Vin is applied to the input terminal 16. The output capacitor 14 is coupled to the output terminal 15. A load or the like (not illustrated) is coupled to the output terminal 15. The output voltage Vout is supplied to the load via the output terminal 15.

Figure 2:
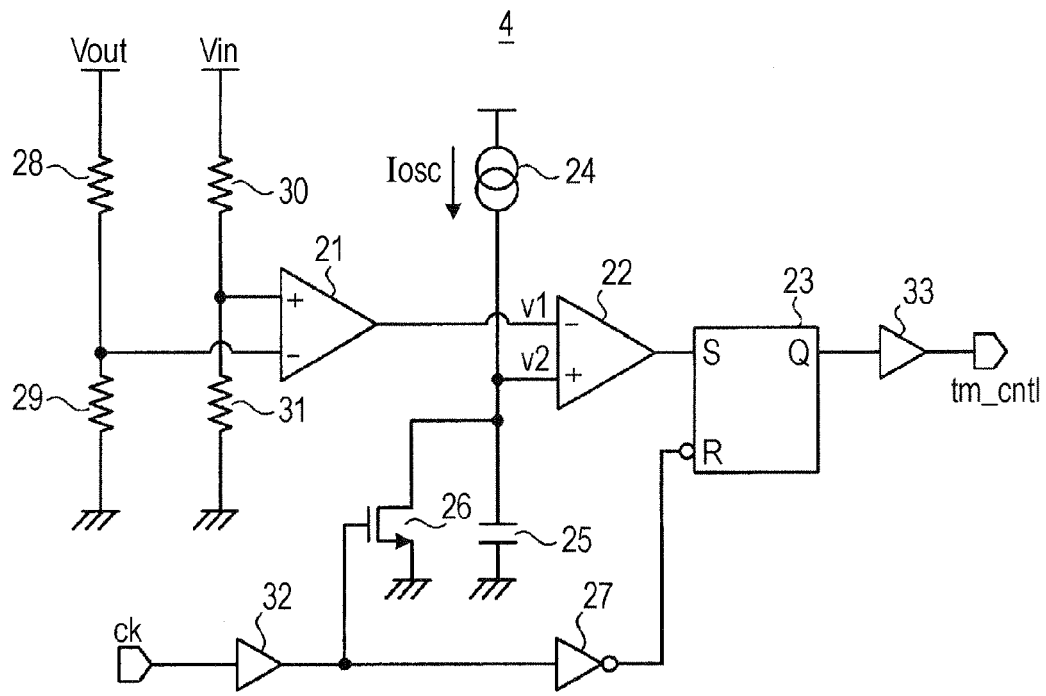
FIG. 2 illustrates an example of a signal generator in the step-up DC-DC converter in FIG. 1.

FIG. 2 illustrates an example of the first signal generator in the step-up DC-DC converter in FIG. 1.

As illustrated in FIG. 2, the first signal generator 4 includes a second differential amplifier 21, a first comparator 22, an RS (reset-set) flip-flop circuit 23, a first current source 24, a second capacitor 25, a transistor 26, an inverter 27, a third resistor 28 and a fourth resistor 29 that constitute a resistance voltage-dividing circuit, and a fifth resistor 30 and a sixth resistor 31 that constitute a resistance voltage-dividing circuit.

The output voltage Vout is divided by the third resistor 28 and the fourth resistor 29 and the resulting voltage is input to an inverting input terminal of the second differential amplifier 21. The input voltage Vin is divided by the fifth resistor 30 and the sixth resistor 31 and the resulting voltage is input to a non-inverting input terminal of the second differential amplifier 21. The second differential amplifier 21 outputs a difference signal v1 indicating the difference between those two input voltages. The difference signal v1 is input to an inverting input terminal of the first comparator 22. The first current source 24, the second capacitor 25, and a drain terminal of the transistor 26 are coupled to a non-inverting input terminal of the first comparator 22. The clock signal ck is input to a gate terminal of the transistor 26 via a buffer 32.

The first comparator 22 compares a voltage v2 input to the non-inverting input terminal of the first comparator 22 with a voltage of the difference signal v1 and outputs a comparison result. The second voltage v2 may be generated by repeatedly charging and discharging of the second capacitor 25. The output signal of the first comparator 22 is input to a set terminal of the RS flip-flop circuit 23. The clock signal ck is inverted by the inverter 27 and the inverted signal is input to a reset terminal of the RS flip-flop circuit 23. The timing control signal tm_cntl is output from a data terminal of the RS flip-flop circuit 23 via a buffer 33.

Figure 3:
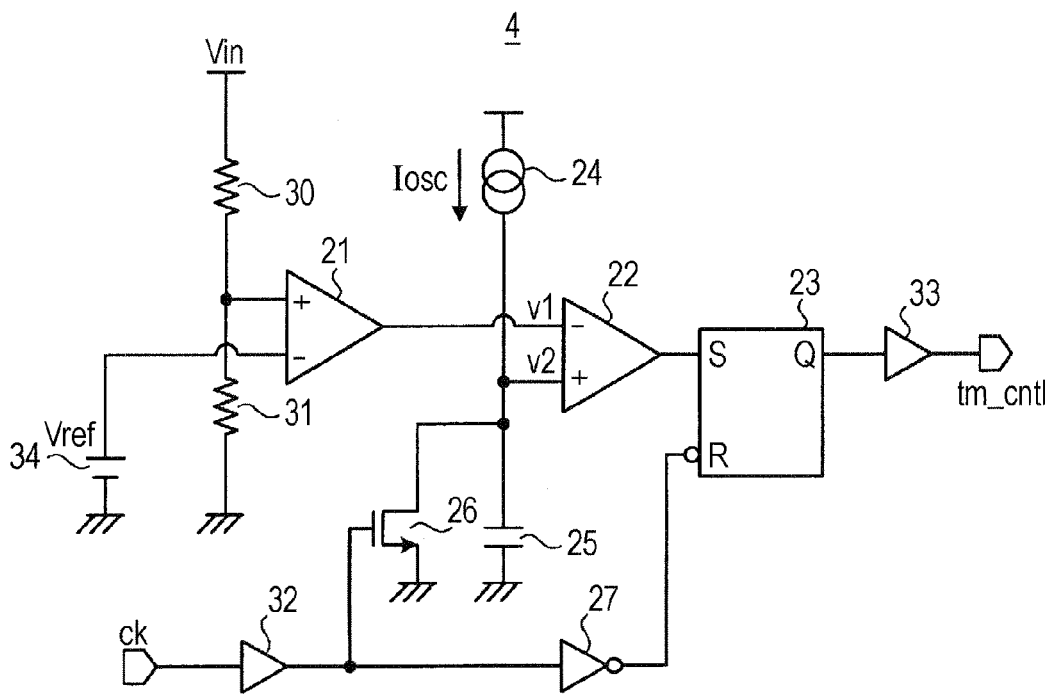
FIG. 3 illustrates another example of the first signal generator in the step-up DC-DC converter in FIG. 1.

FIG. 3 illustrates another example of the first signal generator in the step-up DC-DC converter in FIG. 1.

As illustrated in FIG. 3, instead of the output voltage Vout, a reference voltage Vref is input from a reference voltage source 34 to the inverting input terminal of the second differential amplifier 21. That is, while the first signal generator 4, illustrated in FIG. 2, has a configuration for detecting both the input voltage Vin and the output voltage Vout, the first signal generator 4, illustrated in FIG. 3, has a configuration for detecting only the input voltage Vin. Accordingly, the first signal generator 4, illustrated in FIG. 3, does not require the output voltage Vout. Other configurations are analogous to those illustrated in FIG. 2.

Figure 4:
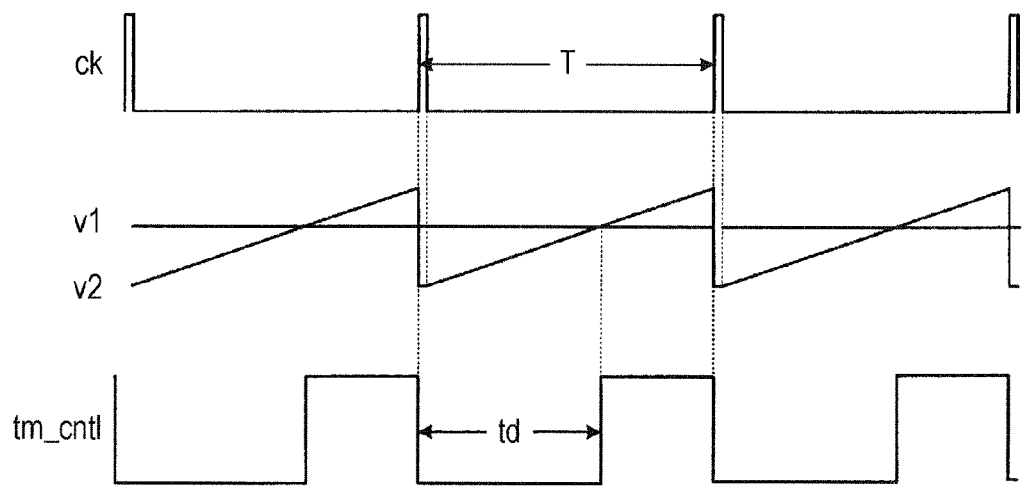
FIG. 4 illustrates operation timings of the first signal generator in the step-up DC-DC converter in FIG. 1.

FIG. 4 illustrates operation timings of the first signal generator in the step-up DC-DC converter in FIG. 1.

As illustrated in FIG. 4, for example, when the clock signal ck goes from low to high, the transistor 26 enters an ON state and thus electrical charge stored in the second capacitor 25 is discharged. Thus, the voltage v2 becomes zero. The RS flip-flop circuit 23 is also reset, and thus the output of the RS flip-flop circuit 23, i.e., the timing control signal tm_cntl, goes low. When the clock signal ck goes from high to low, the transistor 26 enters an OFF state and thus electrical charge is stored in the second capacitor 25. Thus, the voltage v2 increases. A signal having the voltage v2 is a second periodic signal having, for example, a triangular waveform and has a cycle T that is a substantially similar cycle as that of the clock signal ck and the first periodic signal ct.

When the voltage v2 is lower than the voltage of the difference signal v1, the output of the first comparator 22 goes low, and when the voltage v2 reaches the voltage of the difference signal v1, the output of the first comparator 22 goes high. When the output of the first comparator 22 goes high, the RS flip-flop circuit 23 is set. Consequently, the output of the RS flip-flop circuit 23, i.e., the timing control signal tm_cntl, goes high. In the configuration illustrated in FIG. 2, the voltage of the difference signal v1 varies in accordance with the input voltage Vin and the output voltage Vout. In the configuration illustrated in FIG. 3, the voltage of the difference signal v1 varies in accordance with the input voltage Vin. Thus, timing td at which the timing control signal tm_cntl changes from low to high also varies.

The embodiment is not limited to the above-described circuit configuration, and the timing td may be adjusted in accordance with the input/output voltages and a switching frequency (e.g. the cycle of the first periodic signal). For example, the arrangement may be such that v1 is set to have a fixed voltage and the current Iosc of the oscillator 3 is varied in accordance with the input/output voltages so as to vary the gradient of an increase in v2. Such an arrangement may also adjust the timing td, in the manner as described above.

Figure 5:
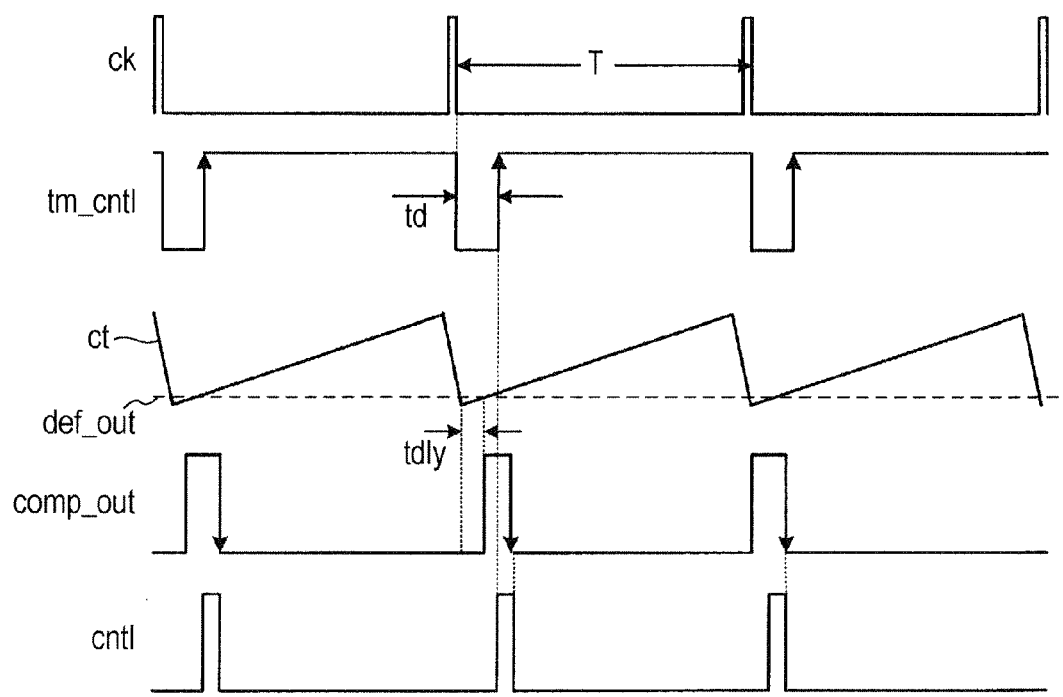
FIG. 5 illustrates operation timings of the step-up DC-DC converter in FIG. 1.

FIG. 5 illustrates operation timings of the step-up DC-DC converter in FIG. 1.

As illustrated in FIG. 5, the first periodic signal ct is, for example, a triangular-waveform signal that repeats an increase and a decrease in synchronization with the clock signal ck. The difference output signal def_out varies in accordance with the output voltage Vout. In operation, the comparison result signal comp_out is low when the voltage of the first periodic signal ct is higher than the voltage of the difference output signal def_out, and goes high when the voltage of the first periodic signal ct is lower than or equal to the difference output signal def_out. In operation, however, since delay occurs by an amount corresponding to the response time of the comparator, or the like. As such, in the comparing unit 2, the high and low of the comparison result signal comp_out are switched with an amount of time tdly delayed from timing (first timing) at which the voltage of the first periodic signal ct drops to reach the voltage of the difference output signal def_out. The delay time tdly depends on the response speed of the comparator or the like in the comparing unit 2.

The timing control signal tm_cntl goes from high to low before the comparison result signal comp_out goes from low to high, and the timing control signal tm_cntl goes low to high before the comparison result signal comp_out goes from high to low. The first signal generator 4 adjusts the voltage input to the second differential amplifier 21 so that the timing control signal tm_cntl as described above is output. The control signal cntl goes from low to high in synchronization with the rising edge of the timing control signal tm_cntl and goes from high to low in synchronization with the falling edge of the comparison result signal comp_out. Thus, the use of the control signal cntl to control the first switch 7 and the second switch 8 may reduce the OFF period of the first switch 7 and the ON period of the second switch 8, compared to a case in which the comparison result signal comp_out is used for the control.

It is desired that the timing td satisfy:

$$0 \le \left(\frac{Vin}{Vout} - 1\right)T + tdly \le td \le \frac{Vin}{Vout}T \qquad (2)$$

Thus, the timing td may be varied in accordance with not only the input voltage Vin and the output voltage Vout but also the switching frequency.

Figure 6:
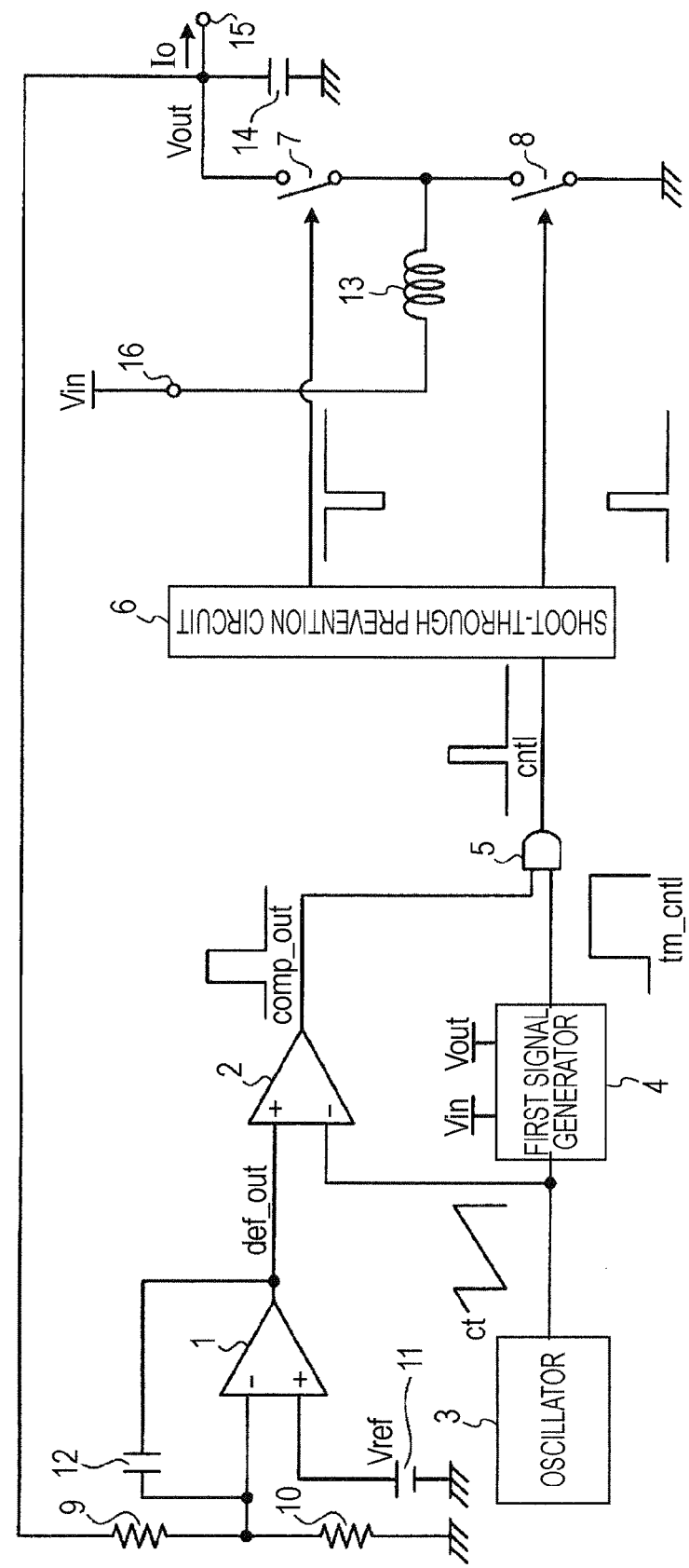
FIG. 6 illustrates a second example of the electronic apparatus including the step-up DC-DC converter according to the embodiment.

FIG. 6 illustrates a second example of the electronic apparatus including the step-up DC-DC converter according to the embodiment.

As illustrated in FIG. 6, in a step-up DC-DC converter 110 in a second configuration example, the first signal generator 4 generates the timing control signal tm_cntl on the basis of the first periodic signal ct and the input voltage Vin. Other configurations and operations of the second configuration example are analogous to those of the first configuration example of the step-up DC-DC converter.

Figure 7:
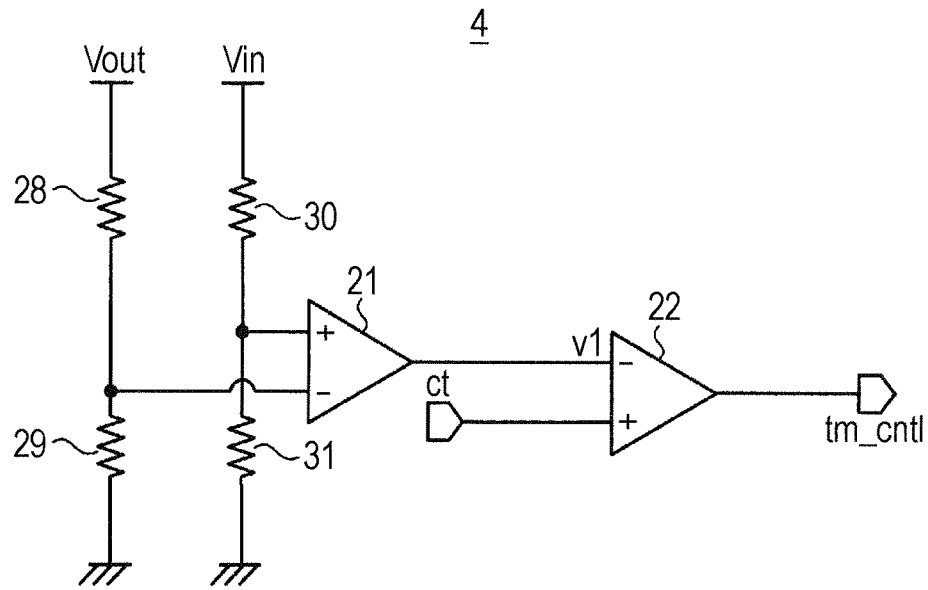
FIG. 7 illustrates an example of a first signal generator in the step-up DC-DC converter in FIG. 6.
Figure 8:
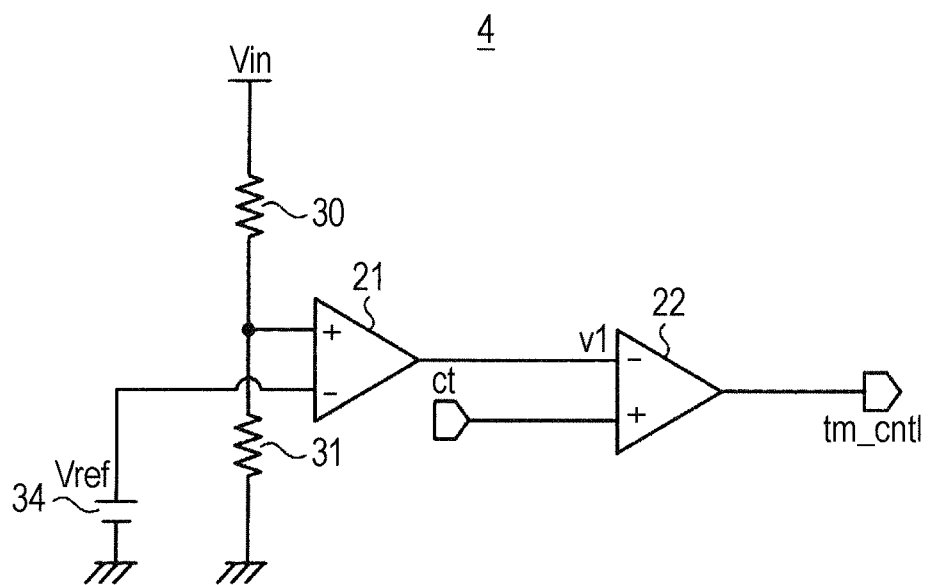
FIG. 8 illustrates another example of the first signal generator in the step-up DC-DC converter in FIG. 6.
Figure 9:
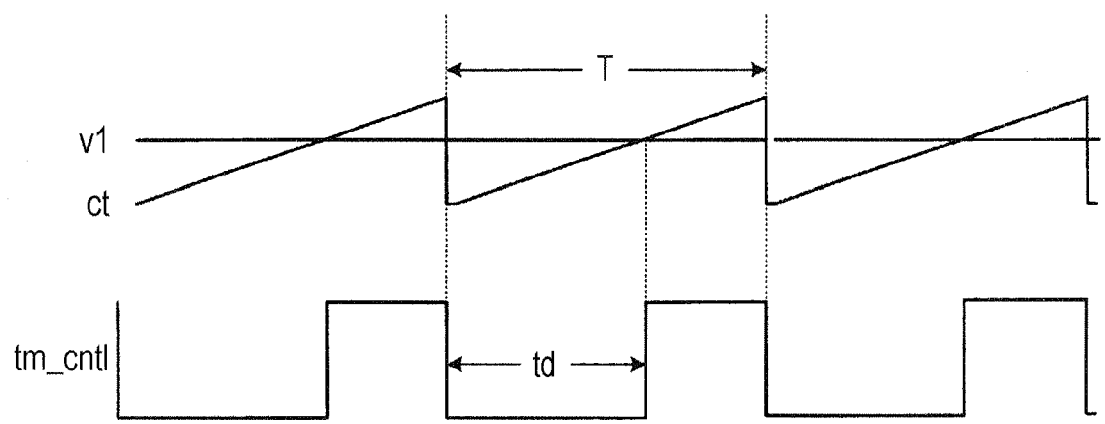
FIG. 9 illustrates operation timings of the first signal generator in the step-up DC-DC converter in FIG. 6.

FIG. 7 illustrates an example of the first signal generator in the step-up DC-DC converter in FIG. 6 and FIG. 8 illustrates another example of the first signal generator in the step-up DC-DC converter in FIG. 6. FIG. 9 illustrates operation timings of the first signal generator in the step-up DC-DC converter in FIG. 6.

As illustrated in FIGS. 7 and 8, in each first signal generator 4, the first periodic signal ct is input to the non-inverting input terminal of the first comparator 22. In the second configuration example, the first signal generator 4 does not require an RS flip-flop circuit, a first current source, a second capacitor, a transistor, an inverter, and so on. The output of the first comparator 22 directly becomes the timing control signal tm_cntl. Thus, as illustrated in FIG. 9, the output of the first comparator 22, i.e., the timing control signal tm_cntl, is low when the voltage of the first periodic signal ct is lower than the voltage of the difference signal v1, and goes high when the voltage of the first periodic signal ct reaches the voltage of the difference signal v1. Other configurations and operations of the first signal generator 4 are analogous to those of the first signal generator 4 in the first configuration example of the step-up DC-DC converter.

According to the step-up DC-DC converter of the embodiment, for example, when the delay time of the comparator or the like in the comparing unit 2 is 50 ns, the delay time of the shoot-through prevention circuit 6 is 10 ns, the switching frequency is 2.4 MHz, and the output voltage Vout is 3.2 V, it is determined from expression (1) noted above that the input voltage Vin may be permitted up to about 3.123 V, since the timing of change in the control signal cntl does not depend on the delay time "50 ns" of the comparator or the like. In contrast, when the comparison result signal comp_out, instead of the timing control signal tm_cntl, is used under similar conditions to control the first switch 7 and the second switch 8, it is determined from expression (1) noted above that the input voltage yin is about 2.739 V or lower, since the timing of change in the comparison result signal comp_out depends on the delay time "50 ns" of the comparator or the like. Thus, the step-up DC-DC converter according to the embodiment may increase the range of the input voltage that allows for control of the output voltage. Setting the range of the input voltage to be similar to the voltage range in a case in which the timing control signal tm_cntl is not used may make it possible to increase the switching frequency.

Figure 10:
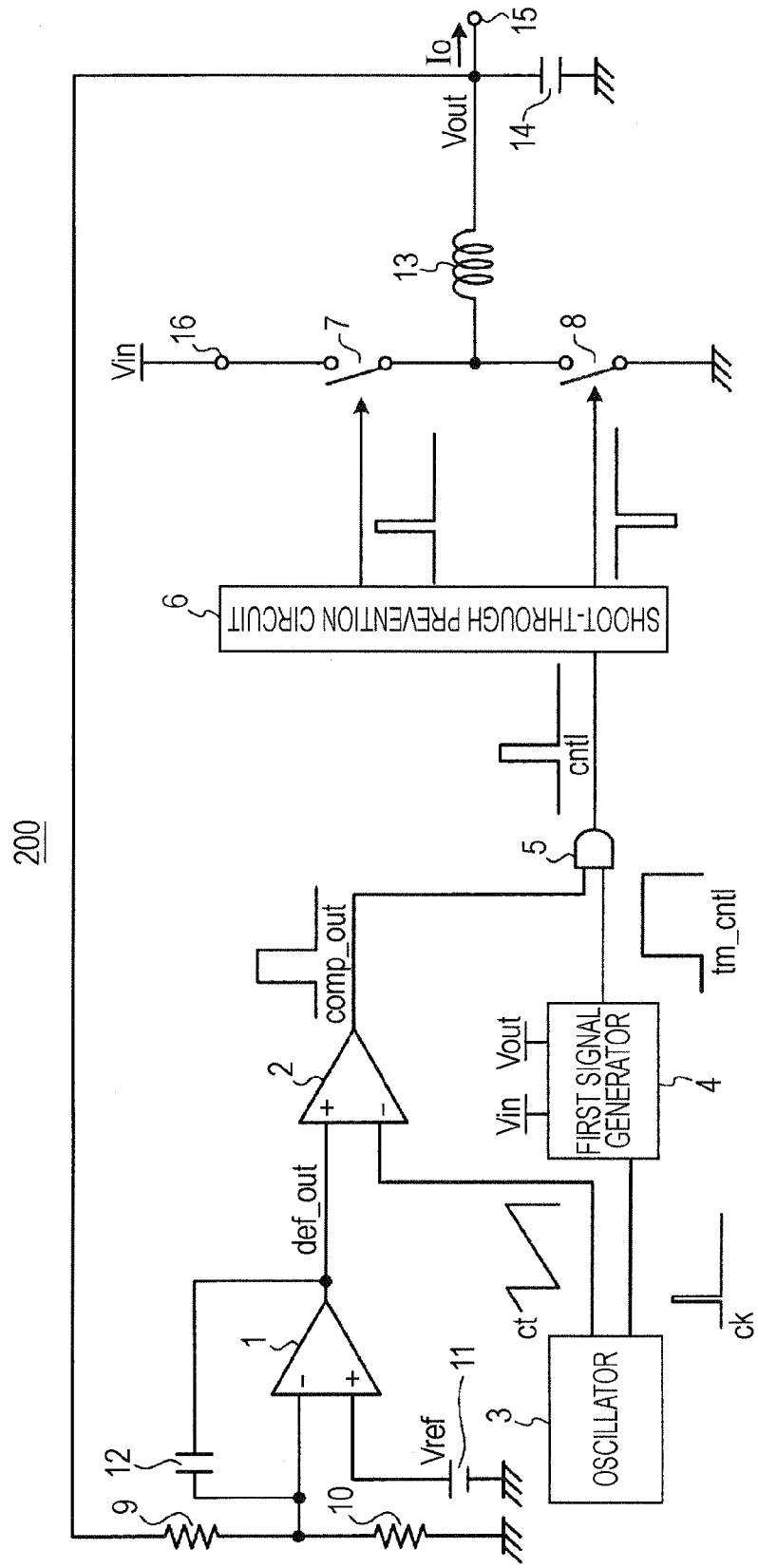
FIG. 10 illustrates a first example of an electronic apparatus including a step-down DC-DC converter according to the embodiment.

FIG. 10 illustrates a first example of the electronic apparatus including the step-down DC-DC converter according to the embodiment. As illustrated in FIG. 10, in a step-down DC-DC converter 200, the shoot-through prevention circuit 6 outputs, as the first switch signal for controlling the first switch 7, a signal having a polarity that is similar to that of the control signal cntl, and outputs, as the second switch signal for controlling the second switch 8, a signal having a polarity that is opposite to that of the control signal cntl. The first switch 7 is coupled to the input terminal 16 of the DC-DC converter. The second switch 8 is serially coupled to the first switch 7. The coil 13 is coupled between the output terminal 15 of the DC-DC converter and the node of the first switch 7 and the second switch 8. Other configurations are analogous to those of the first configuration example of the step-up DC-DC converter. The configuration and the operation of the first signal generator 4 are similar to those described with reference to FIGS. 2 to 4 with respect to the first configuration example of the step-up DC-DC converter.

Figure 11:
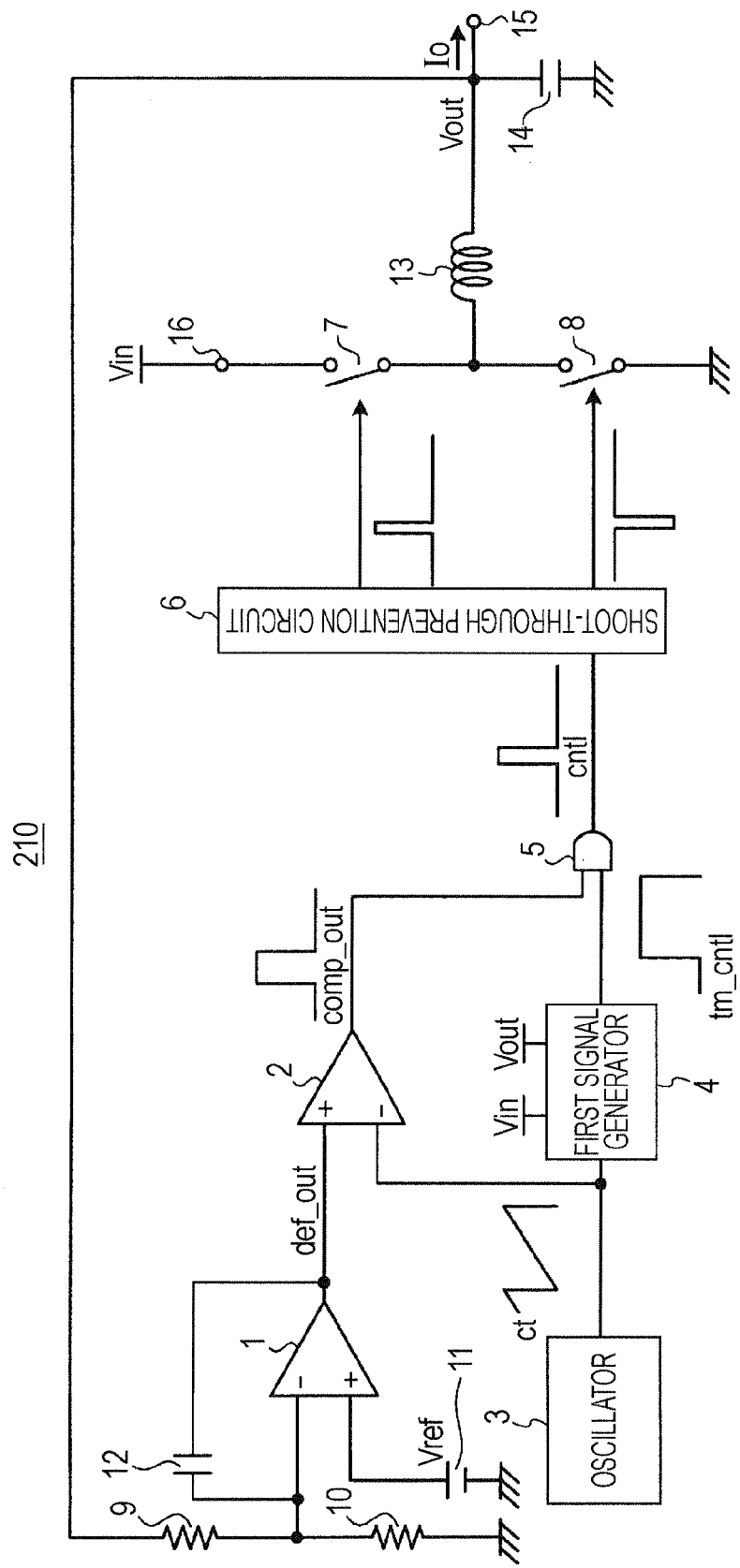
FIG. 11 illustrates a second example of the electronic apparatus including the step-down DC-DC converter according to the embodiment.

FIG. 11 illustrates a second example of the electronic apparatus including the step-down DC-DC converter according to the embodiment.

As illustrated in FIG. 11, a step-down DC-DC converter 210 in a second configuration example generates the timing control signal tm_cntl on the basis of the first periodic signal ct and the input voltage Vin. Other configurations are analogous to those of the first configuration example of the step-down DC-DC converter. The configuration and the operation of the first signal generator 4 are similar to those described with reference to FIGS. 7 to 9 with respect to the second configuration example of the step-up DC-DC converter.

The operations of the first configuration example and the second configuration example of the step-down DC-DC converter are similar to the operation described above with reference to FIG. 5 with respect to the first configuration example of the step-up DC-DC converter. In either of the configuration examples, it is desired that the timing td satisfy:

$$0 \leq tdly - \frac{Vout}{Vin}T \leq td \leq \left(1 - \frac{Vout}{Vin}\right)T \quad (3)$$

Thus, as described above, the timing td may be varied in accordance with, not only the input voltage Vin and the output voltage Vout, but also the switching frequency. Similarly to the above-described step-up DC-DC converter, the step-down DC-DC converter of the embodiment may increase the range of the input voltage that allows for control of the output voltage. The step-down DC-DC converter may also increase the switching frequency.

Figure 12:
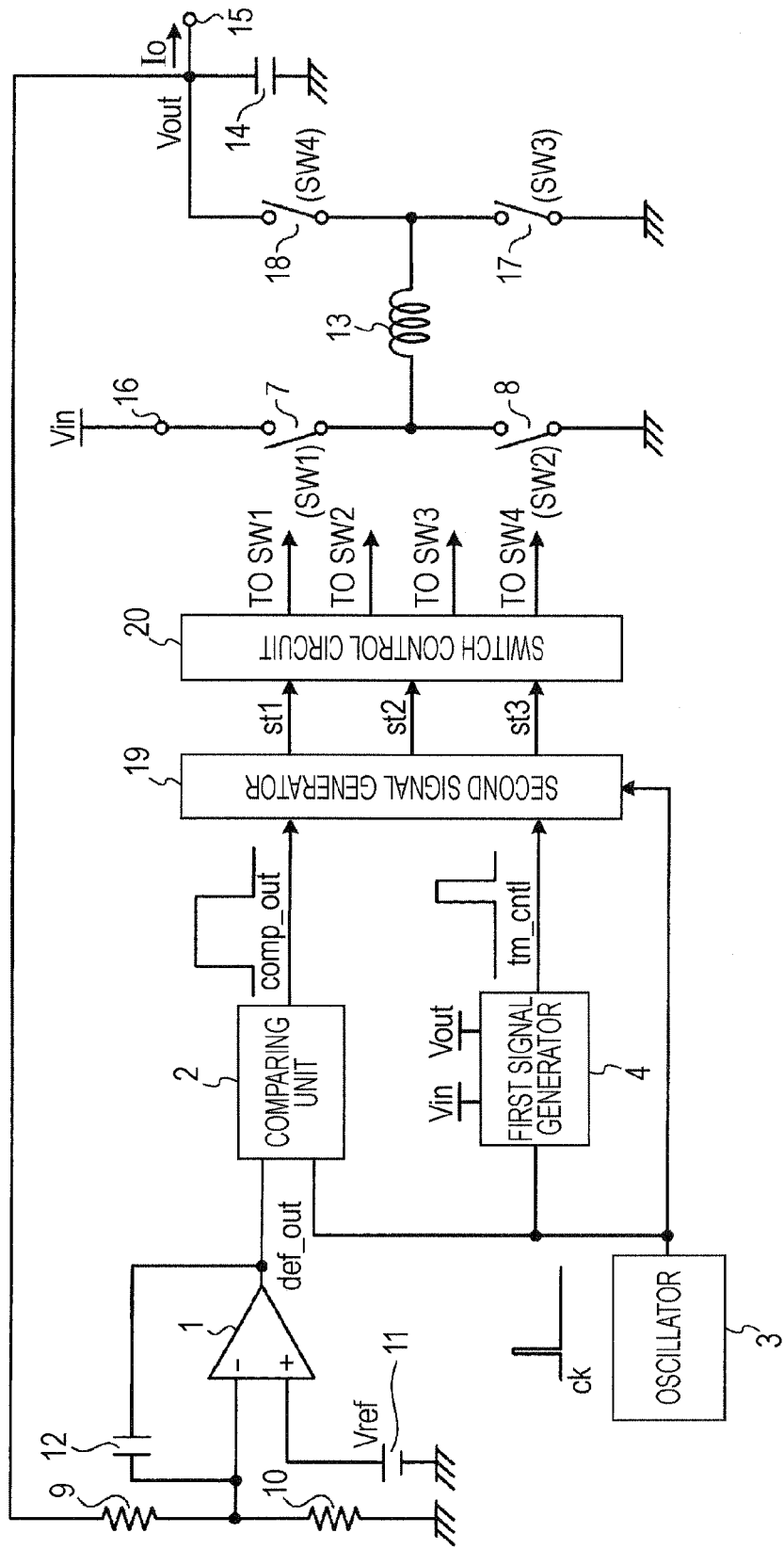
FIG. 12 illustrates a first example of an electronic apparatus including a step-up/step-down DC-DC converter according to the embodiment.

FIG. 12 illustrates a first example of an electronic apparatus including a step-up/step-down DC-DC converter according to the embodiment.

As illustrated in FIG. 12, a step-up/step-down DC-DC converter 300 is configured so that the ON period of the comparison result signal comp_out is partly masked by the timing control signal tm_cntl. With this arrangement, the period of a first state in which coil current flows from the input terminal 16 to ground and the period of a second state in which coil current flows from ground to the output terminal 15 are reduced. The step-up/step-down DC-DC converter 300 has a third switch (SW3) 17 and a fourth switch (SW4) 18 in addition to the first switch (SW1) 7 and the second switch (SW2) 8. The first switch 7 and the second switch 8 are coupled as in the example of the above-described step-down DC-DC converter (see FIG. 10). The fourth switch 18 is coupled to the output terminal 15 of the DC-DC converter 300. The third switch 17 is serially coupled to the fourth switch 18. The coil 13 is coupled between the node of the first switch 7 and the second switch 8 and the node of the third switch 17 and the fourth switch 18.

The oscillator 3 outputs the clock signal ck as the first periodic signal. On the basis of the clock signal ck and the difference output signal def_out of the first differential amplifier 1, the comparing unit 2 generates the comparison result signal comp_out. On the basis of the clock signal ck, the comparison result signal comp_out, and the timing control signal tm_cntl, the second signal generator 19 generates a first state signal st1, a second state signal st2, and a third state signal st3 and outputs the generated first to third signals st1 to st3 as control signals. On the basis of the first to third state signals st1 to st3, the switch control circuit 20 outputs a first switch signal, a second switch signal, a third switch signal, and a fourth switch signal. The opening and closing of the first switch 7, the second switch 8, the third switch 17, and the fourth switch 18 are controlled by the first switch signal, the second switch signal, the third switch signal, and the fourth switch signal, respectively.

The first differential amplifier 1, the comparing unit 2, the oscillator 3, the first signal generator, 4, the second signal generator 19, and the switch control circuit 20 are integrated into, for example, a single IC. The first switch 7, the second switch 8, the third switch 17, the fourth switch 18, the first resistor 9, the second resistor 10, the reference voltage source 11, and the first capacitor 12 may be externally attached to the IC or may be integrated into the IC. For example, the coil 13 and the output capacitor 14 are externally attached to the IC.

The step-up/step-down DC-DC converter 300 operates in three modes. For example, when the input voltage Vin is sufficiently larger than the output voltage Vout, the step-up/step-down DC-DC converter 300 operates in a step-down mode. When the input voltage Vin is sufficiently smaller than the output voltage Vout, the step-up/step-down DC-DC converter 300 operates in a step-up mode. When the input voltage Vin and the output voltage Vout are substantially equal to each other, the step-up/step-down DC-DC converter 300 operates in a step-up/step-down mode.

Figure 13:
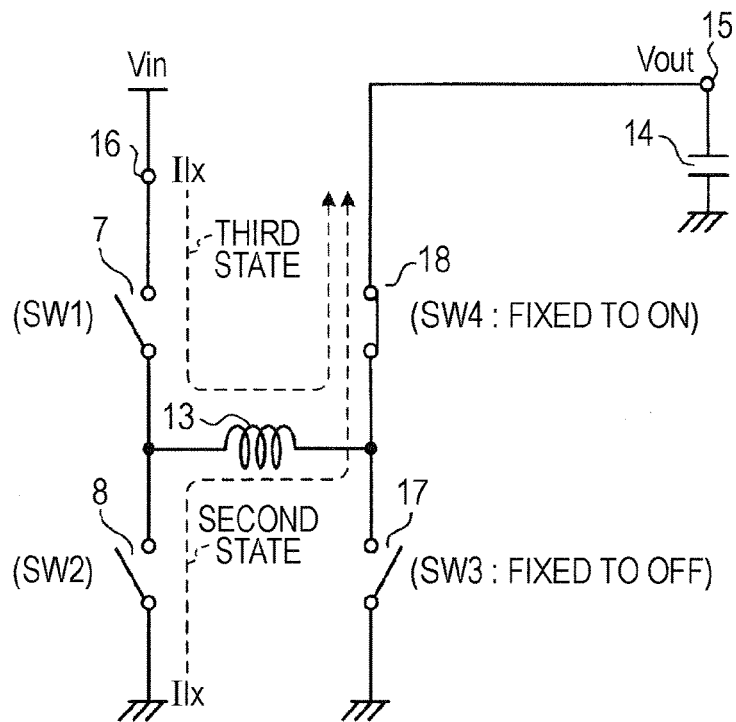
FIG. 13 illustrates the states of switches in the step-down mode of the step-up/step-down DC-DC converter in FIG. 12.

FIG. 13 illustrates the states of the switches in the step-down mode of the step-up/step-down DC-DC converter in FIG. 12.

As illustrated in FIG. 13, in the step-down mode, the opening and closing of the first switch 7 and the second switch 8 are exclusively controlled. The third switch 17 is fixed to the OFF state and the fourth switch 18 is fixed to the ON state. When the first switch 7 enters the ON state, the coil current Ilx flows from the input terminal 16 to the output terminal 15 through the coil 13. This state is referred to as a "third state". On the other hand, when the second switch 8 enters the ON state, this state is referred to as a "second state". In the step-down mode, the second state and the third state are exclusively switched.

Figure 14:
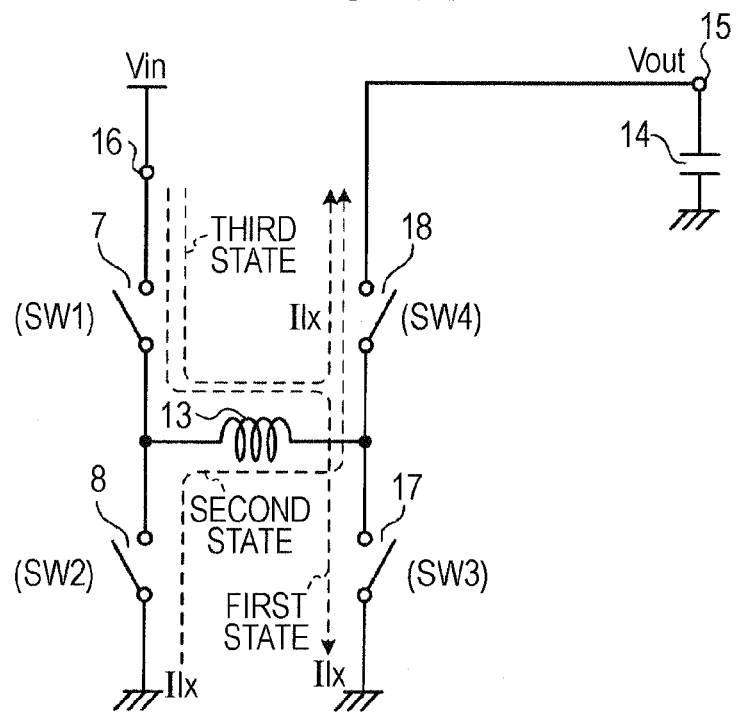
FIG. 14 illustrates the states of the switches in the step-up/step-down mode of the step-up/step-down DC-DC converter in FIG. 12.

FIG. 14 illustrates the states of the switches in the step-up/step-down mode of the step-up/step-down DC-DC converter in FIG. 12. As illustrated in FIG. 14, in the step-up/step-down mode, the opening and closing of all switches are controlled. When the first switch 7 and the third switch 17 are in the ON states and the second switch 8 and the fourth switch 18 are in the OFF states, the coil current Ilx flows from the input terminal 16 to ground through the coil 13. This state is referred to as a "first state". In the step-up/step-down mode, the first state, the second state, and the third state are exclusively switched.

Figure 15:
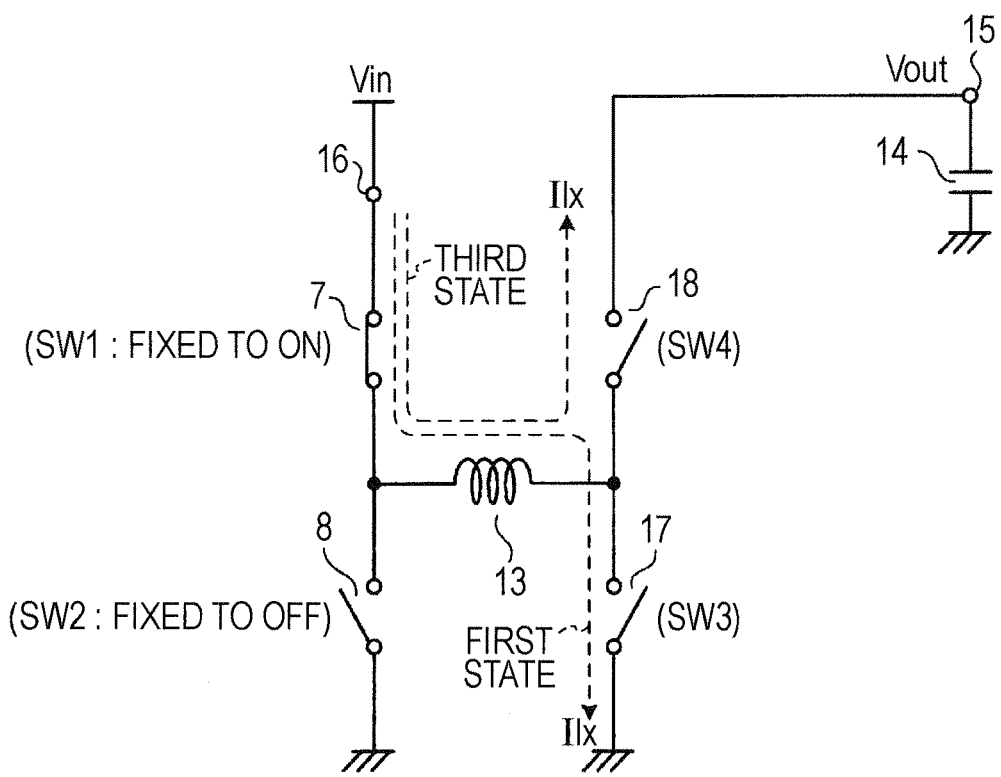
FIG. 15 illustrates the states of the switches in the step-up mode of the step-up/step-down DC-DC converter in FIG. 12.

FIG. 15 illustrates the states of the switches in the step-up mode of the step-up/step-down DC-DC converter in FIG. 12.

In the step-up mode, the opening and closing of the third switch 17 and the fourth switch 18 are exclusively controlled. The first switch 7 is fixed to the ON state and the second switch 8 is fixed to the OFF state. In the step-up mode, the first state and the third state are exclusively switched. Thus, the second signal generator 19 outputs the first state signal st1, the second state signal st2, and the third state signal st3 so that an appropriate one of the states is selected in accordance with an operation mode. The switch control circuit 20 outputs the first switch signal, the second switch signal, the third switch signal, and the fourth switch signal so that the opening and closing of the individual switches are controlled in accordance with the operation mode and the state.

Figure 16:
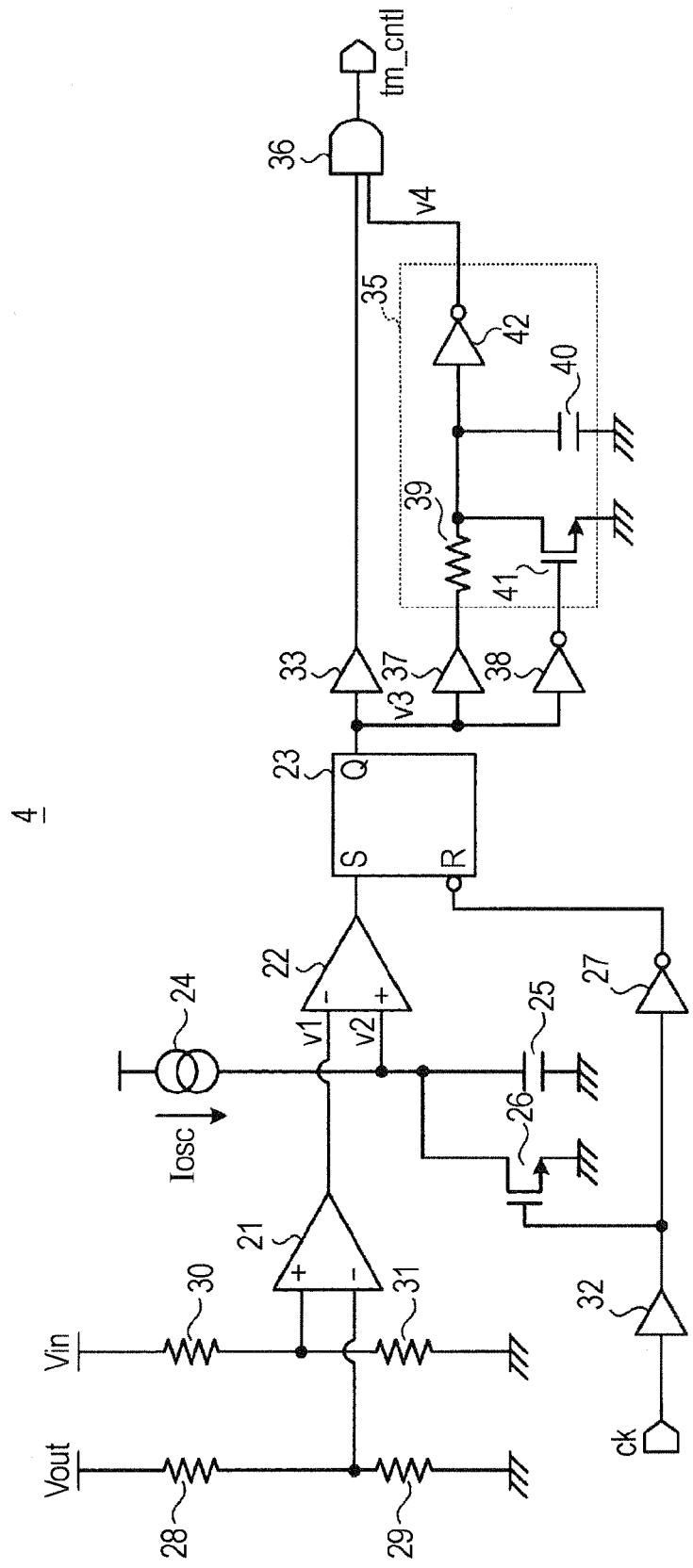
FIG. 16 illustrates an example of a first signal generator in the step-up/step-down DC-DC converter in FIG. 12.

FIG. 16 illustrates an example of the first signal generator in the step-up/step-down DC-DC converter in FIG. 12.

As illustrated in FIG. 16, the first signal generator 4 in the step-up/step-down DC-DC converter 300 has a configuration in which a delay circuit 35, an AND circuit 36, a buffer 37, and an inverter 38 are added to the configuration of the first signal generator 4 (see FIG. 2) in the above-described step-up DC-DC converter 100. The delay circuit 35 includes a seventh resistor 39, a third capacitor 40, a transistor 41 for controlling charging/discharging of the third capacitor 40, and an inverter 42. The seventh resistor 7 and the third capacitor 40 constitute an RC (resistor-capacitor) circuit. The buffer 37 and the inverter 38, as well as the buffer 33, are coupled to the output terminal of the RS flip-flop circuit 23.

The output signal of the RS flip-flop circuit 23 is delayed by time constants of the seventh resistor 39 and the third capacitor 40, the delayed signal is inverted by the inverter 42 and the inverted signal is input to the AND circuit 36. The output signal of the RS flip-flop circuit 23 is also input to the AND circuit 36 via the buffer 33. The AND circuit 36 calculates a logical AND of the output signal of the buffer 33 and the output signal of the inverter 42 to output the control signal tm_cntl. The ON and OFF of the transistor 41 are controlled by the output signal of the inverter 38.

Figure 17:
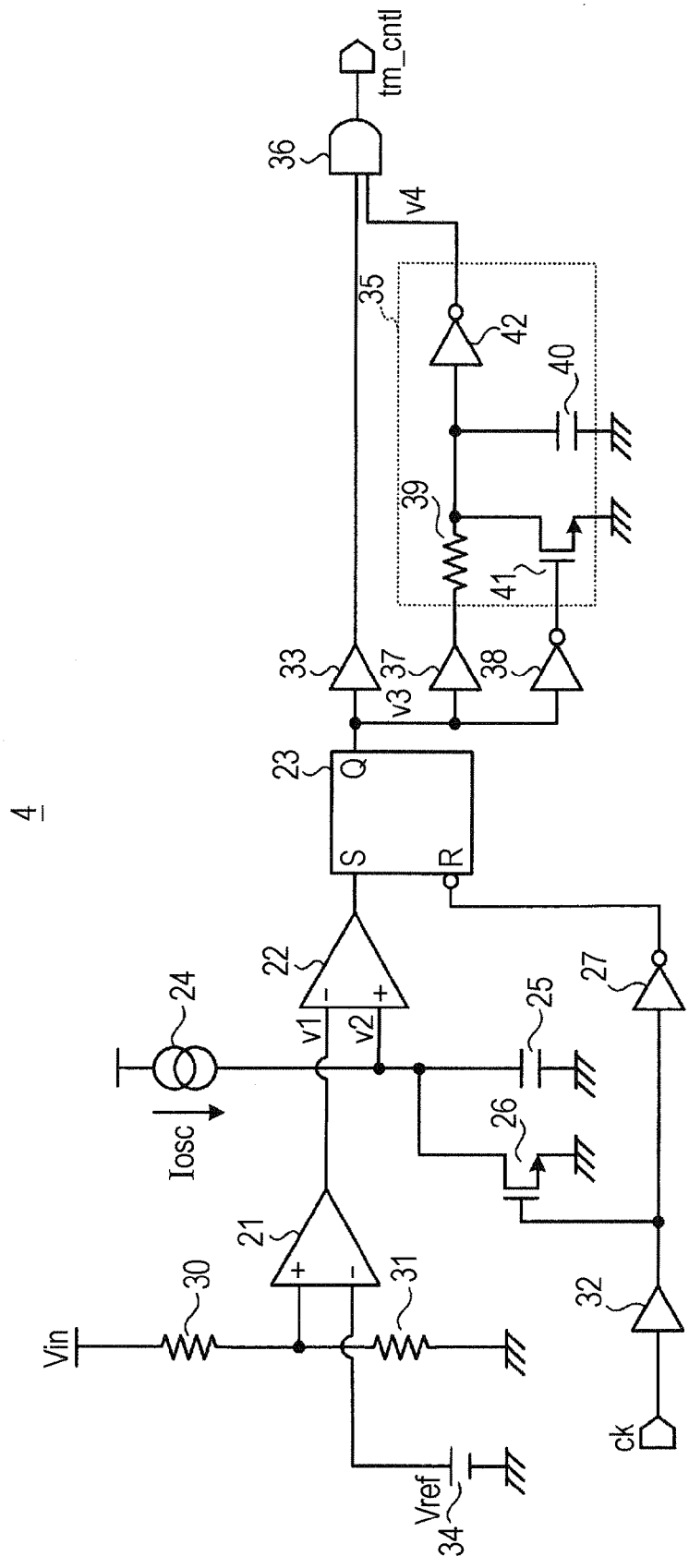
FIG. 17 illustrates another example of the first signal generator in the step-up/step-down DC-DC converter in FIG. 12.

FIG. 17 illustrates another example of the first signal generator in the step-up/step-down DC-DC converter in FIG. 12.

As illustrated in FIG. 17, first signal generator 4 may also have a configuration for detecting only the input voltage Vin, as in the alternative configuration (see FIG. 3) of the first signal generator 4 in the above-described step-up DC-DC converter. In the first signal generator 4, illustrated in FIG. 16 or 17, the output signal of the RS flip-flop circuit 23 is denoted by "v3" and the output signal of the delay circuit 35 is denoted by "v4".

Figure 18:
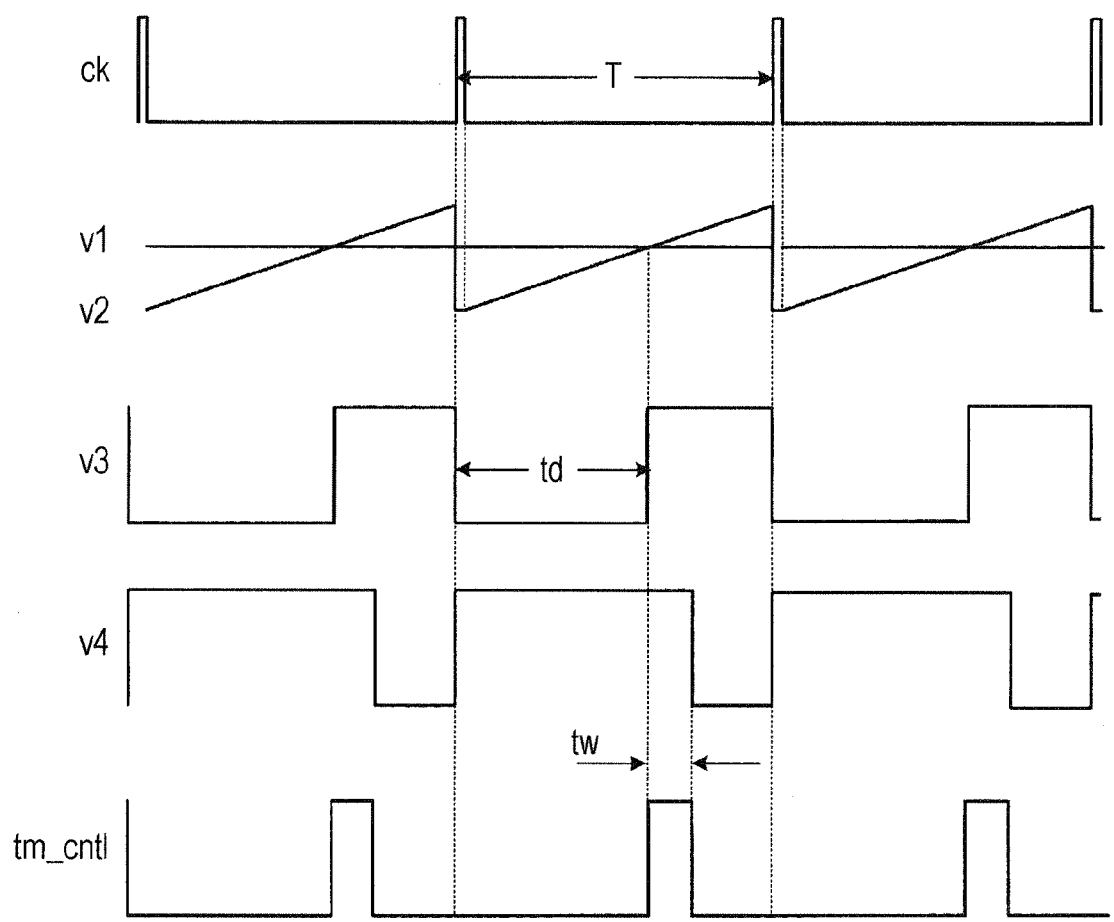
FIG. 18 illustrates operation timings of the first signal generator in the step-up/step-down DC-DC converter in FIG. 12.

FIG. 18 illustrates operation timings of the first signal generator in the step-up/step-down DC-DC converter in FIG. 12.

As illustrated in FIG. 18, when the voltage v2 input to the non-inverting input terminal of the first comparator 22 is lower than the voltage of the difference signal v1, the output signal v3 of the RS flip-flop circuit 23 is low, and when the voltage v2 reaches the voltage of the difference signal v1, the output signal v3 of the RS flip-flop circuit 23 goes high. In the configuration illustrated in FIG. 16, the voltage of v1 varies in accordance with the input voltage Vin and the output voltage Vout. In the configuration illustrated in FIG. 17, the voltage of v1 varies in accordance with the input voltage Vin. Thus, the timing td at which the timing control signal tm_cntl changes from low to high also varies.

The output signal v4 of the delay circuit 35 is an inverted signal of the output signal v3. The output signal v4, however, goes through the delay circuit 35, and thus the output signal v4 changes from high to low with an amount of time tw delayed from the rising edge of the output signal v3. When the output signal v3 goes from high to low in synchronization with the clock signal ck, the transistor 41 in the delay circuit 35 enters an ON state. Consequently, the third capacitor 40 is discharged, so that the output signal v4 of the delay circuit 35 goes from low to high in synchronization with the falling edge of the output signal v3 of the RS flip-flop circuit 23. The timing control signal tm_cntl results from the logical AND of v3 and v4 and thus is high from the rising edge of v3 to the falling edge of v4. That is, the period in which the timing control signal tm_cntl is high is determined by the delay time tw of the delay circuit 35. Thus, the time constant of the delay circuit 35 is adjusted so as to provide the desired timing control signal tm_cntl.

The embodiment is not limited to the above-described circuit configuration, and the delay time tw may have an amount of time that is greater than or equal to the delay time of a driver, as described below. For example, since the delay time tw may not be a fixed time, the arrangement may be such that another circuit that has a different value in the second capacitor 25 in FIG. 17 and that generates v3 and an inverted signal thereof is used as v4 to generate the timing control signal tm_cntl.

Figure 19:
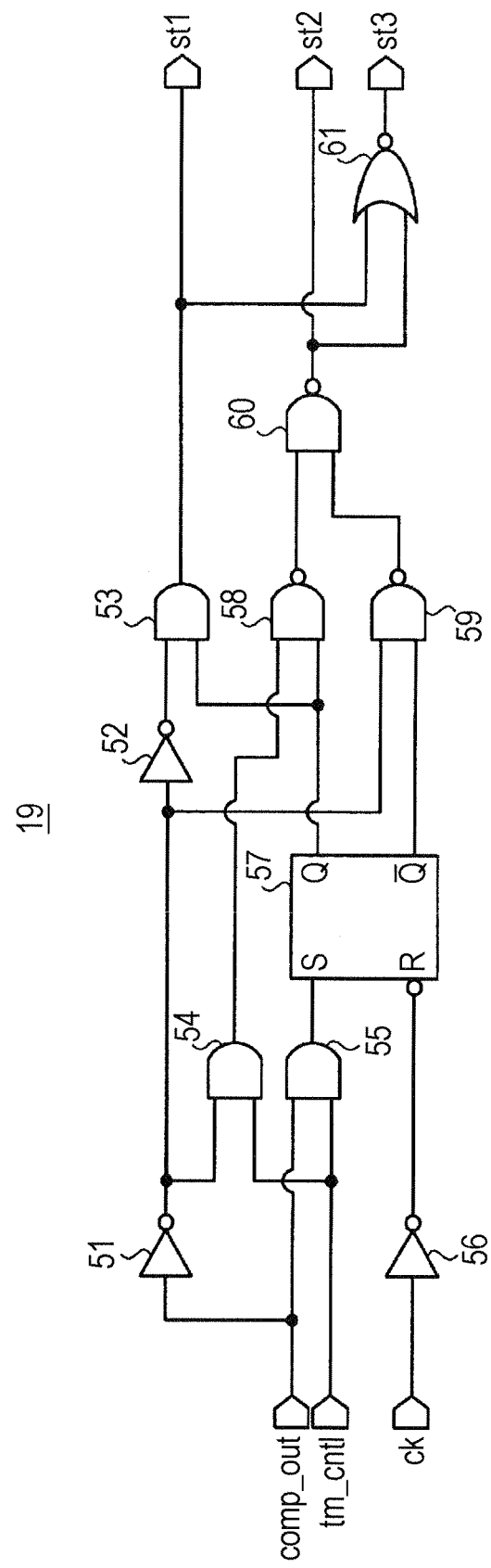
FIG. 19 illustrates an example of a second signal generator in the step-up/step-down DC-DC converter in FIG. 12.

FIG. 19 illustrates an example of the second signal generator in the step-up/step-down DC-DC converter in FIG. 12.

As illustrated in FIG. 19, the second signal generator 19 serves as a logic circuit for generating the first state signal st1, the second state signal st2, and the third state signal st3 on the basis of the comparison result signal comp_out, the timing control signal tm_cntl, and the clock signal ck. An AND circuit 55 outputs a logical AND of the comparison result signal comp_out and the timing control signal tm_cntl. An RS flip-flop circuit 57 is set by the output signal of the AND circuit 55. The RS flip-flop circuit 57 is reset by an inverted signal of the clock signal ck, the inverted signal being obtained by an inverter 56. An inverter 51 inverts the comparison result signal comp_out. An inverter 52 inverts an output signal of the inverter 51. An AND circuit 53 outputs, as the first state signal st1, a logical AND of an output signal of the inverter 52 and an output signal of a data terminal Q of the RS flip-flop circuit 57.

An AND circuit 54 outputs a logical AND of the output signal of the inverter 51 and the timing control signal tm_cntl. A NAND circuit 58 outputs a logical NAND of an output signal of the AND circuit 54 and the output signal of the data terminal Q of the RS flip-flop circuit 57. A NAND circuit 59 outputs a logical NAND of the output signal of the inverter 51 and an output signal of a data terminal /Q (which is an inverted signal of the output signal of the data terminal Q) of the RS flip-flop circuit 57. A NAND circuit 60 outputs a logical NAND of an output signal of the NAND circuit 58 and an output signal of the NAND circuit 59 as the second state signal st2. A NOR circuit 61 outputs a logical NOR of the first state signal st1 and the second state signal st2 as the third state signal st3.

Figure 20:
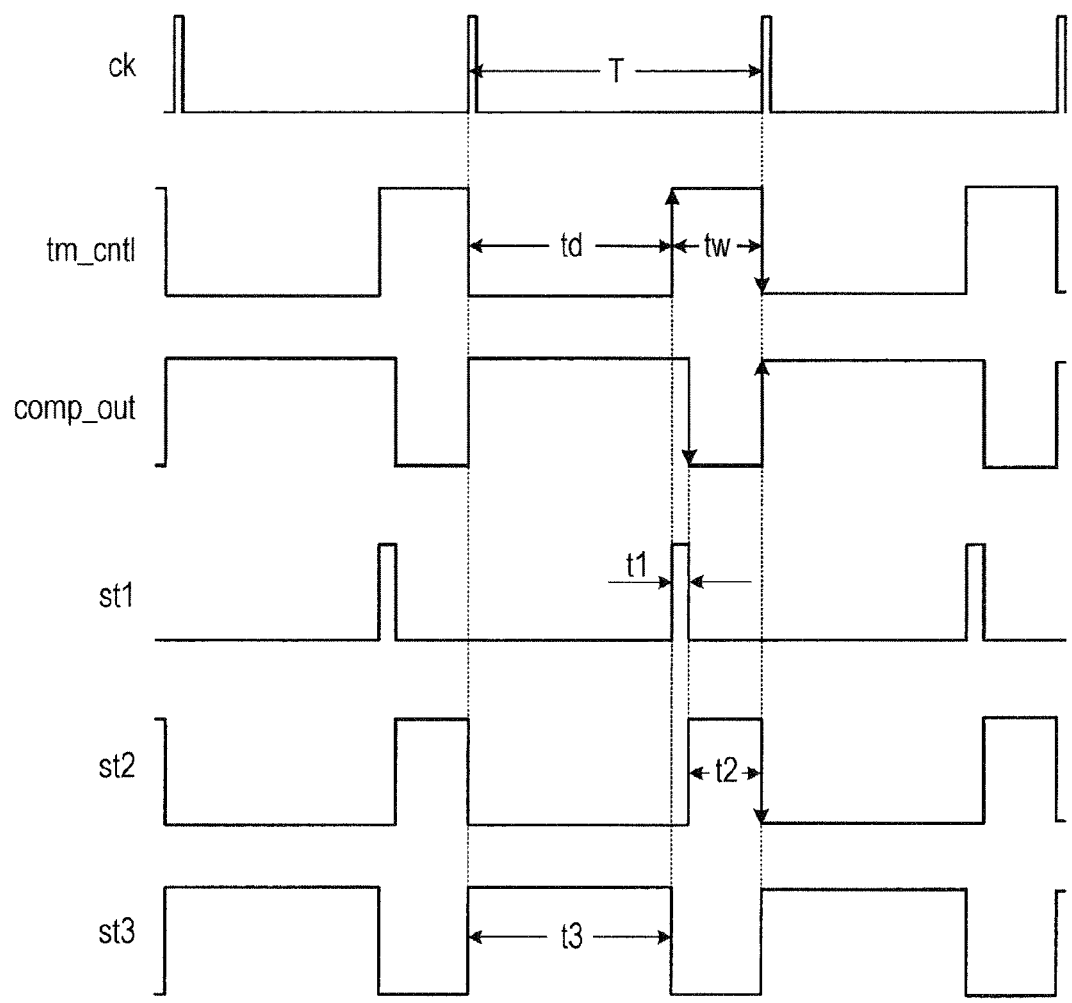
FIG. 20 illustrates operation timings of the second signal generator in the step-up/step-down DC-DC converter in FIG. 12.

FIG. 20 illustrates operation timings of the second signal generator in the step-up/step-down DC-DC converter in FIG. 12.

As illustrated in FIG. 20, the first state signal st1 is high in a period from first timing, at which the timing control signal tm_cntl goes from low to high, to fourth timing, at which the comparison result signal comp_out goes from high to low. The second state signal st2 is high in a period from the fourth timing to second timing, at which the timing control signal tm_cntl goes from high to low. The third state signal st3 is high in a period from third timing, at which the comparison result signal comp_out goes from low to high, to the first timing and in a period from the second timing to the third timing. Although the second timing and the third timing match each other in the example of the timings illustrated in FIG. 20, they may not match each other.

The first state signal st1, the second state signal st2, and the third state signal st3 become the high levels exclusively. For example, they are preferentially brought to the high levels in order of the first state signal st1, the third state signal st3, and the second state signal st2. That is, in one cycle, the high period of the first state signal st1 (this period will hereinafter be referred to as a "first-state period") is first allotted with priority. In its remaining period, next, the high period of the third state signal st3 (this period will hereinafter be referred to as a "third-state period") is allotted. Furthermore, in the remaining period, the second state signal st2 goes high, so that the state enters a second-state period.

The periods in which the first state signal st1, the second state signal st2, and the third state signal st3 are high are denoted by t1, t2, and t3, respectively. The second signal generator 19 is configured so that it may output the first state signal st1, the second state signal st2, and the third state signal st3 described above.

Figure 21:
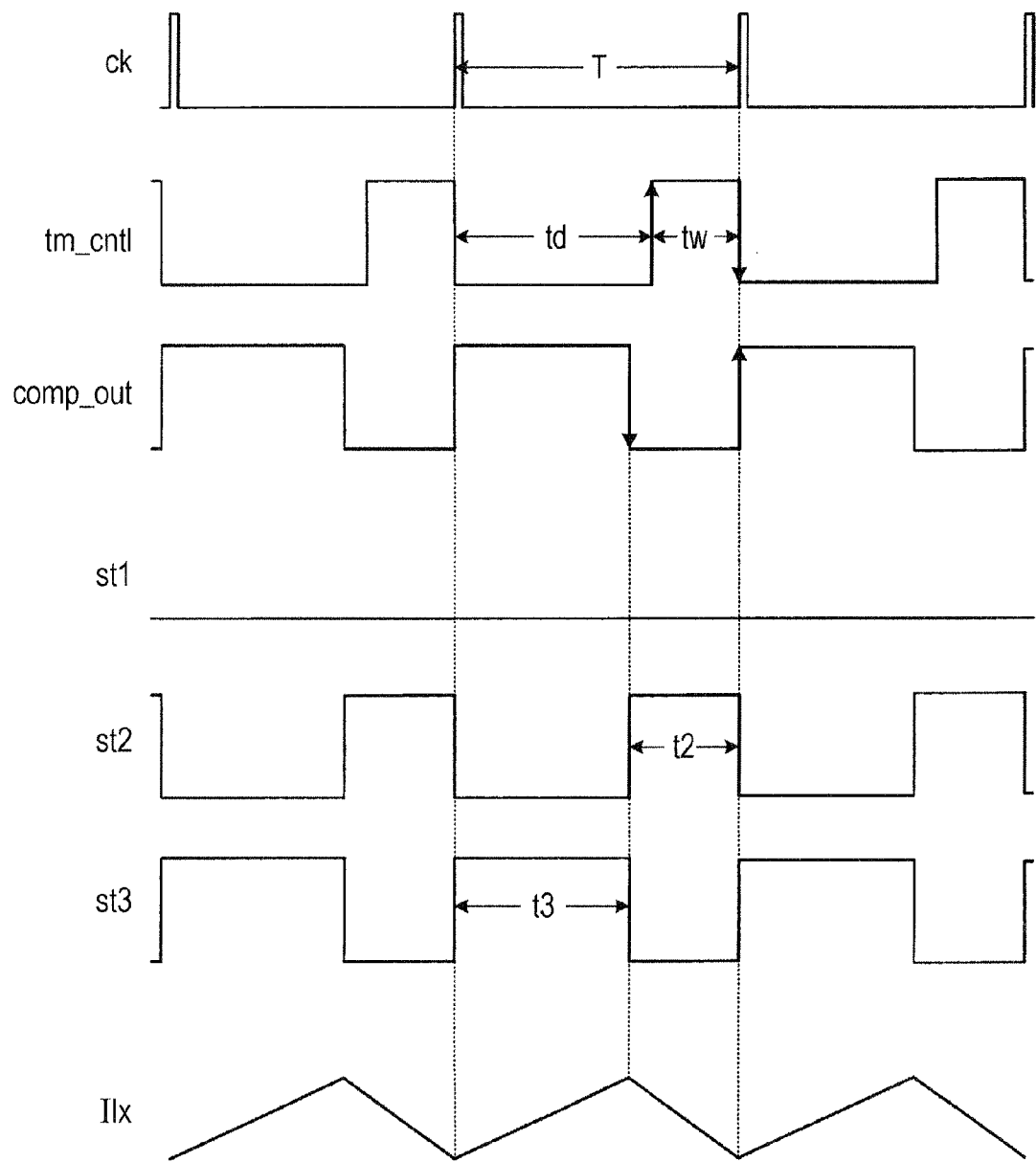
FIG. 21 illustrates operation timings in the step-down mode of the step-up/step-down DC-DC converter in FIG. 12.

FIG. 21 illustrates operation timings in the step-down mode of the step-up/step-down DC-DC converter in FIG. 12.

As illustrated in FIG. 21, in the step-down mode, since the comparison result signal comp_out goes from high to low before the timing control signal tm_cntl goes from low to high, the first state signal st1 remains low. Thus, in the step-down mode, the second state and the third state are alternately repeated without the first state. The coil current Ilx increases in the third-state period t3 and decreases in the second-state period t2.

Figure 22:
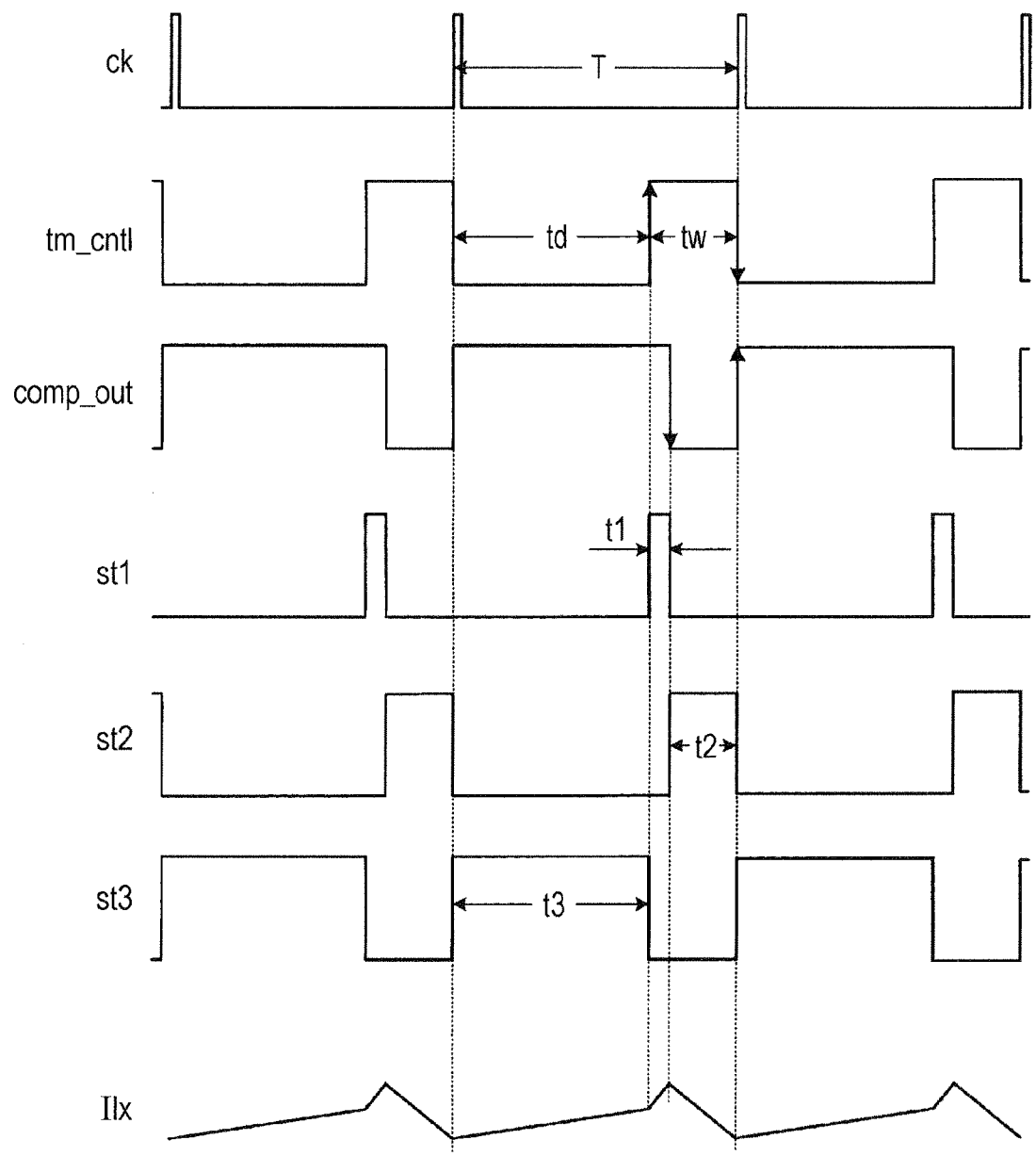
FIG. 22 illustrates operation timings in the step-up/step-down mode of the step-up/step-down DC-DC converter in FIG. 12.
Figure 23:
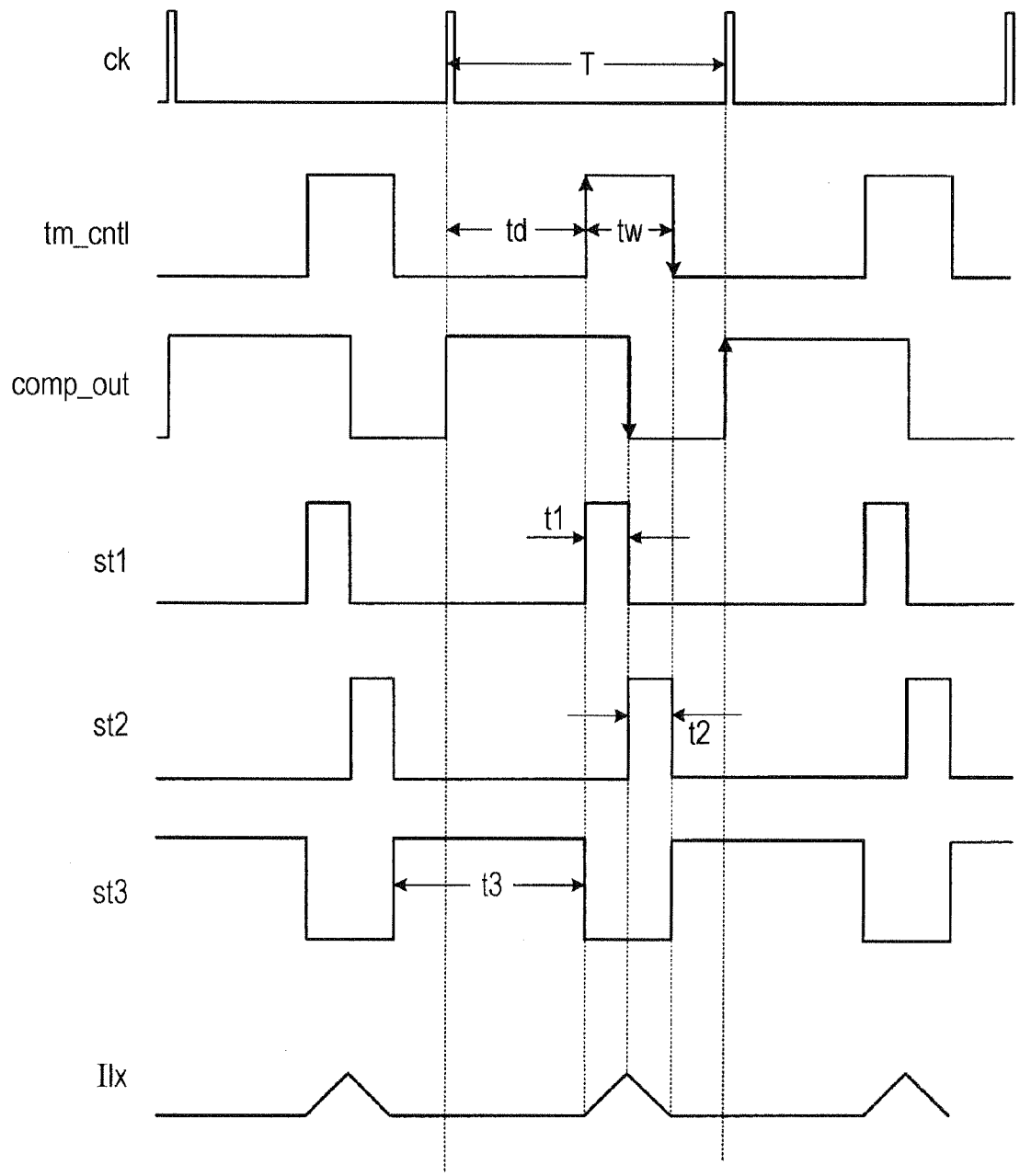
FIG. 23 illustrates operation timings in the step-up/step-down mode of the step-up/step-down DC-DC converter in FIG. 12.
Figure 24:
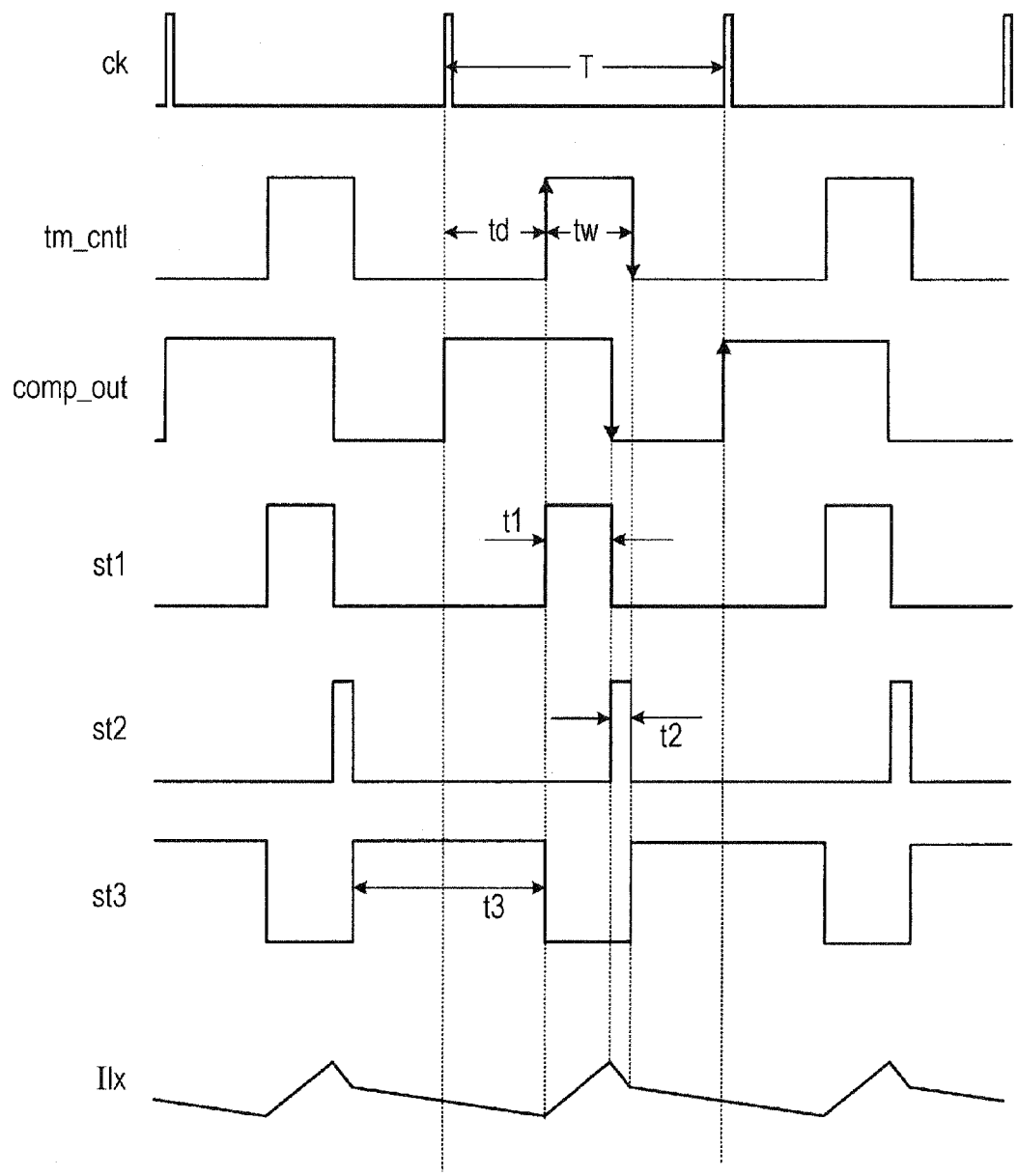
FIG. 24 illustrates operation timings in the step-up/step-down mode of the step-up/step-down DC-DC converter in FIG. 12.

FIGS. 22 to 24 illustrate operation timings in the step-up/step-down mode of the step-up/step-down DC-DC converter.

As illustrated in FIG. 22, in the step-up/step-down mode, when the input voltage Vin is higher than the output voltage Vout, the high period of the first state signal st1 is shorter than the high period of the second state signal st2. That is, the first-state period ti is shorter than the second-state period t2. The coil current Ilx increases in the third-state period t3, increases more sharply in the first-state period t1 than in the third-state period t3, and decreases gradually in the second-state period t2.

As illustrated in FIG. 23, when the input voltage yin and the output voltage Vout are substantially equal to each other in the step-up/step-down mode, the high period of the first state signal st1 and the high period of the second state signal st2 are substantially equal to each other. Thus, the first-state period t1 and the second-state period t2 are substantially equal to each other. The coil current Ilx does not substantially change in the third-state period t3, increases in the first-state period t1, and decreases in the second-state period t2.

As illustrated in FIG. 24, when the input voltage Vin is lower than the output voltage Vout in the step-up/step-down mode, the high period of the first state signal st1 is longer than the high period of the second state signal st2. Thus, the first-state period t1 is longer than the second-state period t2. The coil current Ilx decreases in the third-state period t3, increases in the first-state period t1, and decreases more sharply in the second-state period t2 than in the third-state period t3.

Figure 25:
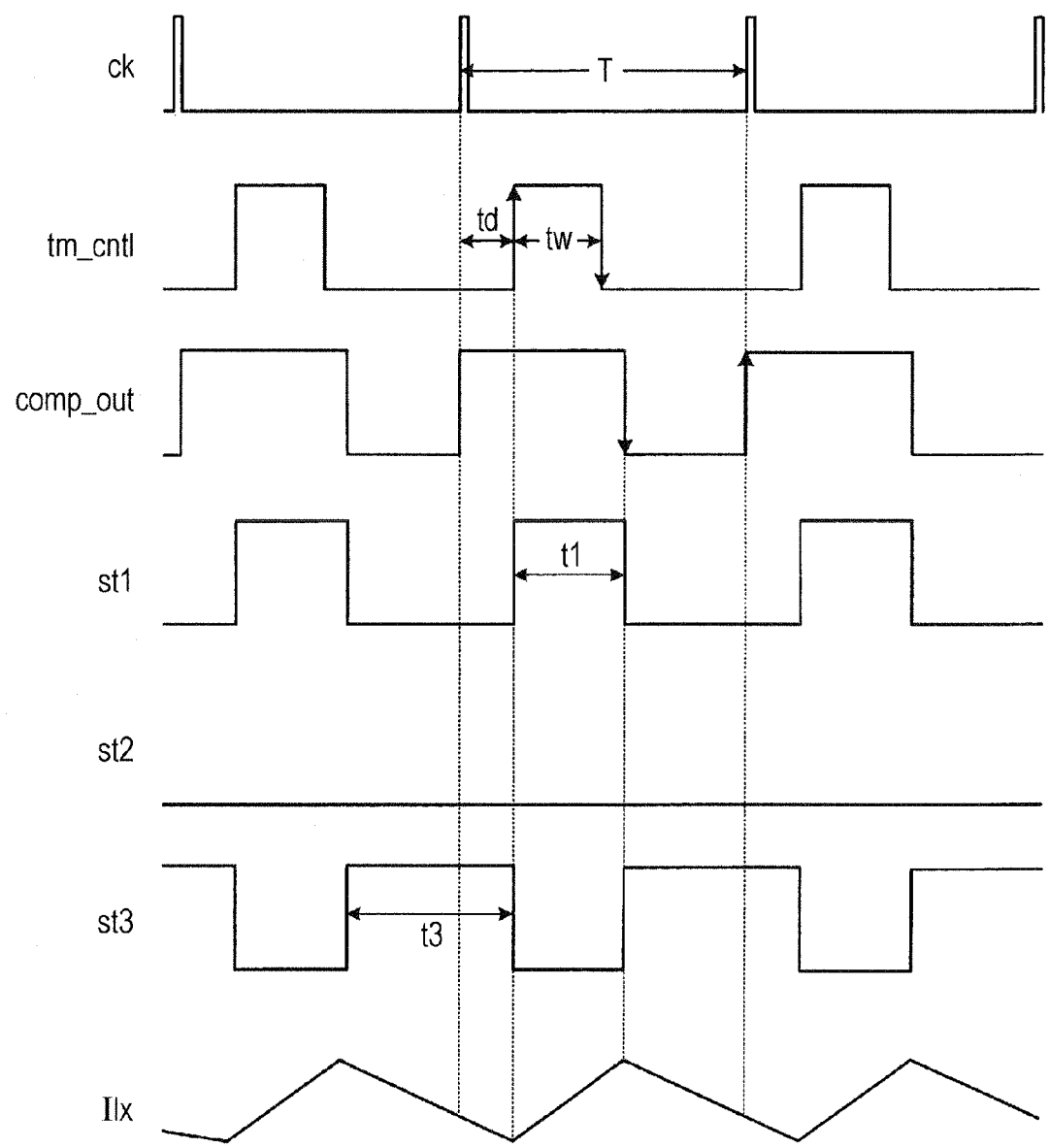
FIG. 25 illustrates operation timings in the step-up mode of the step-up/step-down DC-DC converter in FIG. 12.

FIG. 25 illustrates operation timings in the step-up mode of the step-up/step-down DC-DC converter in FIG. 12.

As illustrated in FIG. 25, in the step-up mode, since the timing control signal tm_cntl goes from high to low before the comparison result signal comp_out goes from high to low and the second state signal st2 remains low. Thus, in the step-up mode, the first state and the third state are alternately repeated without the second state. The coil current Ilx decreases in the third-state period t3 and increases in the first-state period t1.

Figure 26:
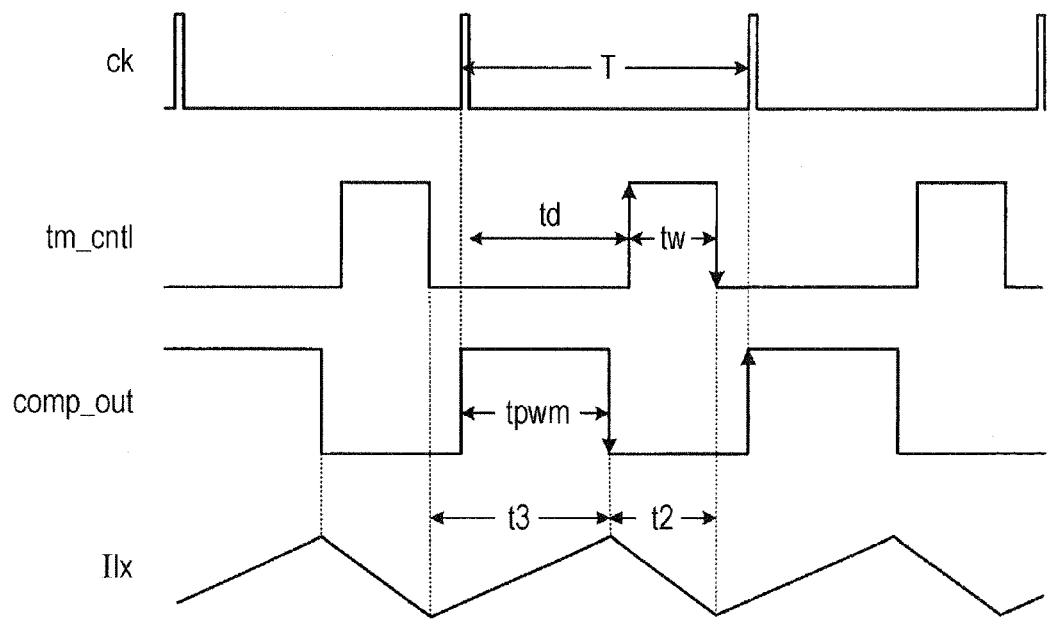
FIG. 26 illustrates typical operation timings in the step-down mode of the step-up/step-down DC-DC converter in FIG. 12.
Figure 27:
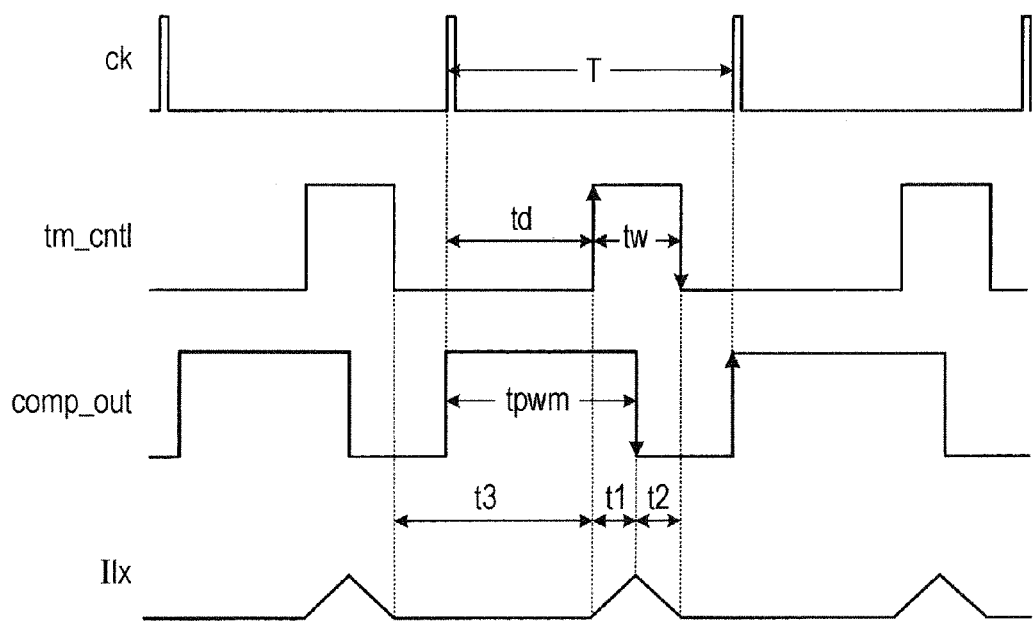
FIG. 27 illustrates typical operation timings in the step-up/step-down mode of the step-up/step-down DC-DC converter in FIG. 12.
Figure 28:
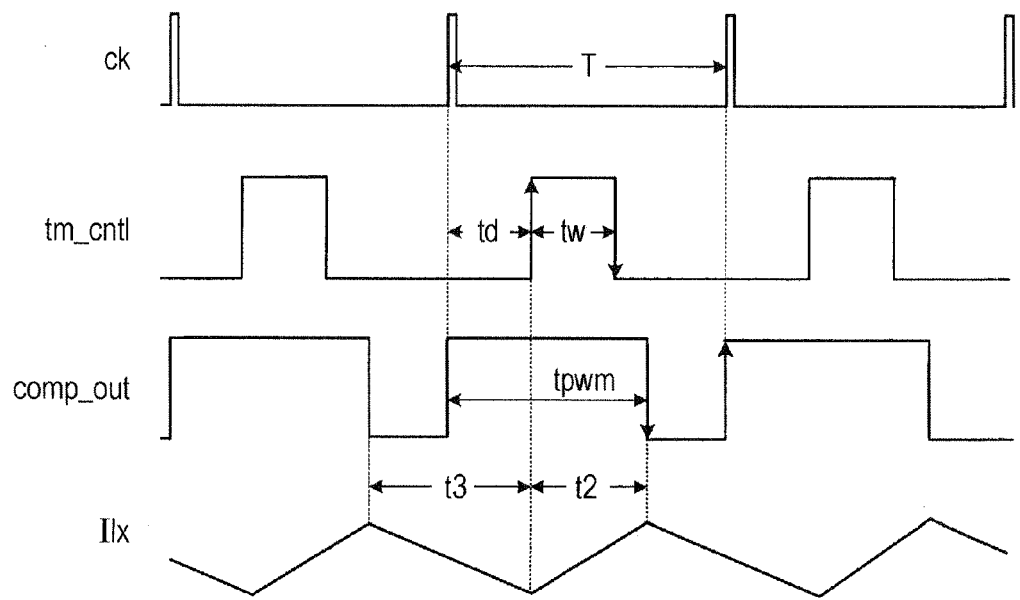
FIG. 28 illustrates typical operation timings in the step-up mode of the step-up/step-down DC-DC converter in FIG. 12.

FIGS. 26, 27, and 28 illustrate typical operation timings in the step-down mode, in the step-up/step-down mode, and in the step-up mode, respectively, of the step-up/step-down DC-DD converter. The switching of the modes will now be described.

As illustrated in FIG. 26, the period in which the comparison result signal comp_out is high is denoted by "tpwm". In the step-down mode, the timing td is longer than tpwm (i.e., td>tpwm). In the step-down mode, expression (4) is satisfied. The third-state period t3 is equal to a period obtained by adding tpwm to a period obtained by subtracting td and tw from one cycle T (i.e., t3=tpwm+(T−td−tw)). Therefore, expression (4) is rewritten as:

$$\frac{Vout}{Vin} = \frac{t3}{T} \quad (4)$$

$$\frac{Vout}{Vin} = \frac{tpwm + (T - td - tw)}{T} \quad (5)$$

In the step-up/step-down mode, tpwm is longer than td and is shorter than a period of the sum of td and tw (i.e., td<tpwm<td+tw). In the step-up/step-down mode, the increases/decreases in the coil current Ilx in the first state, the second state, and the third state are given as i1 in expression (6), i2 in expression (7), and i3 in expression (8), respectively.

$$i1 = \frac{Vin}{L} t1 \quad (6)$$

$$i2 = \frac{-Vout}{L} t2 \quad (7)$$

$$i3 = \frac{Vin - Vout}{L} t3 \quad (8)$$

In a steady-state condition, the amounts of increase and decrease in the coil current in the states are equal to each other, and thus satisfy:

$$i1+i2+i3=0 \quad (9)$$

It follows that:

$$\frac{Vin}{L} t1 - \frac{Vout}{L} t2 + \frac{Vin - Vout}{L} t3 = 0 \quad (10)$$

Simplification of the expression yields:

$$\frac{Vout}{Vin} = \frac{t1 + t3}{t2 + t3} \quad (11)$$

As illustrated in FIG. 27, the first-state period t1 is equal to a period obtained by subtracting td from tpwm (t1=tpwm−td). The second-state period t2 is equal to a period obtained by summing td and tw and subtracting tpwm therefrom (t2=td+tw−tpwm). The third-state period t3 is equal to a period obtained by subtracting tw from T (t3=T−tw). Therefore, expression (11) is rewritten as:

$$\frac{Vout}{Vin} = \frac{(tpwm - td) + (T - tw)}{(td + tw - tpwm) + (T - tw)} \quad (12)$$

In the step-up mode, tpwm is longer than the period of the sum of td and tw (td+tw<tpwm). In the step-up mode, expression (13) below is satisfied:

$$\frac{Vout}{Vin} = \frac{T}{t3} \quad (13)$$

As illustrated in FIG. 28, the third-state period t3 is equal to a period obtained by adding td to a period obtained by subtracting tpwm from T (t3=td+(T−tpwm)). Therefore, expression (13) is rewritten as:

$$\frac{Vout}{Vin} = \frac{T}{td + (T - tpwm)} \quad (14)$$

The step-up/step-down DC-DC converter operates in the step-down mode until td and tpwm become equal to each other (td=tpwm). Thus, substituting this relationship into expression (5) derived from the step-down mode yields expression (15): In addition, substituting the relationship into expression (12) derived from the step-up/step-down mode also yields the similar expression (15). This indicates that the step-down mode and the step-up/step-down mode are switched at a border indicated by the input/output relationship expressed by:

$$\frac{Vout}{Vin} = \frac{T - tw}{T} \quad (15)$$

The step-up/step-down DC-DC converter operates in the step-up mode after tpwm becomes equal to the period of the sum of td and tw (tpwm=td+tw). Thus, substituting this relationship into expression (14) derived from the step-up mode yields:

$$\frac{Vout}{Vin} = \frac{T}{T - tw} \quad (16)$$

Further, substituting this relationship into expression (12) also yields the similar expression (16). This indicates that the step-up/step-down mode and the step-up mode are switched at a border indicated by the input/output relationship expressed by expression (16).

A description will now be given of optimization of the high period tw of the timing control signal tm_cntl. It may be understood from expressions (15) and (16) that the high period tw of the timing control signal tm_cntl governs the operating area in the step-up/step-down mode. Therefore, optimizing tw is performed. Since the four switches, i.e., the first to fourth switches, are controlled in the step-up/step-down mode, the operating efficiency is lower than that in the step-down mode and the step-up mode. Accordingly, it is desired that the operation be performed in the step-down mode and the step-up mode as much as possible.

Figure 29:
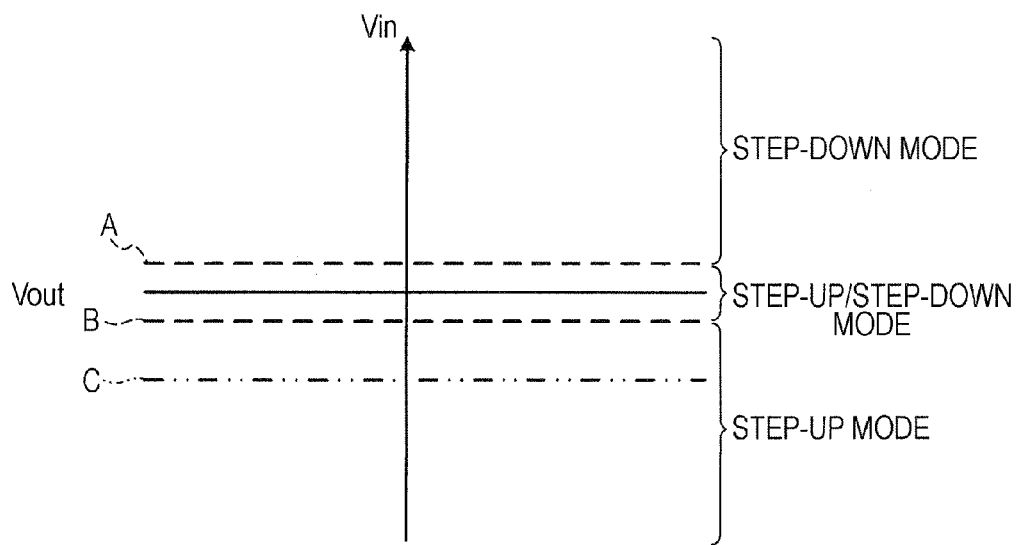
FIG. 29 illustrates an ideal operating area in the step-up/step-down mode.

FIG. 29 illustrates an ideal operating area in the step-up/step-down mode.

As illustrated in FIG. 29, it is ideal to set the step-up/step-down mode between a limit (indicated by a broken line A) at which control may be performed at a maximum on duty in the step-down mode and a limit (indicated by a broken line B) at which control may be performed at a minimum on duty in the step-up mode. The step-up/step-down DC-DC converter of the embodiment may perform control to reduce the minimum ON time, compared to a case in which the timing control signal tm_cntl is not used, and thus may further reduce the step-up/step-down mode operating area. For comparison, in FIG. 29, a long dashed double-short dashed line C indicates a limit at which control may be performed at a minimum on duty in the step-up mode when the timing control signal tm_cntl is not used.

The limit at which control may be performed at the maximum on duty in the step-down mode is similar to the limit of the minimum time in the second state and corresponds to the delay time of the driver. The limit at which control may be performed at the minimum on duty in the step-down mode is similar to the limit of the minimum time in the first state and also corresponds to the delay time of the driver. It is, therefore, desired that tw be set to the delay time of the driver in order to reduce the operating area in the step-up/step-down mode.

Based on expression (5) noted above, the range of td in the step-down mode may be given by:

$$0 \leq ton\_min - tw + \left(1 - \frac{Vout}{Vin}\right)T \leq td \leq T \quad (17)$$

where ton_min indicates the minimum ON time of tpwm.

Based on expression (12) noted above, the range of td in the step-up/step-down mode may be given by:

$$0 \leq ton\_min - tw + \frac{Vin - Vout}{Vin + Vout}T - \frac{Vin}{Vin + Vout}tw \leq td \leq T - tw \quad (18)$$

Based on expression (14) noted above, the range of td in the step-up mode may be given by:

$$0 \leq ton\_min + \left(\frac{Vin}{Vout} - 1\right)T \leq td \leq \frac{Vin}{Vout}T \quad (19)$$

Figure 30:
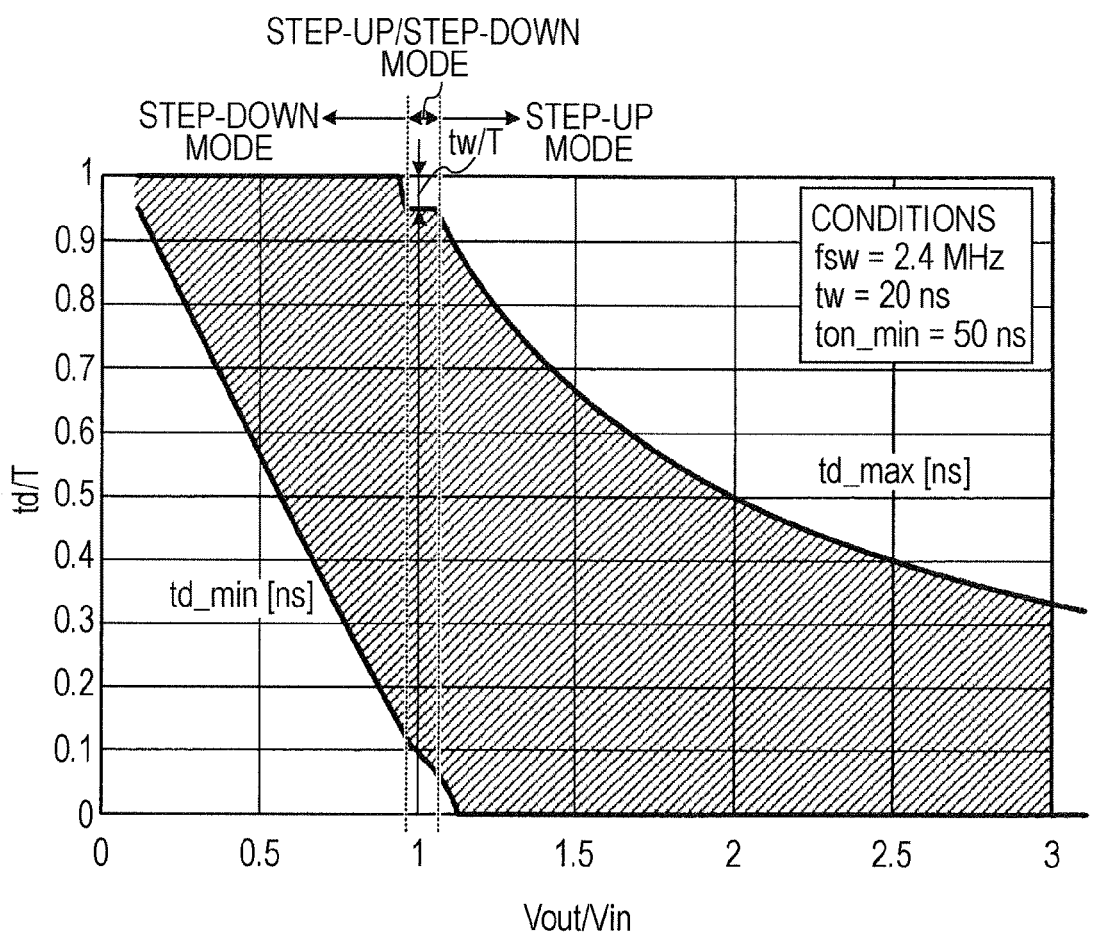
FIG. 30 illustrates the range of td relative to Vout/Vin.

FIG. 30 illustrates the range of td relative to Vout/Vin.

For example, when the switching frequency fsw is about 2.4 MHz, tw is about 20 ns, and ton_min is about 50 ns, expressions (17), (18), and (19) noted above yield that td relative to Vout/Vin is in a hatched range in FIG. 30, for example. Thus, for example, when the specification of Vout/Vin is in the range of about 0.5 to about 1.5, td/T may be fixed to about 0.6, for example. However, when the specification of Vout/Vin is in the range of about 0.2 to about 1.5, for example, td is varied in accordance with Vout/Vin.

Figure 31:
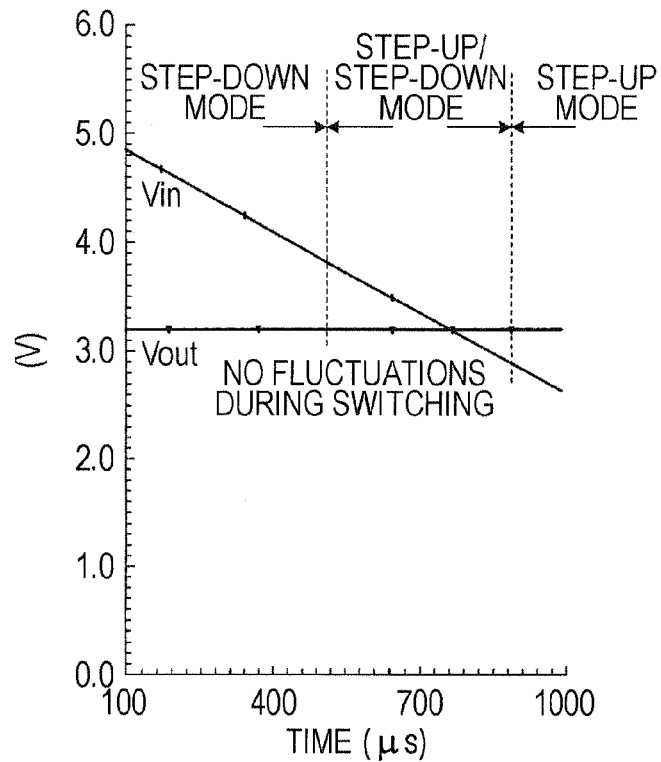
FIG. 31 illustrates fluctuations in the output voltage during mode switching performed by the step-up/step-down DC-DC converter in FIG. 12.
Figure 32:
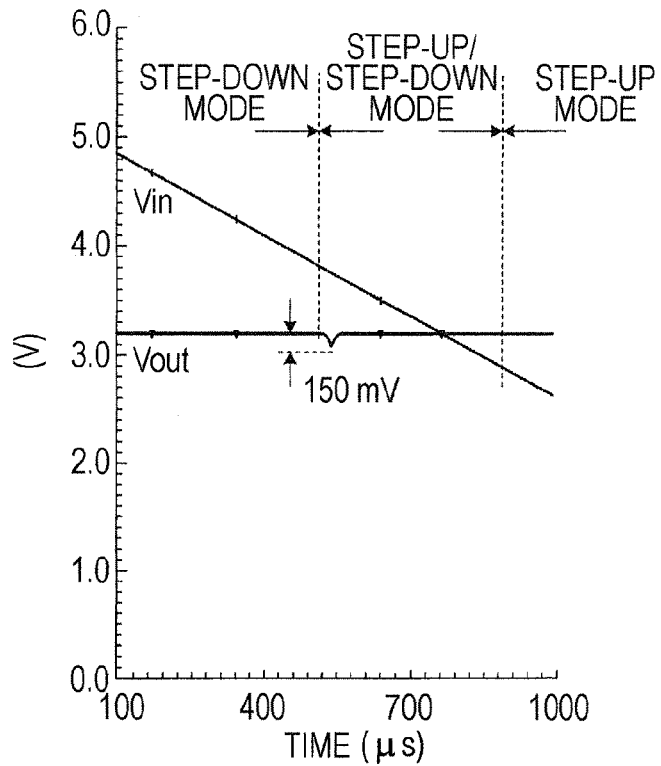
FIG. 32 illustrates fluctuations in the output voltage during mode switching when a timing control signal is not used.

The step-up/step-down DC-DC converter of the embodiment may perform control so that the first-state period ti and the second-state period t2 are shorter than the periods in a case in which the timing control signal tm_cntl is not used. With this arrangement, as illustrated in FIGS. 31 and 32, it may be possible to suppress or prevent significant fluctuations in the output voltage during mode switching. It may be possible to suppress or prevent a reduction in the operating efficiency in the step-up/step-down mode.

FIG. 31 illustrates fluctuations in the output voltage during mode switching performed by the step-up/step-down DC-DC converter in FIG. 12. FIG. 32 illustrates fluctuations in the output voltage during mode switching when the timing control signal is not used. The output-voltage fluctuations illustrated in FIGS. 31 and 32, however, are obtained when the inductance of the coil 13 is about 1.5 μH, the capacitance of the output capacitor 14 is 2.0 μF, the switching frequency is about 2.4 MHz, the output voltage Vout is about 3.2 V, the output current Io is about 400 mA, and the input voltage Vin is changed from about 5.0 V to about 2.5 V per 1 ms, for example. Comparison between FIG. 31 and FIG. 32 clearly depicts that the step-up/step-down DC-DC converter according to the embodiment has almost no fluctuations in the output voltage.

Figure 33:
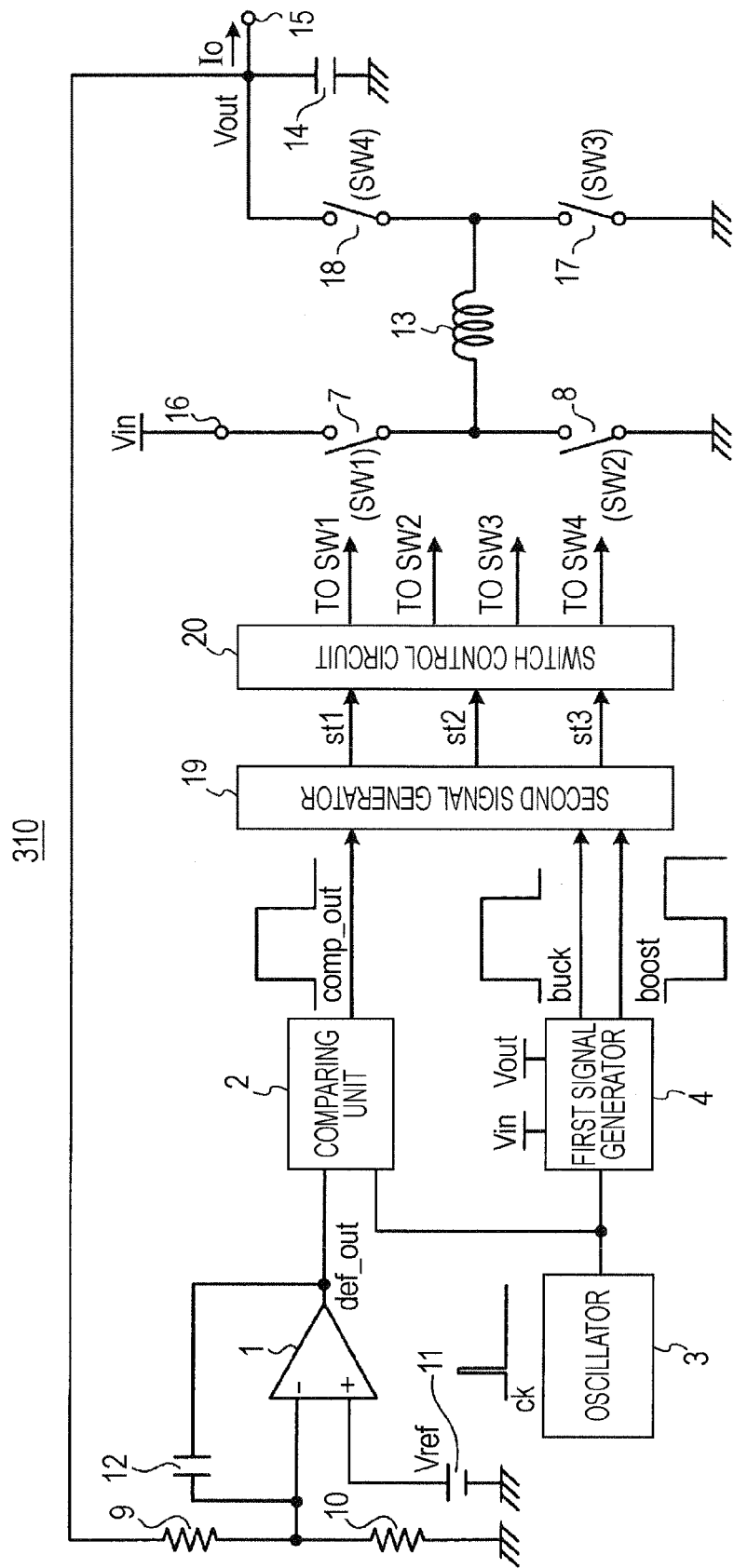
FIG. 33 illustrates a second example of the electronic apparatus including the step-up/step-down DC-DC converter according to the embodiment.

FIG. 33 illustrates a second example of the electronic apparatus including the step-up/step-down DC-DC converter according to the embodiment. As illustrated in FIG. 33, in a step-up DC-DC converter 310 in a second configuration example, the first signal generator 4 generates a boost signal "boost" and a buck signal "buck", instead of the timing control signal tm_cntl, on the basis of the clock signal ck and the input voltage Vin. The second signal generator 19 generates the first state signal st1, the second state signal st2, and the third state signal st3 on the basis of the comparison result signal "comp_out", the boost signal "boost", and the buck signal "buck". Other configurations are analogous to those of the first configuration example of the step-up/step-down DC-DC converter.

Figure 34:
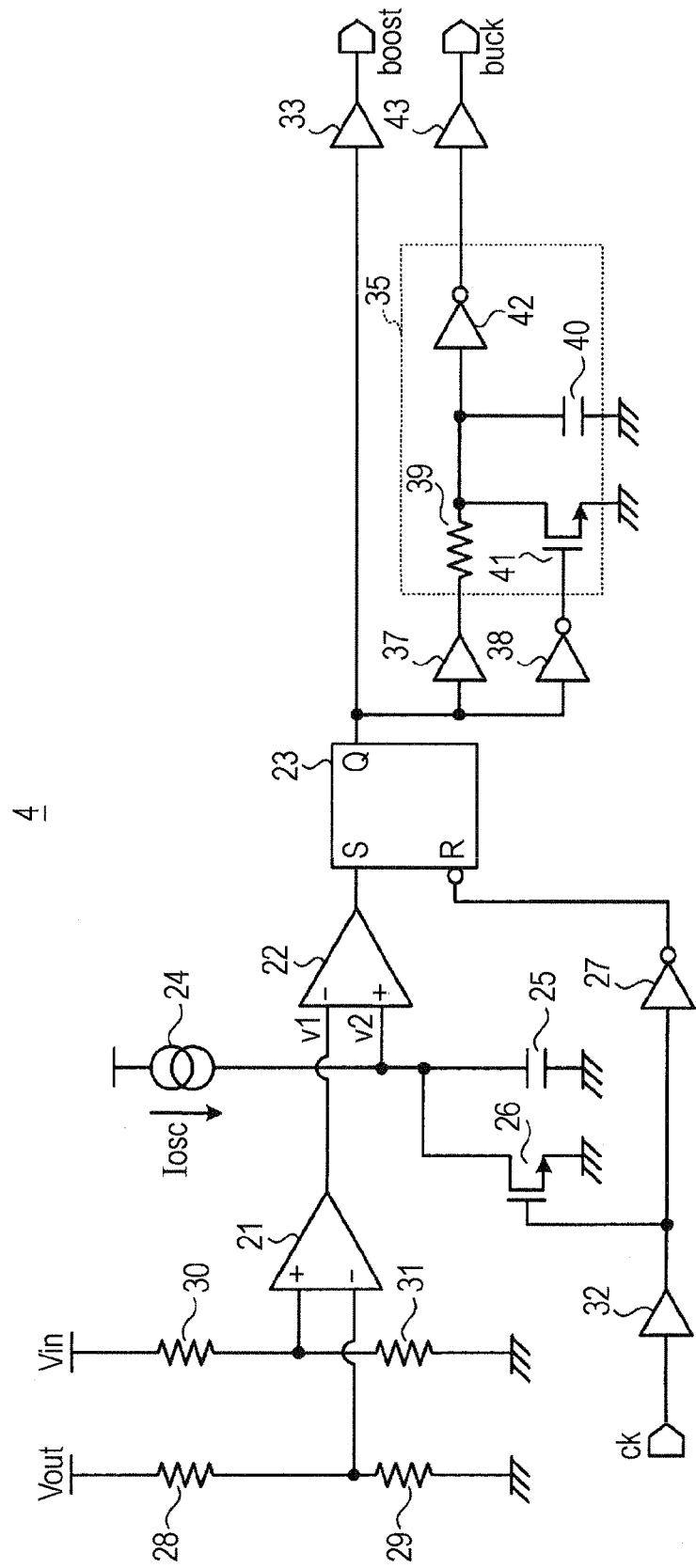
FIG. 34 illustrates an example of a first signal generator in the step-up/step-down DC-DC converter in FIG. 33.
Figure 35:
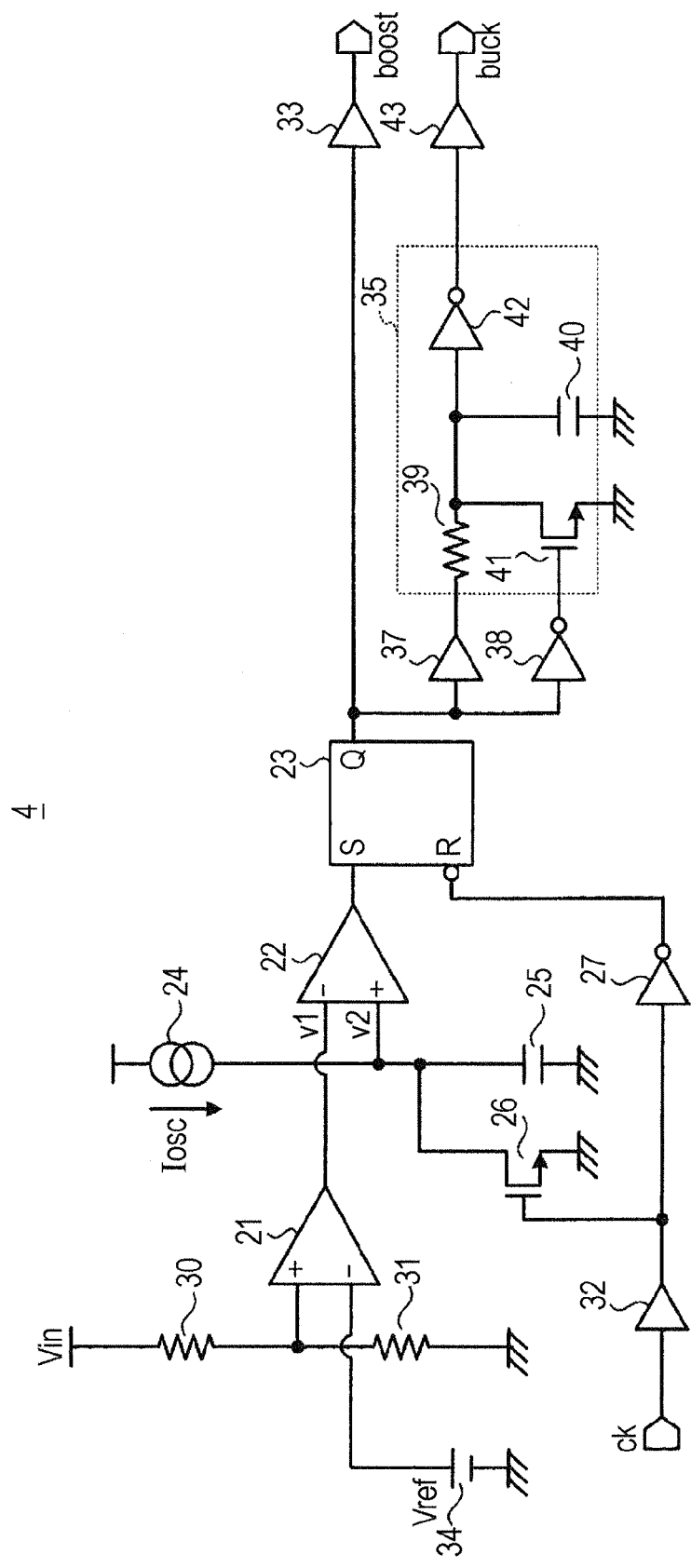
FIG. 35 illustrates another example of the first signal generator in the step-up/step-down DC-DC converter in FIG. 33.
Figure 36:
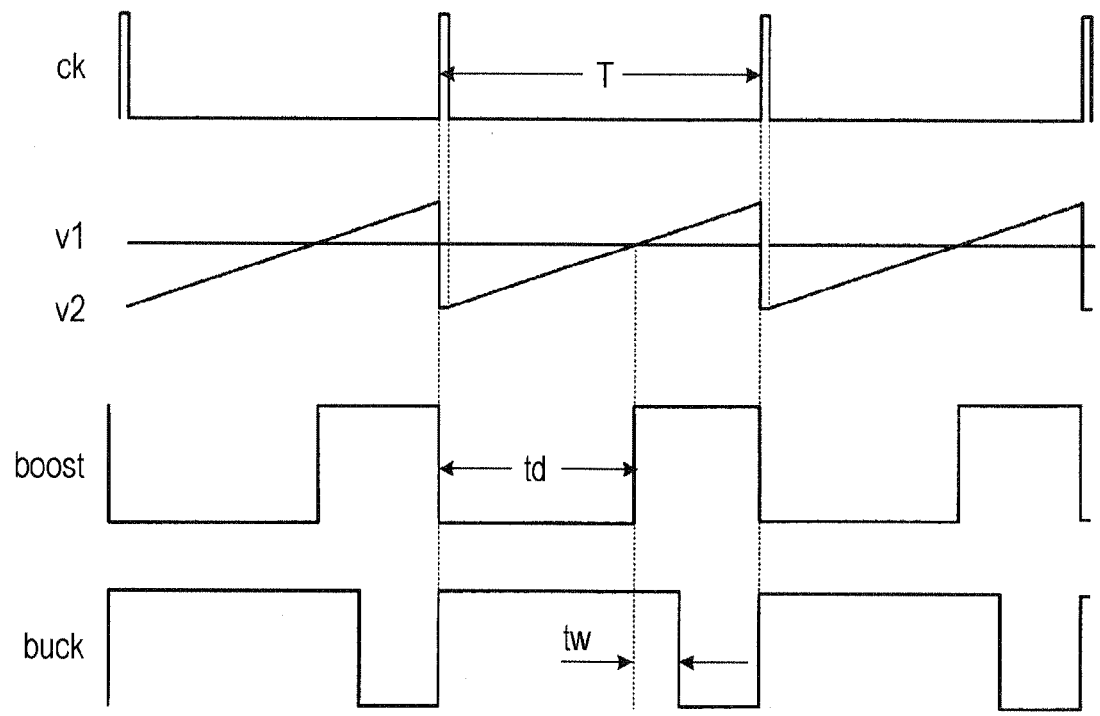
FIG. 36 illustrates operation timings of the first signal generator in the step-up/step-down DC-DC converter in FIG. 33.

FIG. 34 illustrates an example of the first signal generator in the step-up/step-down DC-DC converter in FIG. 33 and FIG. 35 illustrates another example of the first signal generator in the step-up/step-down DC-DC converter in FIG. 33. FIG. 36 illustrates operation timings of the first signal generator in the step-up/step-down DC-DC converter in FIG. 33.

As illustrated in FIG. 34 or 35, the first signal generator 4 directly outputs, as the boost signal "boost", the output signal of the RS flip-flop circuit 23 via a buffer 33 and directly outputs, as the buck signal "buck", the output signal of the delay circuit 35 via a buffer 43. That is, in the second configuration example, the first signal generator 4 directly outputs two signals (i.e., the output signal of the RS flip-flop circuit 23 and the output signal of the delay circuit 35) without calculating a logical AND. The two signals are used to provide the timing control signal tm_cntl in the first configuration example (see FIG. 16 or 17). Thus, as illustrated in FIG. 36, the timing td is timing at which the boost signal "boost" goes from low to high. The delay time tw is a time from timing at which the boost signal "boost" goes from low to high to timing at which the buck signal "buck" goes from high to low. The period of the delay time tw corresponds to the high period of the timing control signal tm_cntl in the first configuration example described above.

Figure 37:
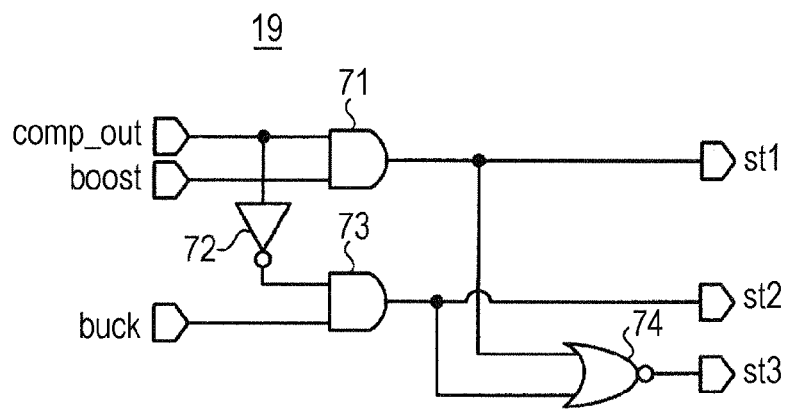
FIG. 37 illustrates an example of a second signal generator in the step-up/step-down DC-DC converter in FIG. 33.
Figure 38:
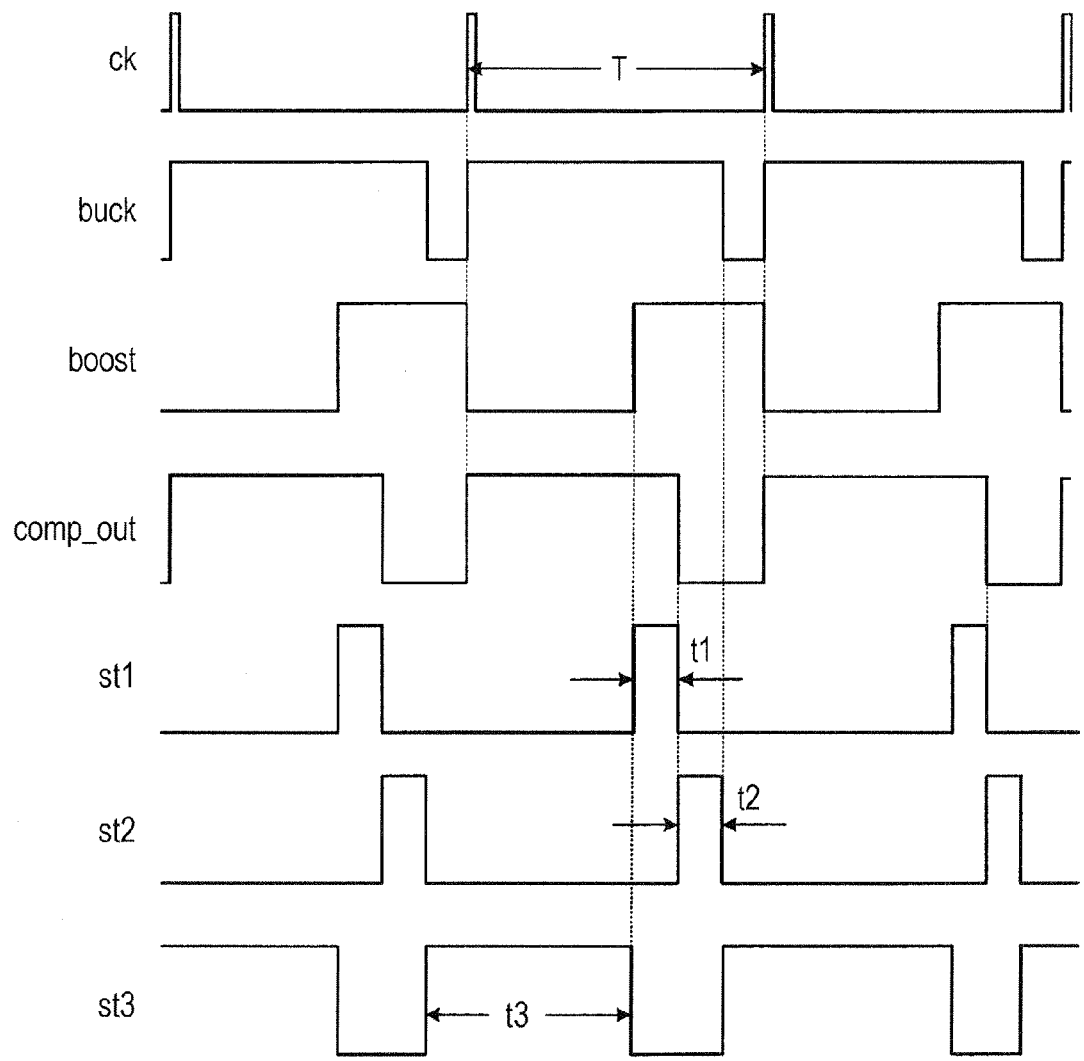
FIG. 38 illustrates operation timings of the second signal generator in the step-up/step-down DC-DC converter in FIG. 33.
Figure 39:
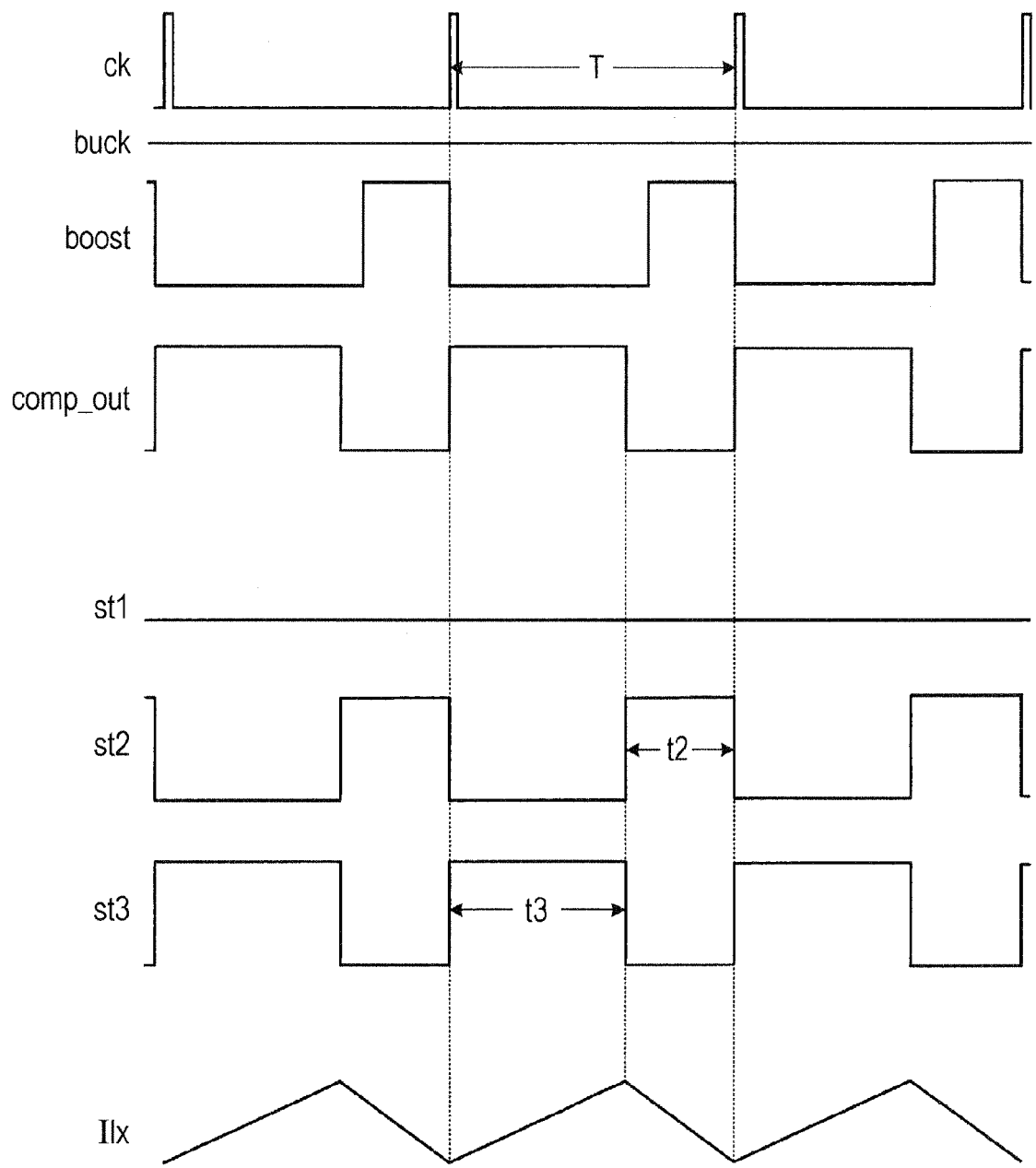
FIG. 39 illustrates operation timings in the step-down mode in the step-up/step-down DC-DC converter in FIG. 33.
Figure 40:
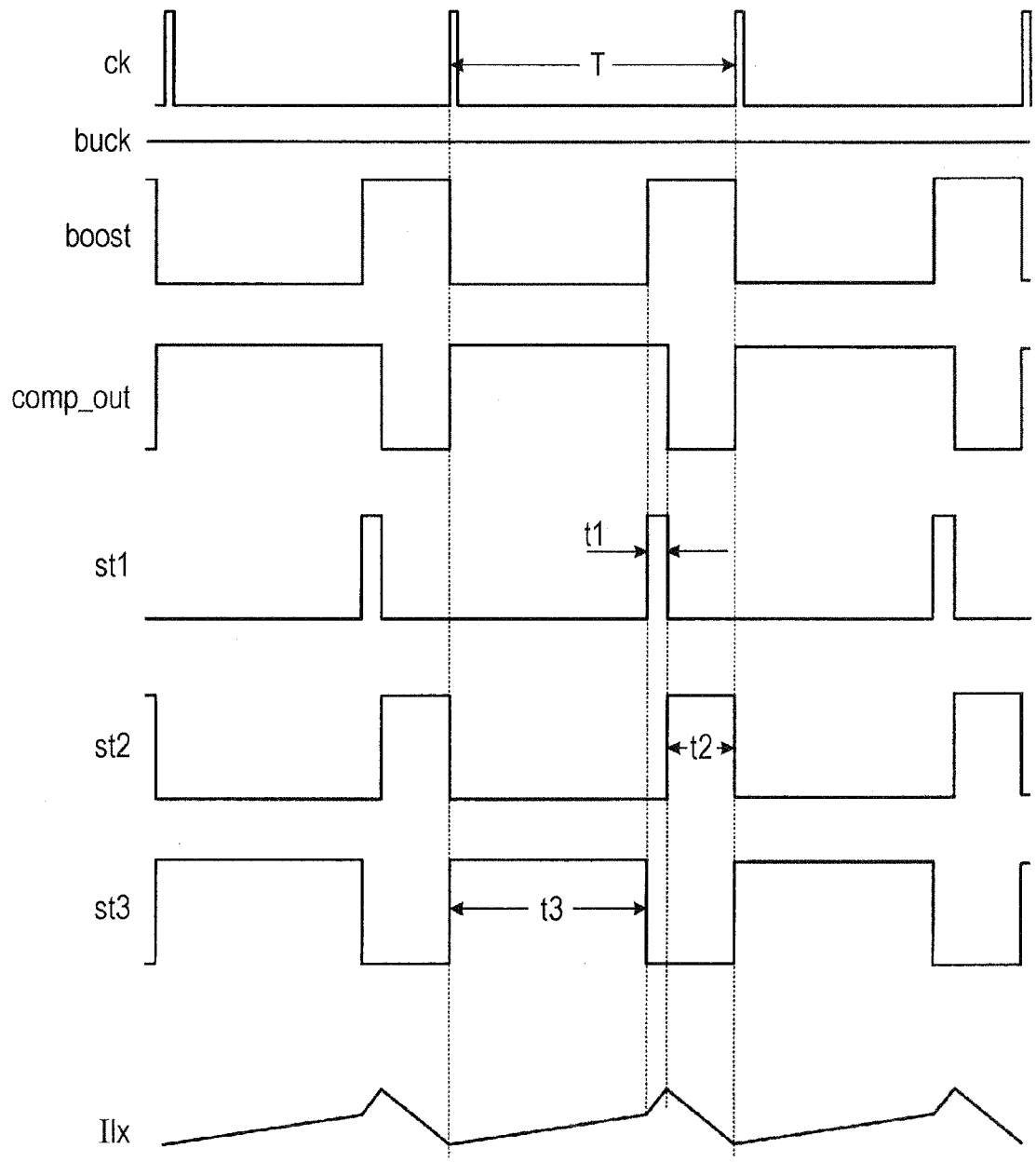
FIG. 40 illustrates operation timings in the step-up/step-down mode in the step-up/step-down DC-DC converter in FIG. 33.
Figure 41:
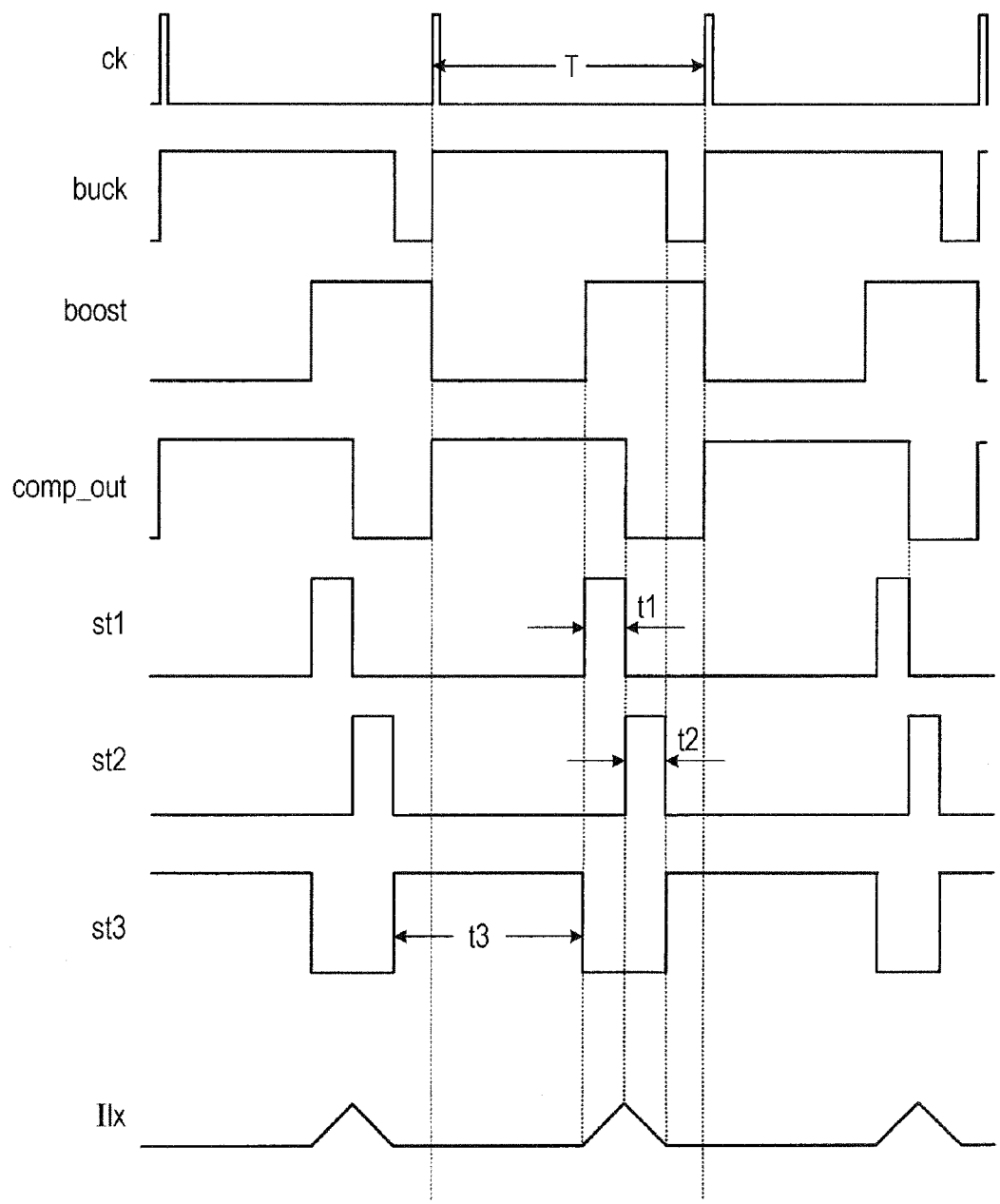
FIG. 41 illustrates operation timings in the step-up/step-down mode in the step-up/step-down DC-DC converter in FIG. 33.
Figure 42:
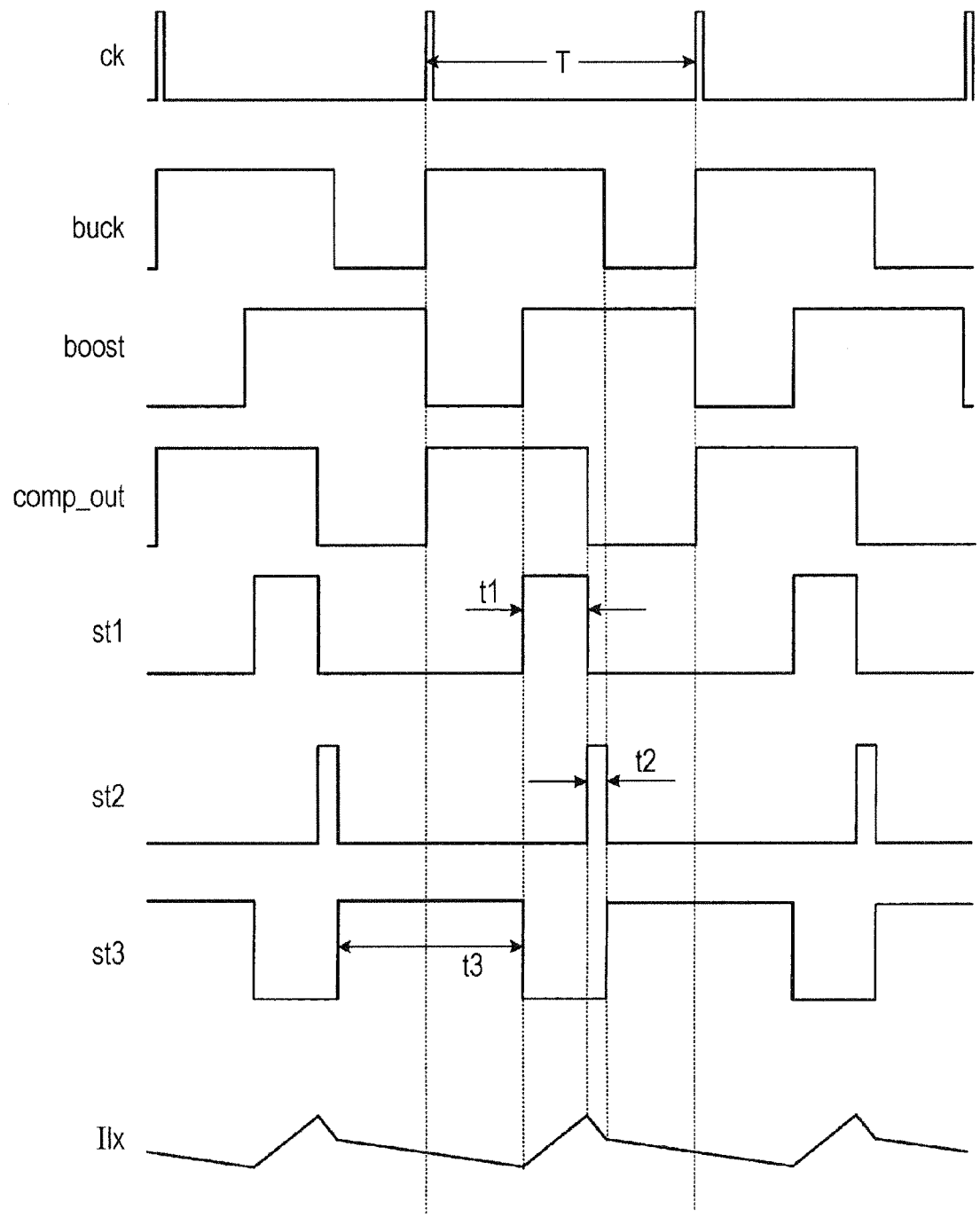
FIG. 42 illustrates operation timings in the step-up/step-down mode in the step-up/step-down DC-DC converter in FIG. 33.
Figure 43:
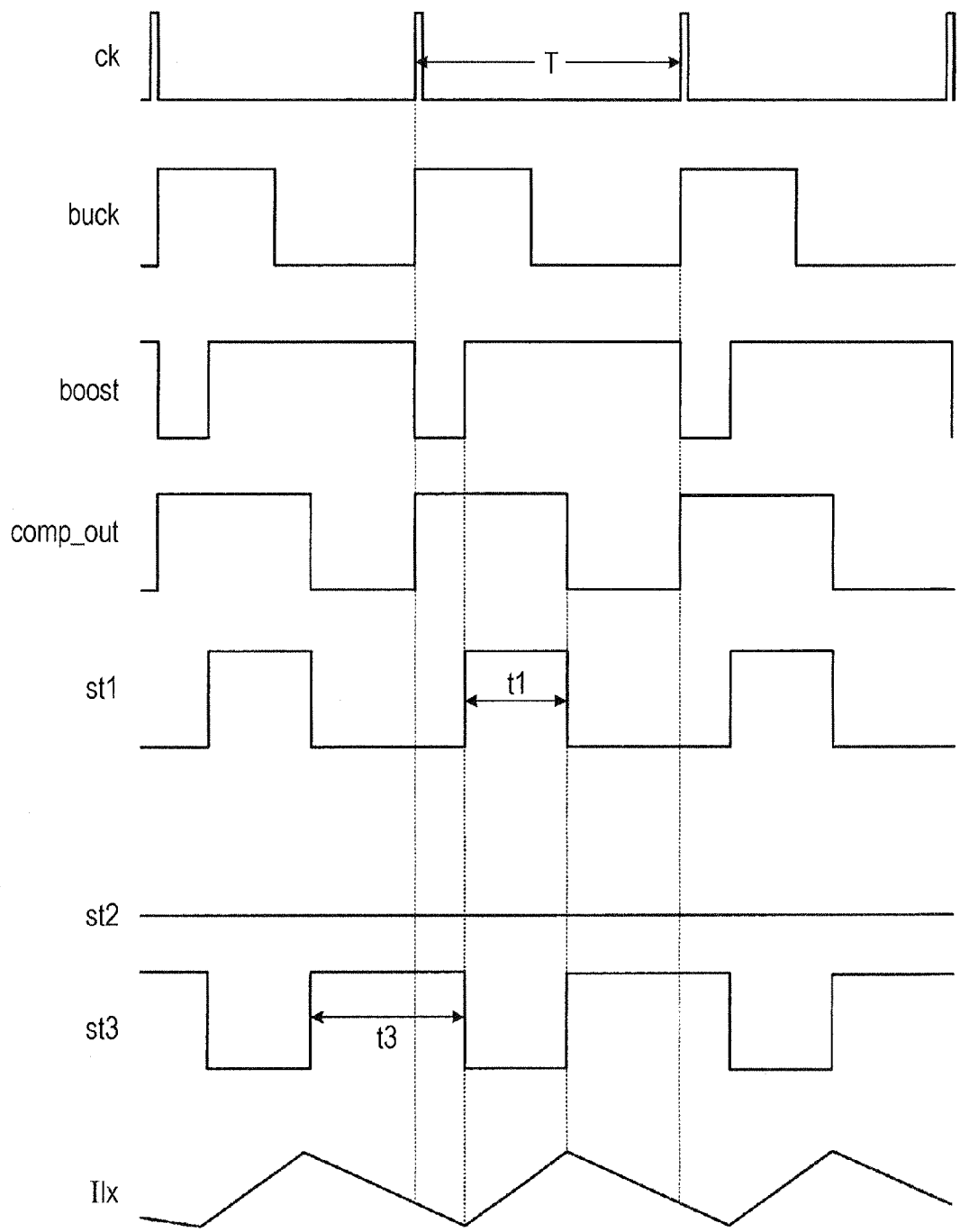
FIG. 43 illustrates operation timings in the step-up mode in the step-up/step-down DC-DC converter in FIG. 33.

FIG. 37 illustrates an example of the second signal generator in the step-up/step-down DC-DC converter in FIG. 33, and FIG. 38 illustrates operation timings of the second signal generator in the step-up/step-down DC-DC converter in FIG. 33.

As illustrated in FIG. 37, the second signal generator 19 serves as a logic circuit for generating the first state signal st1, the second state signal st2, and the third state signal st3 on the basis of the comparison result signal "comp_out", the boost signal "boost", and the buck signal "buck". An AND circuit 71 outputs, as the first state signal st1, a logical AND of the comparison result signal "comp_out" and the boost signal "boost". An inverter 72 inverts the comparison result signal comp_out. An AND circuit 73 outputs a logical AND of the output signal of the inverter 72 and the buck signal "buck" as the second state signal st2. A NOR circuit 74 outputs a logical NOR of the first state signal st1 and the second state signal st2 as the third state signal st3. Since the timing control signal "tm_cntl" in the first configuration example described above is merely divided into the boost signal "boost" and the buck signal "buck", the operation timings of the second signal generator 19 are analogous to the operation timings (see FIG. 20) of the second signal generator 19 in the first configuration example, as illustrated in FIG. 38.

FIGS. 39 to 43 illustrate operation timings of the second configuration example of the step-up/step-down DC-DC converter. Since the timing control signal "tm_cntl" in the first configuration example described above is merely divided into the boost signal "boost" and the buck signal "buck", the operation timings of the second configuration example are analogous to the operation timings (see FIGS. 21 to 25) of the first configuration example, as illustrated in FIGS. 39 to 43. The operation states in FIGS. 39, 40, 41, 42, and 43 correspond to the operation states in FIGS. 21, 22, 23, 24, and 25, respectively.

Figure 44:
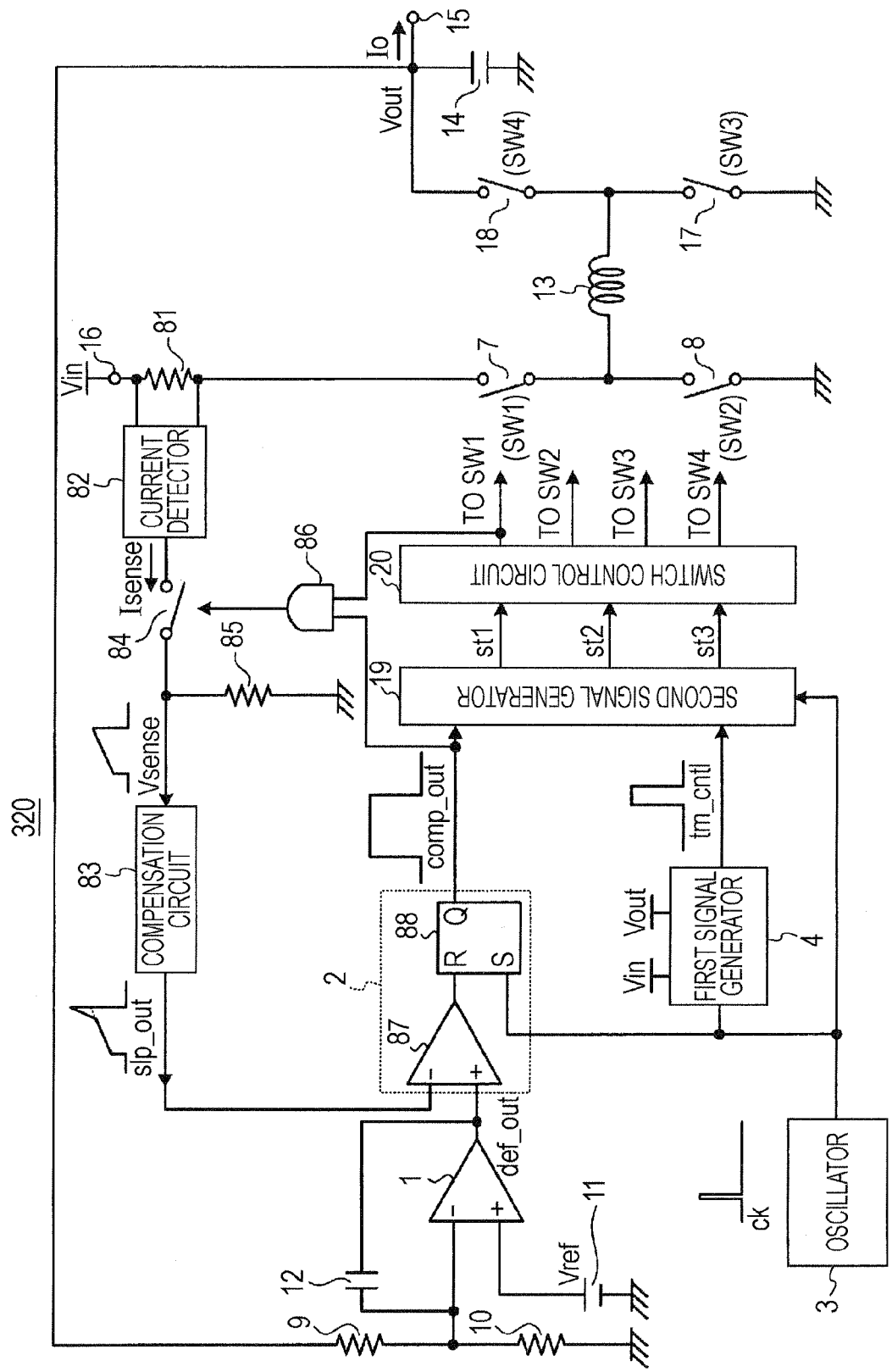
FIG. 44 illustrates a third example of the electronic apparatus including the step-up/step-down DC-DC converter according to the embodiment.

FIG. 44 illustrates a third example of the electronic apparatus including the step-up/step-down DC-DC converter according to the embodiment.

As illustrated in FIG. 44, a step-up/step-down DC-DC converter 320 in a third configuration example functions as a current mode (C-mode) DC-DC converter for detecting a peak of coil current. A first sense resistor 81 is coupled between the first switch 7 and the input terminal 16. The first sense resistor 81 converts current flowing through the coil 13 into a voltage. A current detector 82 is coupled to the first sense resistor 81. The current detector 82 converts a voltage, input from the first sense resistor 81, into current "Isense". The current detector 82 is coupled to a compensation circuit 83 via a switch 84. The opening and closing of the switch 84 is controlled by an output signal of an AND circuit 86. The AND circuit 86 outputs a logical AND of the comparison result signal comp_out output from the comparing unit 2 and the first switch signal output from the switch control circuit 20. When the switch 84 is in an ON state, current sensing is executed.

An eighth resistor 85 is coupled to the node of the current detector 82 and the compensation circuit 83. The eighth resistor 85 converts the current Isense into a voltage Vsense. The voltage Vsense has a value obtained by multiplying the current Isense by the resistance value of the eighth resistor 85. The compensation circuit 83 performs slope compensation on the voltage Vsense to output a slope compensation output slp_out. This comparing unit 2 has a second comparator 87 and an SR(set-reset) flip-flop circuit 88. The slope compensation output slp_out and the difference output signal def_out are input to an inverting input terminal and a non-inverting input terminal of the second comparator 87, respectively. The clock signal ck and an output signal of the second comparator 87 are input to a set terminal and a reset terminal of the SR flip-flop circuit 88, respectively. The SR flip-flop circuit 88 outputs the comparison result signal comp_out via a data terminal.

The current detector 82, the compensation circuit 83, the switch 84, the eighth resistor 85, and the AND circuit 86 are integrated into a single IC together with, for example, the first differential amplifier 1, the comparing unit 2, the oscillator 3, the first signal generator 4, the second signal generator 19, and the switch control circuit 20. The first sense resistor 81 may be externally attached to the IC or may be integrated into the IC. Other configurations are analogous to those of the first configuration example of the step-up/step-down DC-DC converter. When the first switch 7 is implemented by a transistor (e.g., a metal oxide semiconductor field effect transistor (MOSFET)), the ON resistance of the transistor of the first switch 7 may be utilized as the first sense resistor 81.

Figure 45:
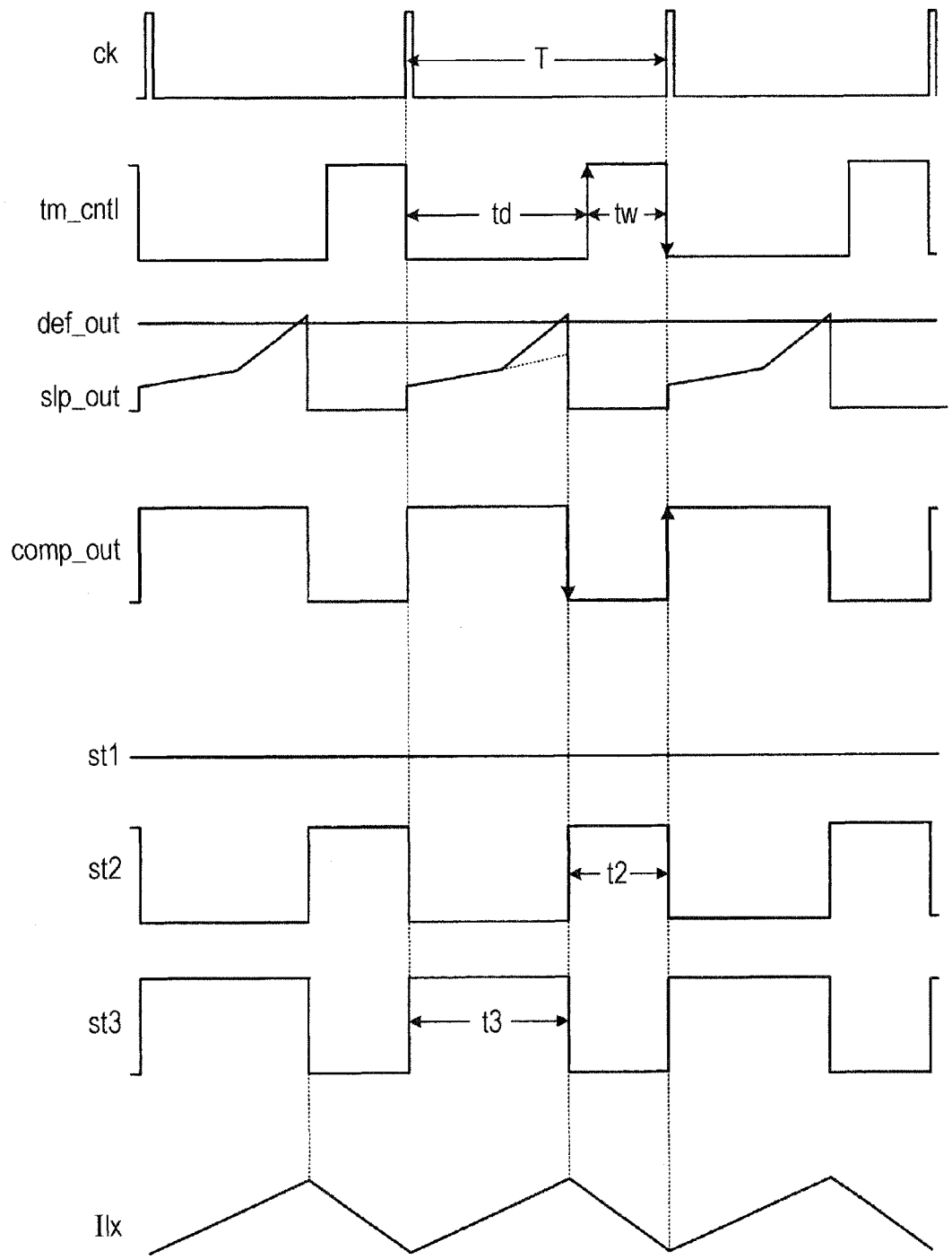
FIG. 45 illustrates operation timings in the step-down mode in the step-up/step-down DC-DC converter in FIG. 44.
Figure 46:
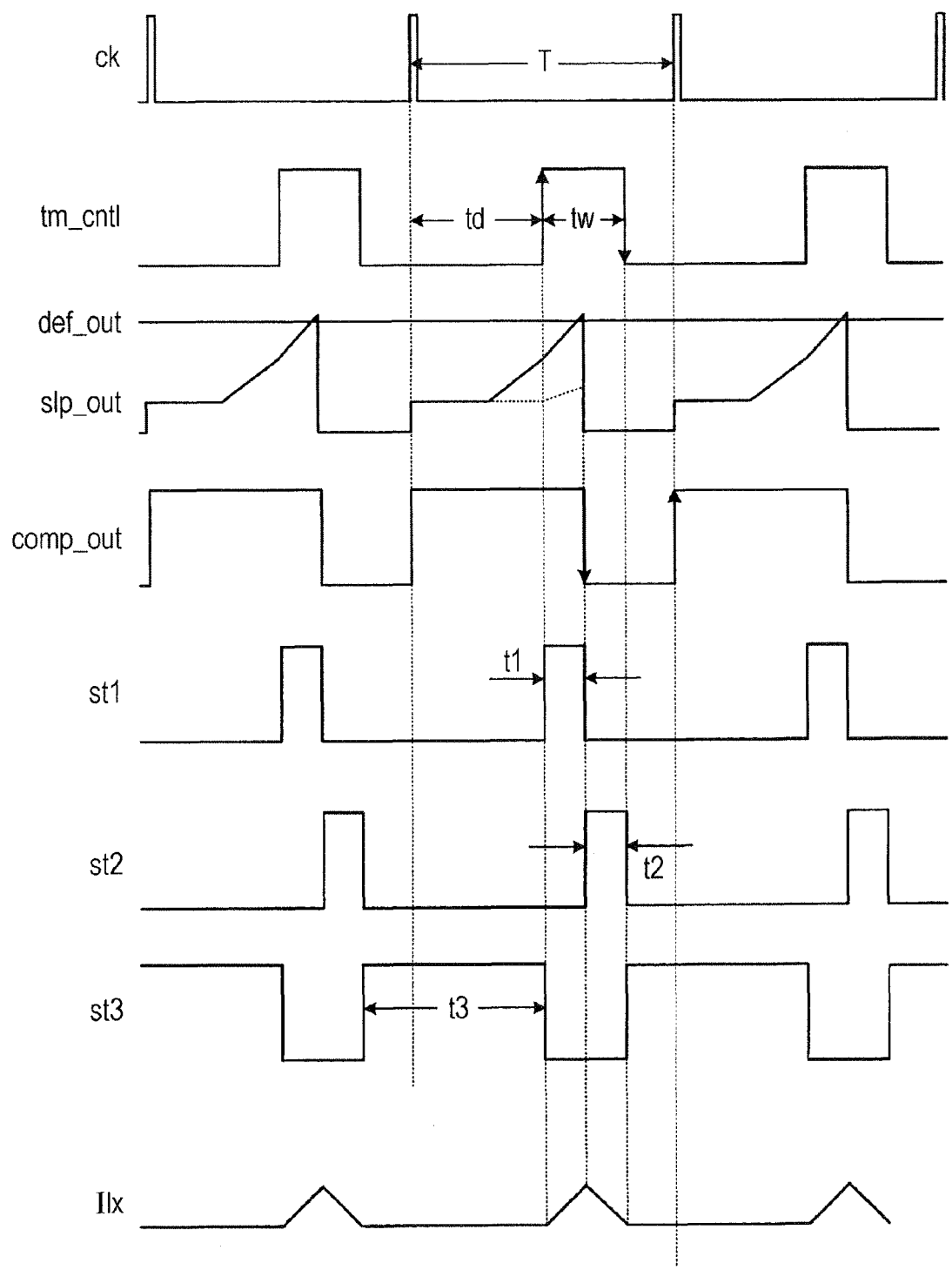
FIG. 46 illustrates operation timings in the step-up/step-down mode of the step-up/step-down DC-DC converter in FIG. 44.
Figure 47:
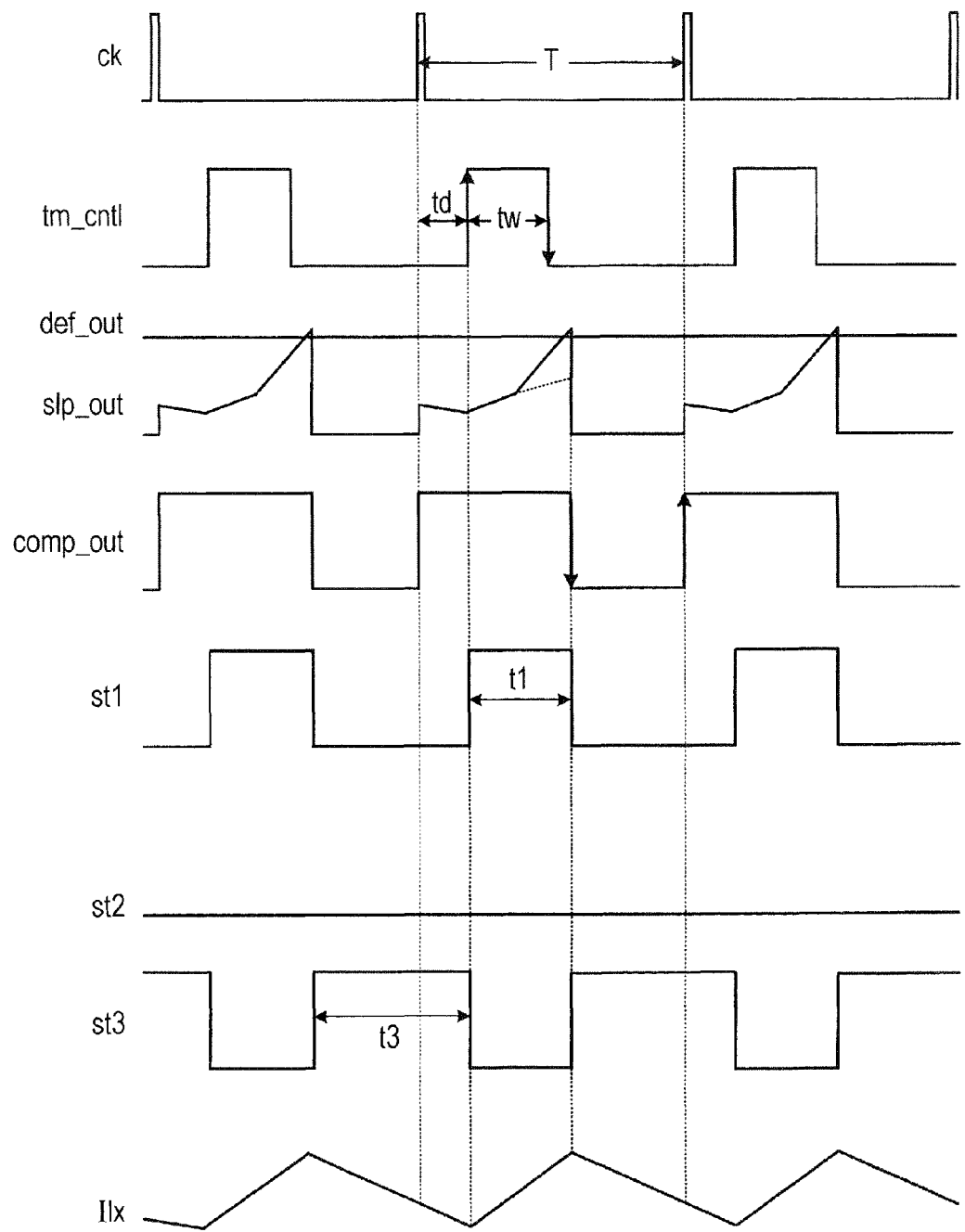
FIG. 47 illustrates operation timings in the step-up mode of the step-up/step-down DC-DC converter in FIG. 44.

FIGS. 45 to 47 illustrate operation timings in the third configuration example of the step-up/step-down DC-DC converter. For example, FIG. 45 illustrates operation timings in the step-down mode, FIG. 46 illustrates operation timings in the step-up/step-down mode, and FIG. 47 illustrates operation timings in the step-up mode. As illustrated in FIGS. 45 to 47, when the clock signal ck goes from low to high, the SR flip-flop circuit 88 is set and thus the comparison result signal comp_out goes from low to high. When the comparison result signal comp_out is high, the first switch signal goes high. Thus, the output signal of the AND circuit 86 goes high and the switch 84 enters an ON state. Consequently, current sensing is started. The second comparator 87 compares the slope compensation output slp_out with the difference output signal def_out. When the comparison depicts that the slope compensation output slp_out reaches the difference output signal def_out, the SR flip-flop circuit 88 is reset. Thus, the comparison result signal comp_out goes from high to low. The comparison result signal comp_out is generated as described above. Because of the relationship between the comparison result signal comp_out and the timing control signal tm_cntl output from the first signal generator 4, the operation timings in the third configuration example are analogous to the operation timings (see FIGS. 21 to 25) in the first configuration example.

Figure 48:
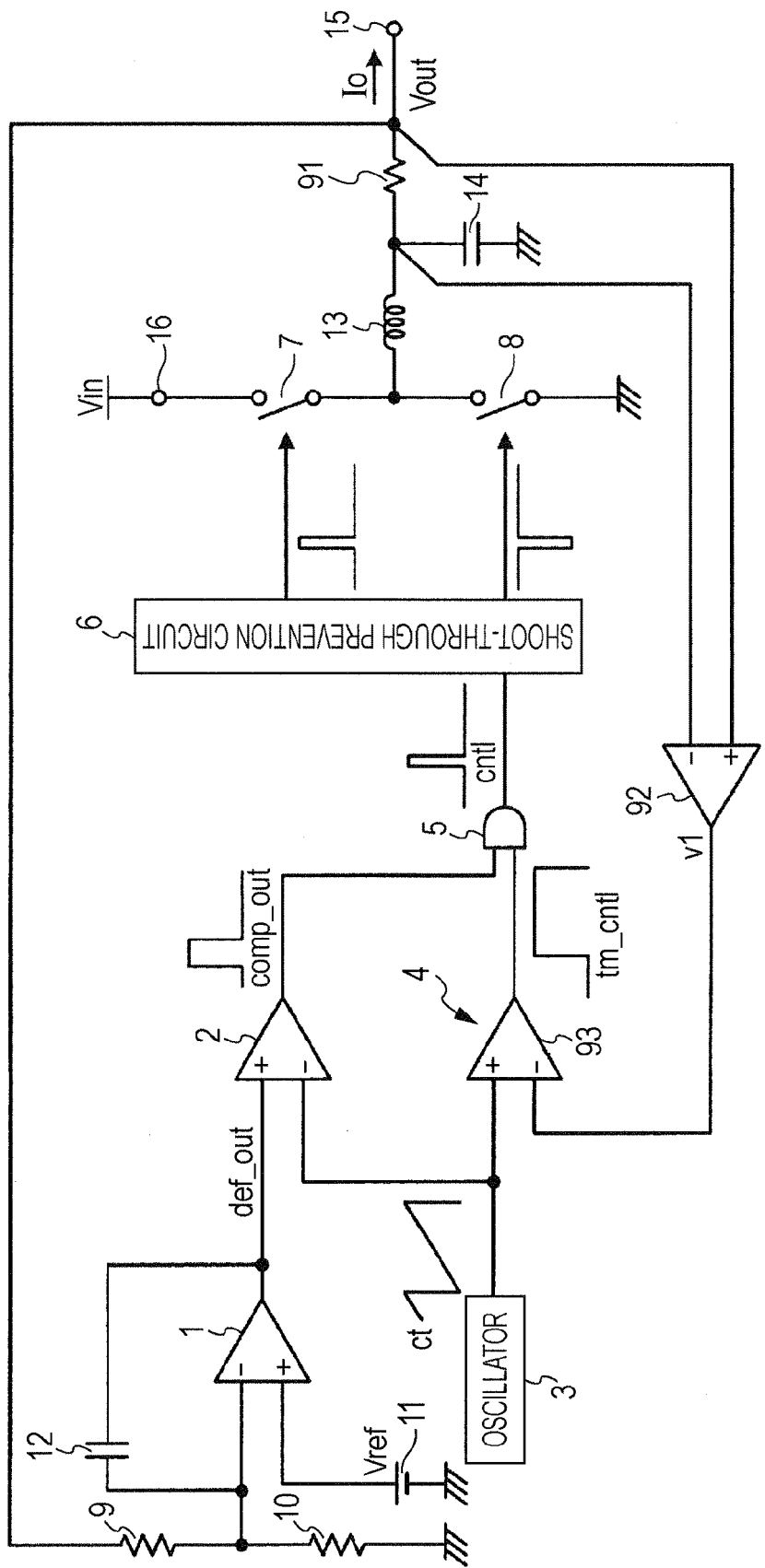
FIG. 48 illustrates a third example of the electronic apparatus including the step-down DC-DC converter according to the embodiment.

FIG. 48 illustrates a third example of the electronic apparatus including the step-down DC-DC converter according to the embodiment.

As illustrated in FIG. 48, in a step-down DC-DC converter 220 in a third configuration example, a second sense resistor 91 is coupled between the output terminal 15 and the node of the coil 13 and the output capacitor 14. The first signal generator 4 includes a third differential amplifier 92 and a third comparator 93. The second sense resistor 91 converts the output current Io into a voltage. An inverting input terminal of the third differential amplifier 92 is coupled to the node of the coil 13 and the output capacitor 14. A non-inverting input terminal of the third differential amplifier 92 is coupled to the output terminal 15. Thus, the third differential amplifier 92 outputs a difference in voltages at two opposite ends of the second sense resistor 91 as the difference signal v1.

When the output current Io increases, the difference signal v1 decreases, and conversely, when the output current Io decreases, the difference signal v1 increases. The difference signal v1 is input to an inverting input terminal of the third comparator 93. The first periodic signal ct is input from the oscillator 3 to a non-inverting input terminal of the third comparator 93. The third comparator 93 outputs the timing control signal tm_cntl to the second signal generator 5, such as the AND circuit. When the voltage of the first periodic signal ct is lower than the voltage of the difference signal v1, the timing control signal tm_cntl goes low, and when the voltage of the first periodic signal ct reaches the voltage of the difference signal v1, the timing control signal tm_cntl goes high.

Other configurations are analogous to those of the second configuration example of the step-down DC-DC converter. The third differential amplifier 92 and the third comparator 93 are integrated into a single IC together with, for example, the first differential amplifier 1, the comparing unit 2, the oscillator 3, the second signal generator 5, and the shoot-through prevention circuit 6. The second sense resistor 91 may be externally attached to the IC or may be integrated into the IC.

Figure 49:
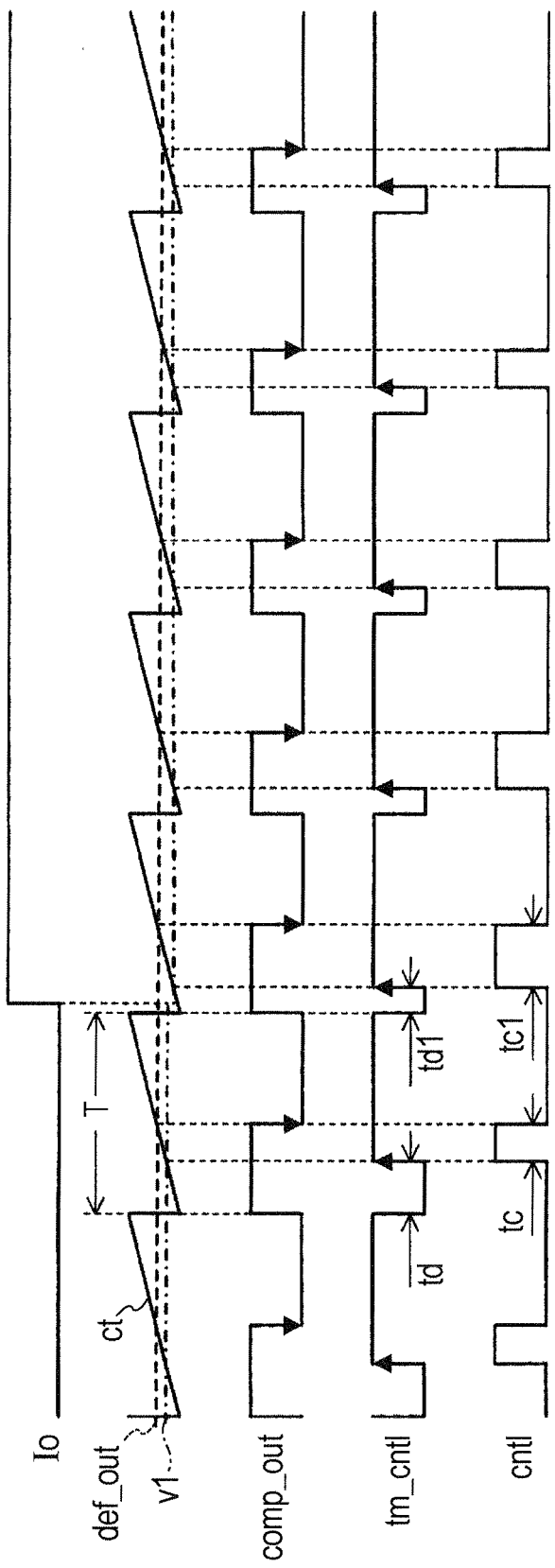
FIG. 49 illustrates operation timings of the step-down DC-DC converter in FIG. 48.

FIG. 49 illustrates operation timings of the step-down DC-DC converter in FIG. 48.

As illustrated in FIG. 49, when a load (not illustrated in FIG. 48) coupled to the output terminal 15 changes from light load to heavy load, the output current Io increases. In this case, when the current that flows from the supply source of the input voltage Vin via the input terminal 16 may not follow an increase in the output current Io, the amount of increase in the output current Io is compensated for by charge stored in the output capacitor 14. And, as such, the output voltage Vout decreases temporarily. When the output current Io increases, a voltage drop at the second sense resistor 91 becomes larger and thus the difference between the voltages at two opposite ends of the second sense resistor 91 increases. Thus, the difference signal v1 (indicated by a dashed-dotted line in FIG. 49) decreases with an increase in the output current Io.

When the difference signal v1 decreases, the period in which the voltage of the first periodic signal ct in the third comparator 93 is lower than the voltage of the difference signal v1 decreases. That is, the timing td at which the timing control signal tm_cntl goes from low to high becomes earlier. In FIG. 49, the timing of the rising of the timing control signal tm_cntl has shifted from td to td1 (td1<td). On the other hand, immediately after the output current Io increases, the comparison result signal comp_out does not exhibit a large change. Thus, the ON period of the control signal cntl is increased by an amount corresponding to the early timing of the rising of the timing control signal tm_cntl. In FIG. 49, the ON period of the control signal cntl has shifted from tc to tc1 (tc1>tc). As a result of the increase in the ON period of the control signal cntl, the amount of current flowing from the supply source of the input voltage Vin via the input terminal 16 increases and thus the temporarily decreased output voltage Vout returns to its original voltage in a short period of time.

Figure 50:
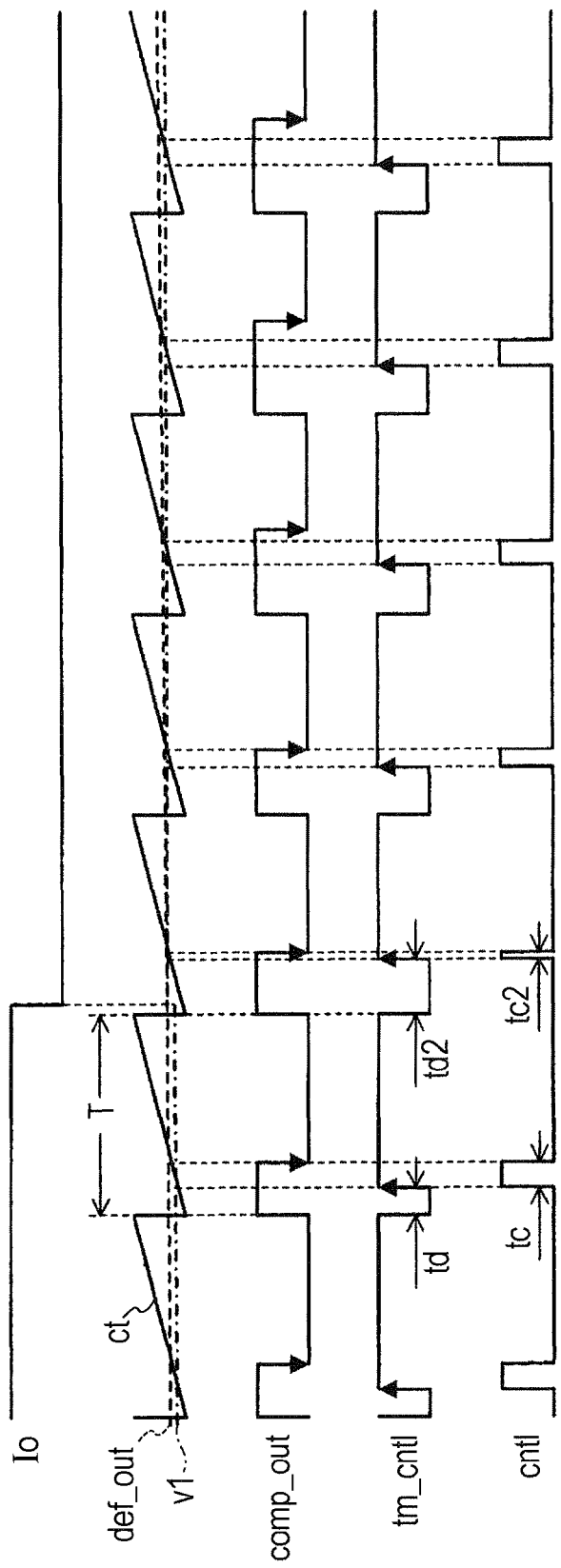
FIG. 50 illustrates operation timings of the step-down DC-DC converter in FIG. 48.

FIG. 50 illustrates operation timings of the step-down DC-DC converter in FIG. 48.

As illustrated in FIG. 50, when the load changes from heavy load to light load, the output current Io decreases. In this case, the current that flows from the supply source of the input voltage Vin via the input terminal 16 may not follow a decrease in the output current Io, and an excessive amount of current flowing through the coil 13 flows to the output capacitor 14. As a result, the amount of charge stored in the output capacitor 14 increases and thus the output voltage Vout increases temporarily. When the output current Io decreases, a voltage drop at the second sense resistor 91 becomes small and thus the difference between the voltages at two opposite ends of the second sense resistor 91 decreases. Thus, the difference signal v1 (indicated by a dashed-dotted line in FIG. 50) increases with a decrease in the output current Io.

When the difference signal v1 increases, the period in which the voltage of the first periodic signal ct in the third comparator 93 is lower than the voltage of the difference signal v1 increases. Thus, the timing td at which the timing control signal tm_cntl goes from low to high is delayed. In FIG. 50, the timing of the rising of the timing control signal tm_cntl has shifted from td to td2 (td2>td). Immediately after the output current Io decreases, the comparison result signal comp_out does not exhibit a large change, and thus the ON period of the control signal cntl is reduced by an amount corresponding to the delayed timing of the rising of the timing control signal tm_cntl. In FIG. 50, the ON period of the control signal cntl has shifted from tc to tc2 (tc2<tc). As a result of the decrease in the ON period of the control signal cntl, the amount of current flowing from the supply source of the input voltage Vin via the input terminal 16 decreases and thus the temporarily increased output voltage Vout returns to its original voltage in a short period of time.

Figure 51:
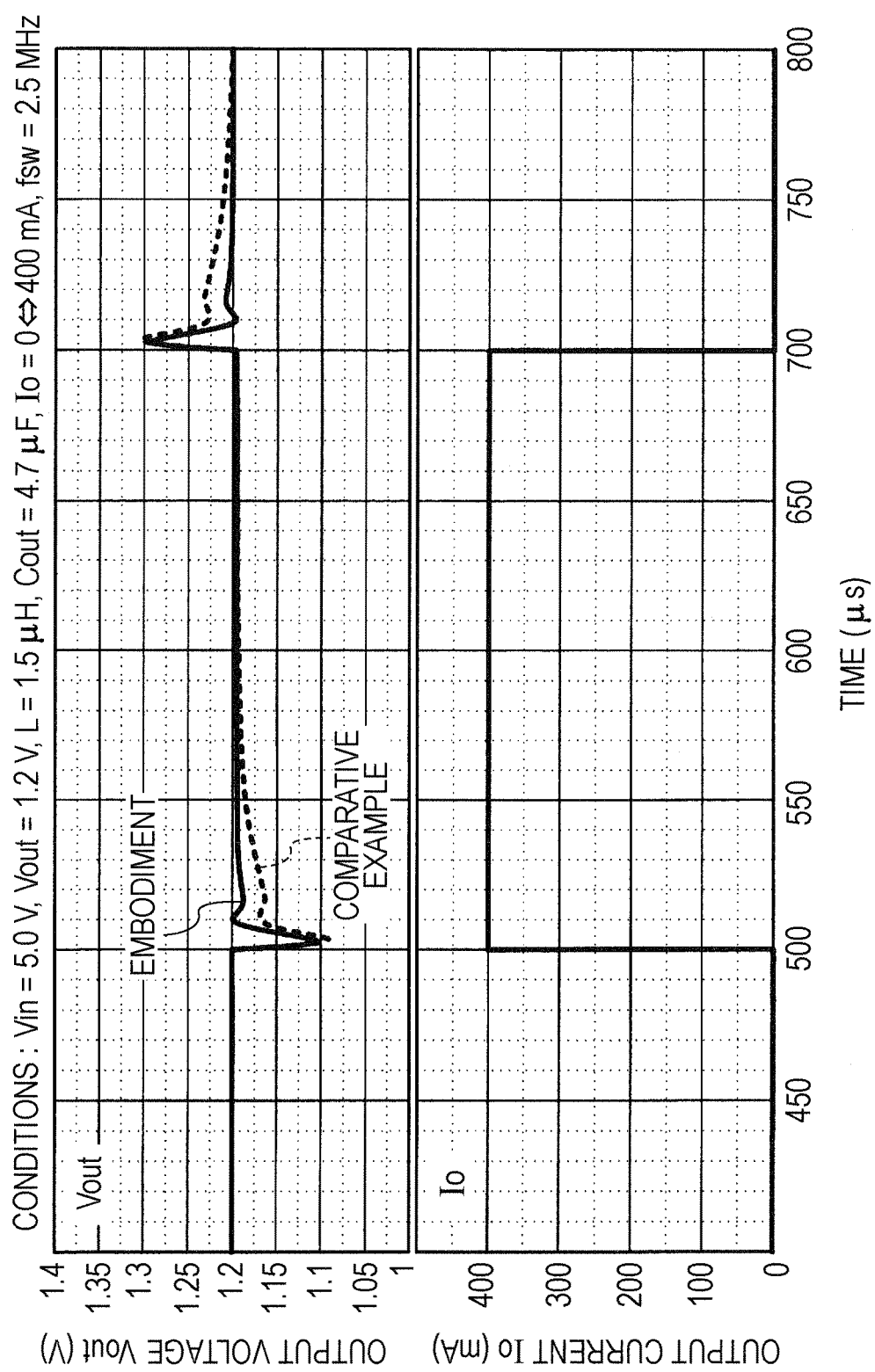
FIG. 51 illustrates characteristics when a load changes suddenly.

FIG. 51 illustrates characteristics when the load changes suddenly. In this case, the input voltage Vin is 5.0 V, the output voltage Vout is 1.2 V, the inductance L of the coil 13 is 1.5 μH, the capacitance Cout of the output capacitor 14 is 4.7 μF, and the switching frequency fsw is 2.5 MHz. In FIG. 51, the third configuration example of the step-down DC-DC converter illustrated in FIG. 48 is denoted as "Embodiment" and the second configuration example of the step-down DC-DC converter illustrated in FIG. 11 is denoted as "Comparative Example." As illustrated in FIG. 51, the output voltage Vout in the Embodiment recovers more quickly relative to a sudden change in the output current Io than the output voltage Vout in the Comparative Example. That is, controlling the timing of the rising of the timing control signal tm_cntl on the basis of a change in the output current Io may make it possible to improve the characteristics during sudden change of the load.

Figure 52:
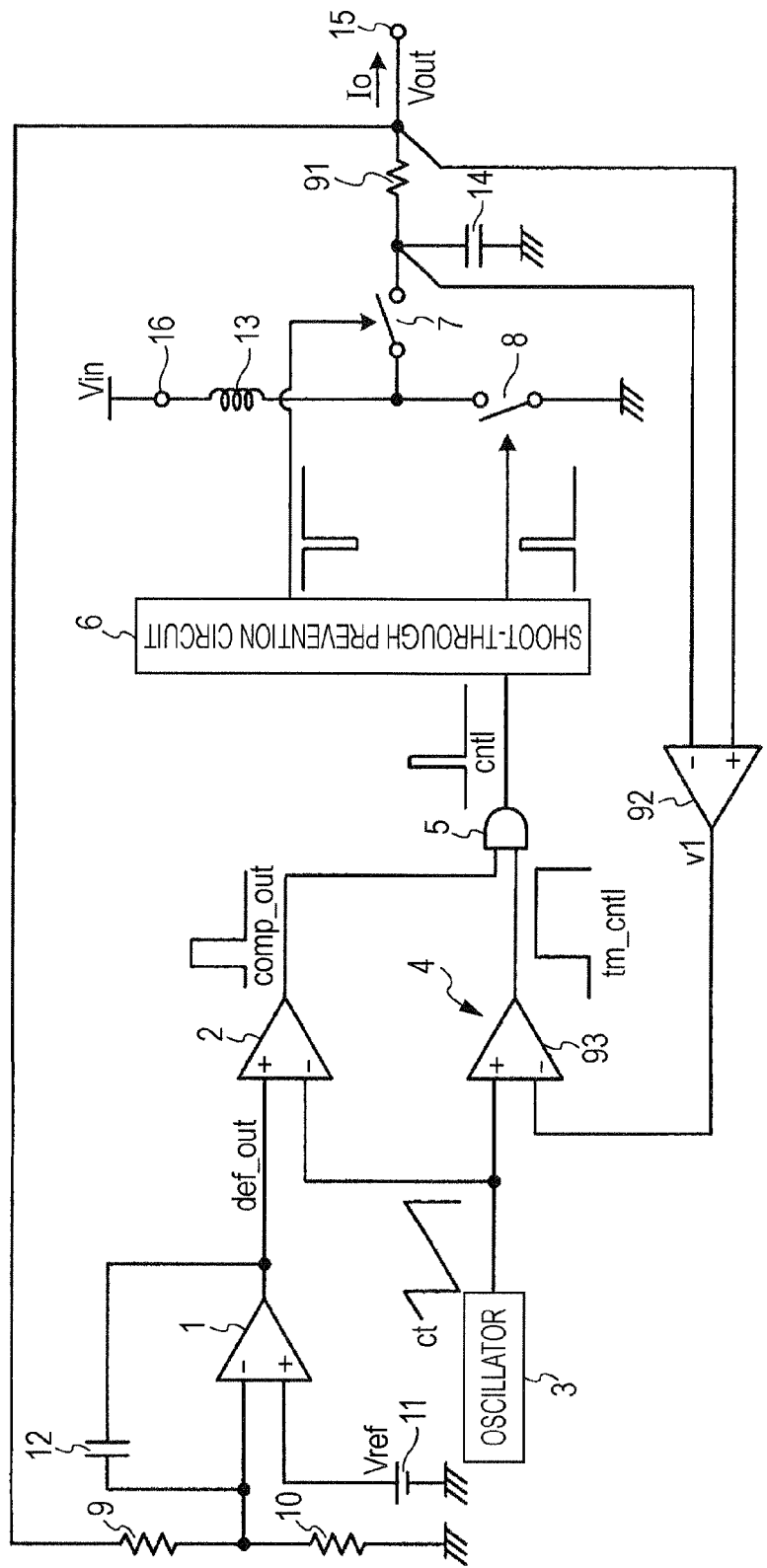
FIG. 52 illustrates a third example of the electronic apparatus including the step-up DC-DC converter according to the embodiment.

FIG. 52 illustrates a third example of the electronic apparatus including the step-up DC-DC converter according to the embodiment.

As illustrated in FIG. 52, in a step-up DC-DC converter 120 in the third configuration example, a second sense resistor 91 is coupled between the output terminal 15 and the node of the first switch 7 and the output capacitor 14. This first signal generator 4 includes a third differential amplifier 92 and a third comparator 93. An inverting input terminal of the third differential amplifier 92 is coupled to the node of the first switch 7 and the output capacitor 14. Other configurations of the second sense resistor 91, the third differential amplifier 92, and the third comparator 93 are analogous to those in the third configuration example of the above-described step-down DC-DC converter. Other configurations are also analogous to those of the second configuration example of the step-up DC-DC converter. An operation example of the third configuration example is also analogous to the operation example of the third configuration example of the step-down DC-DC converter.

Figure 53:
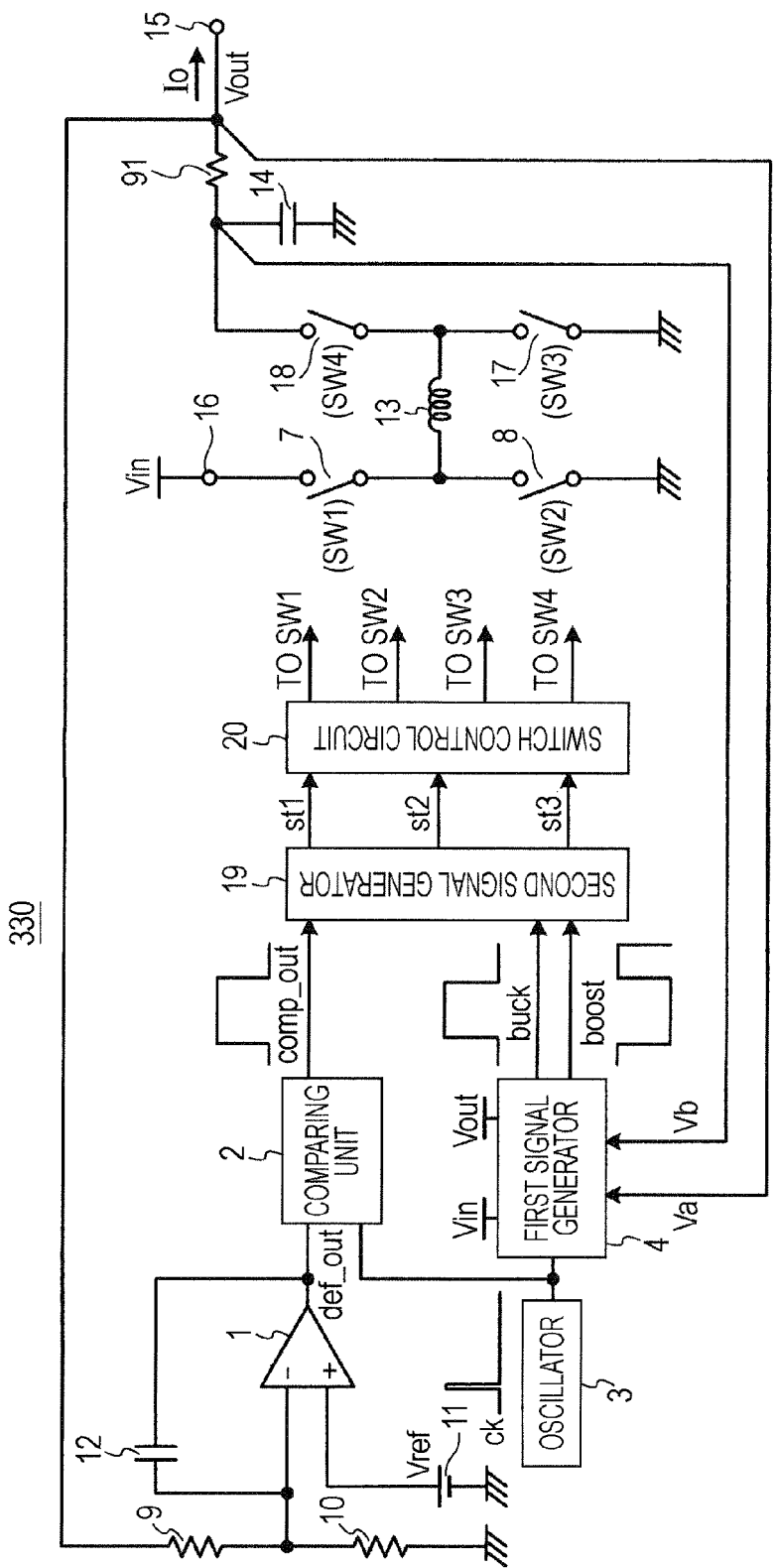
FIG. 53 illustrates a fourth example of the electronic apparatus including the step-up/step-down DC-DC converter according to the embodiment.

FIG. 53 illustrates a fourth example of the electronic apparatus including the step-up/step-down DC-DC converter according to the embodiment.

As illustrated in FIG. 53, in a step-up/step-down DC-DC converter 330 in a fourth configuration example, a second sense resistor 91 is coupled between the output terminal 15 and the node of the fourth switch 18 and the output capacitor 14. Voltages Va and Vb at two opposite ends of the second sense resistor 91 are supplied to the first signal generator 4. The second sense resistor 91 may be integrated into a single IC together with, for example, the first differential amplifier 1, the comparing unit 2, the oscillator 3, the first signal generator, 4, the second signal generator 19, and the switch control circuit 20, or may be externally attached to the IC. Other configurations are analogous to those of the second configuration example of the step-up/step-down DC-DC converter.

Figure 54:
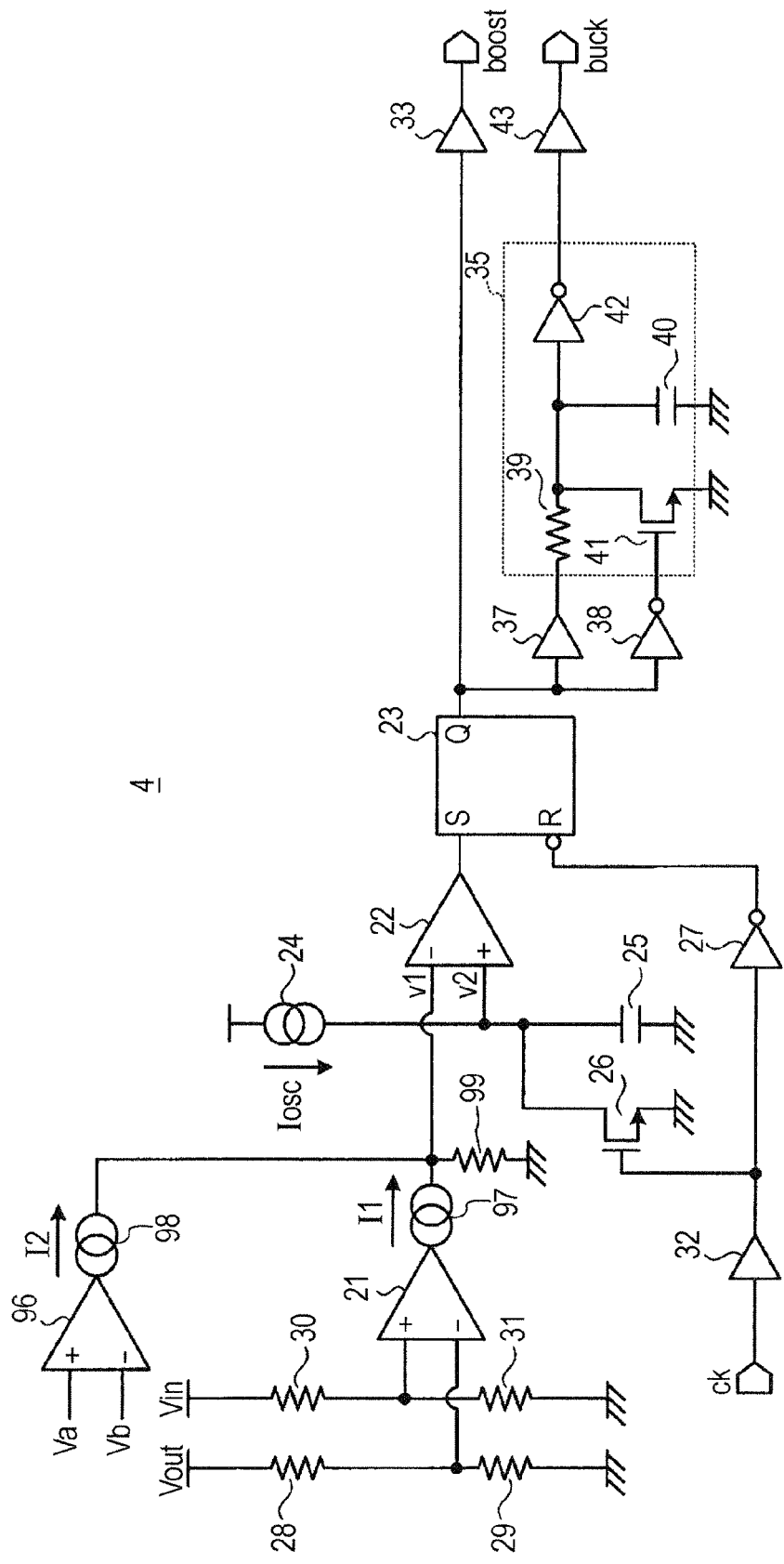
FIG. 54 illustrates an example of the first signal generator in the step-up/step-down DC-DC converter in FIG. 53.

FIG. 54 illustrates an example of the first signal generator in the step-up/step-down DC-DC converter in FIG. 53.

As illustrated in FIG. 54, this first signal generator 4 has a fourth differential amplifier 96, a second current source 97, a third current source 98, and a ninth resistor 99 in addition to the configuration illustrated in FIG. 34. The voltage Vb of one end of the second sense resistor 91, the end adjacent to the output capacitor 14, is supplied to an inverting input terminal of the fourth differential amplifier 96. The voltage Va of the other end of the second sense resistor 91, the other end being adjacent to the output terminal 15, is supplied to a non-inverting input terminal of the fourth differential amplifier 96. Thus, the fourth differential amplifier 96 outputs the difference between the voltages at two opposite ends of the second sense resistor 91. A third current source 98 is coupled between an output terminal of the fourth differential amplifier 96 and the inverting input terminal of the first comparator 22 and causes current I2 to flow in accordance with the output voltage of the fourth differential amplifier 96.

The second current source 97 is coupled between the output terminal of the second differential amplifier 21 and the inverting input terminal of the first comparator 22 and causes current I1 to flow in accordance with the output voltage of the second differential amplifier 21. One end of a ninth resistor 99 is coupled to the inverting input terminal of the first comparator 22. Another end of the ninth resistor 99 is coupled to ground. The current I1 and the current I2 merge together and flow through the ninth resistor 99. The ninth resistor 99 converts the current flowing through into a voltage, which is then supplied to the inverting input terminal of the first comparator 22. Other configurations are analogous to the configurations of the first signal generator 4 illustrated in FIG. 34.

Figure 55:
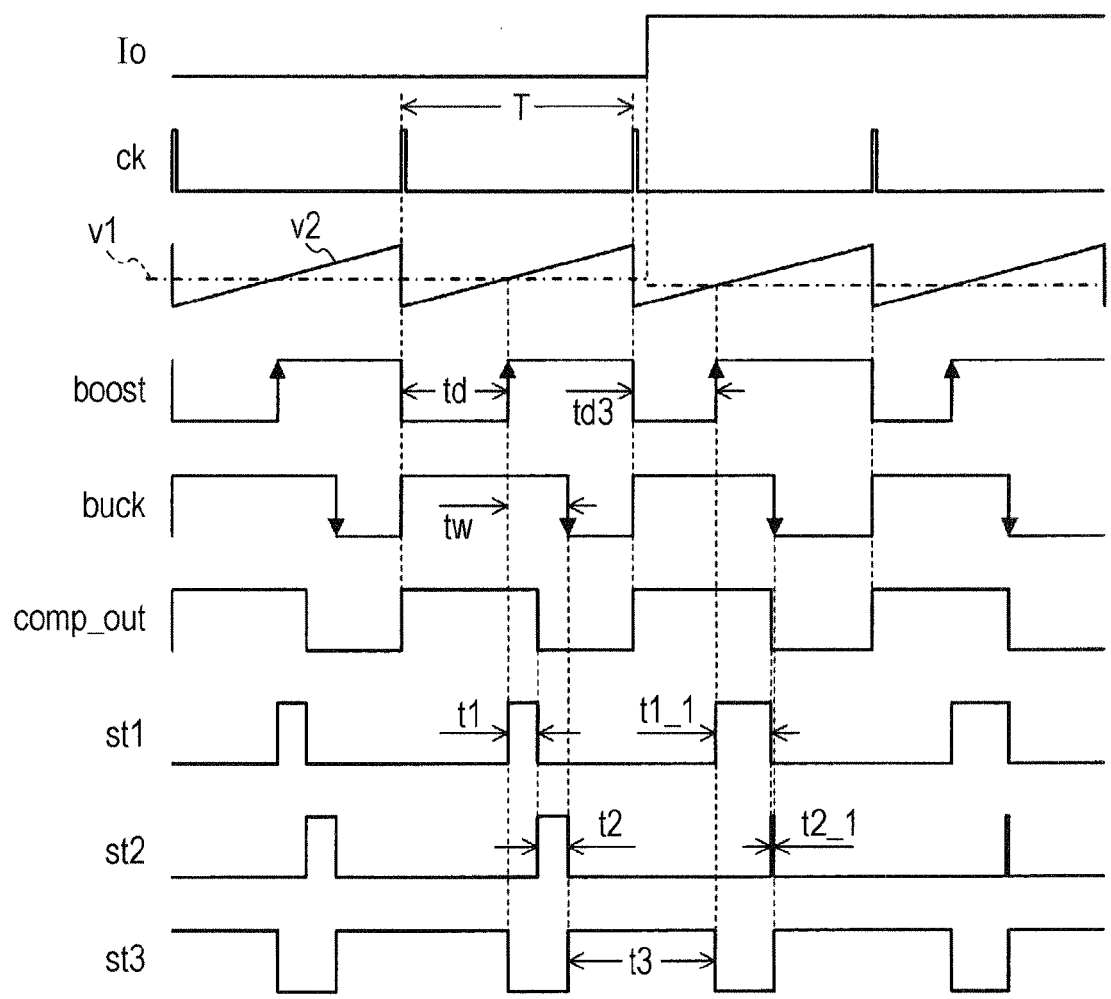
FIG. 55 illustrates operation timings of the step-up/step-down DC-DC converter in FIG. 53.

FIG. 55 illustrates operation timings of the step-up/step-down DC-DC converter of the fourth configuration example during change from light load to heavy load in a situation in which the input voltage Vin and the output voltage Vout are equal to each other. As illustrated in FIG. 55, when a load (not illustrated in FIG. 53) coupled to the output terminal 15 changes from light load to heavy load, the output current Io increases. Consequently, the difference between the voltages at two opposite ends of the second sense resistor 91 increases and the output voltage of the fourth differential amplifier 96 decreases. Since the current I2 decreases and the total amount of current flowing through the ninth resistor 99 decreases, the voltage v1 (indicated by a dashed-dotted line in FIG. 55) input to the inverting input terminal of the first comparator 22 decreases with an increase in the output current Io. Consequently, the period in which the voltage v2 input to the non-inverting input terminal of the first comparator 22 is lower than the voltage v1 decreases.

That is, the timing td at which the boost signal "boost" goes from low to high becomes earlier, and correspondingly, the timing at which the buck signal "buck" goes from high to low becomes earlier. In FIG. 55, the timing of the rising of the boost signal "boost" has shifted from td to td3 (td3<td). The ON period of the first state signal st1 is increased and the ON period of the second state signal st2 is reduced by amounts corresponding to the early timing of the rising of the boost signal "boost" and the early timing of the falling of the buck signal "buck". In FIG. 55, the ON period of the first state signal st1 has shifted from t1 to t1_1 (t1_1>t1) and the ON period of the second state signal st2 has shifted from t2 to t2_1 (t2_1 <t2). As a result, the coil 13 is charged with energy in a short period of time, and accordingly the characteristics during sudden change of the load improve.

Figure 56:
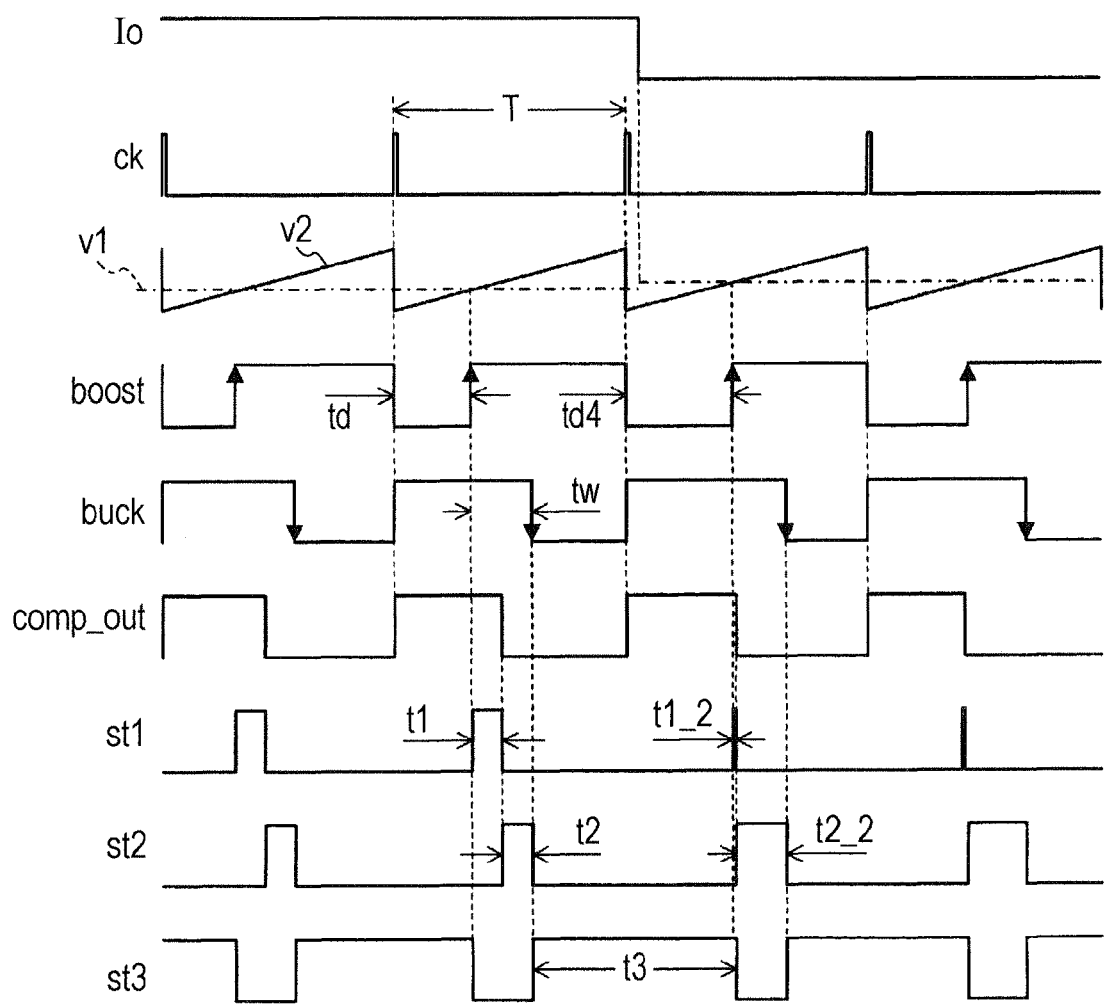
FIG. 56 illustrates operation timings of the step-up/step-down DC-DC converter in FIG. 53.

FIG. 56 illustrates operation timings of the step-up/step-down DC-DC converter of the fourth configuration example during change from heavy load to light load in a situation in which the input voltage Vin and the output voltage Vout are equal to each other. As illustrated in FIG. 56, when the load changes from heavy load to light load, the output current Io decreases. Consequently, the difference between the voltages at two opposite ends of the second sense resistor 91 decreases and the output voltage of the fourth differential amplifier 96 increases. Since the current I2 increases and the total amount of current flowing through the ninth resistor 99 increases, the voltage v1 (indicated by a dashed-dotted line in FIG. 56) input to the inverting input terminal of the first comparator 22 increases with a decrease in the output current Ia. Thus, the period in which the voltage v2 is lower than the voltage v1 increases, so that the timing of the rising of the boost signal "boost" and the timing of the falling of the buck signal "buck" are delayed. In FIG. 56, the timing of the rising of the boost signal "boost" has shifted from td to td4 (td4>td). The ON period of the first state signal st1 is reduced and the ON period of the second state signal st2 is increased by amounts corresponding to the delayed timings of the boost signal "boost" and the buck signal "buck". In FIG. 56, the ON period of the first state signal st1 has shifted from t1 to t1_2 (t1_2<t1) and the ON period of the second state signal st2 has shifted from t2 to t2_2 (t2_2>t2). As a result, the energy in the coil 13 is discharged in a short period of time, and thus the characteristics during sudden change of the load improve. The similar applies to a case in which the load changes suddenly in a situation in which the input voltage Vin and the output voltage Vout are different from each other.

According to the embodiment, it may be possible to increase the switching frequency fsw and to increase the range of the input voltage Vin. Thus, application of the configuration of the embodiment to a DC-DC converter built into, for example, a mobile device may make it possible to increase the operating time of the mobile device. Furthermore, since ripple in the output voltage Vout is reduced, it may be possible to reduce the sizes of the externally attached components, such as the coil 13 and the output capacitor 14.

The differential amplifier and the differential output signal may be replaced with an error amplifier and an error output signal, respectively. The configurations of the DC-DC converter, the first signal generator, and the second signal generator are not limited to the examples described above. The expressions noted in the embodiment are idealized expressions and may be slightly different from expressions when actual loss and so on are taken into account.

The configuration in the above embodiment has the comparing unit, the first signal generator, and the second signal generator by way of example. The comparing unit outputs a comparison result after a given time passes from first timing of a first periodic signal having a given cycle, the comparison result being obtained by comparing a difference between an output voltage and a reference voltage with the first periodic signal. The first signal generator outputs a timing control signal that is at a first level before the given time passes from the first timing and that changes from the first level to a second level in a period in which the comparing unit outputs the comparison result after the given time passes. The second signal generator generates a control signal for controlling the output voltage in accordance with the comparison result and the timing control signal.

The comparing unit, the first signal generator, and the second signal generator may have the following configuration. The comparing unit outputs a comparison result obtained by comparing a difference between an output voltage and a reference voltage with a first periodic signal having a given cycle. The first signal generator outputs a timing control signal. In a mode in which an input voltage is higher than the output voltage, the timing control signal changes from a first level to a second level in a period in which the comparison result is at a third level, and then changes to the first level. In a mode in which the input voltage is substantially equal to the output voltage, the timing control signal changes from the first level to the second level when the comparison result is at a fourth level and changes from the second level to the first level in a period in which the comparison result is at the third level after changing from the fourth level to the third level. In a mode in which the input voltage is lower than the output voltage, the timing control signal changes from the first level to the second level and then changes to the first level in a period in which the comparison result is at the fourth level. The second signal generator generates control signals for controlling the output voltage in accordance with the comparison result and the timing control signal. For example, a period from first timing at which the timing control signal changes from the first level to the second level to fourth timing at which the comparison result changes from the fourth level to the third level is referred to as a "first state." A period from the forth timing to second timing at which the timing control signal changes from the second level to the first level is referred to as a "second state." A period from third timing at which the comparison result changes from the third level to the fourth level to the first timing and a period from the second timing to the third timing are referred to as a "third state", The second signal generator may output, as the control signals, a first state signal, a second state signal, and a third state signal for preferentially and exclusively switching the first state, the third state, and the second state in that order.

The embodiment described above provides the output-voltage control device, the output-voltage control method, and the electronic apparatus that are capable of increasing the range of the input voltage that allows for control of the output voltage. The embodiment described above also provides the output-voltage control device, the output-voltage control method, and the electronic apparatus that are capable of increasing the switching frequency. The embodiment also provides the output-voltage control device, the output-voltage control method, and the electronic apparatus that are capable of suppressing or preventing fluctuations in the output voltage during mode switching. In addition, the embodiment described above provides the output-voltage control device, the output-voltage control method, and the electronic apparatus that are capable of suppressing or preventing a decrease in the operating efficiency.

According to the embodiment described above, since the comparison result output from the comparing unit is partly masked by the timing control signal, the output time of the control signal becomes shorter than the output time of the comparison result. That is, switching control is performed in a smaller amount of time than the response time of a current-controlling element, such as the comparator.

Thus, according to the embodiment described above, the range of the input voltage that allows for control of the output voltage is increased. The embodiment also provides an advantage in that the switching frequency may be increased. The embodiment further offers an advantage in that fluctuations in the output voltage during mode switching may be suppressed or prevented. The embodiment further has an advantage in that a decrease in the operating efficiency may be suppressed or prevented.

It is noted that embodiment numbers (first, second or third etc.) do not show priorities of the embodiments. Many variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An output-voltage control device, comprising:
   a comparator which generates a comparison result after a given time passes from first timing of a first periodic signal, the comparison result being obtained by comparing a difference between an output voltage and a reference voltage with the first periodic signal;
   a first signal generator which generates a timing control signal which is at a first level before the given time passes from the first timing, and which changes from the first level to a second level in a period in which the comparator outputs the comparison result after the given time passes; and
   a second signal generator which generates a control signal for controlling the output voltage in accordance with the comparison result and the timing control signal,
   wherein the first signal generator generates a comparison signal by adjusting a timing at which the timing control signal changes between the first level and the second level in accordance with an input voltage and one of the output voltage and the reference voltage.

2. The output-voltage control device according to claim 1, wherein the second signal generator includes a logic circuit that receives the comparison result and the timing control signal.

3. The output-voltage control device according to claim 1, wherein the first signal generator compares a difference between the input voltage and the output voltage with one of the first periodic signal and a second periodic signal having a substantially similar cycle as the first periodic signal, and in accordance with a timing at which a large/small relationship between the difference and the one of the first periodic signal and the second periodic signal is reversed, the first signal generator adjusts the timing at which the timing control signal changes between the first level and the second level.

4. The output-voltage control device according to claim 1, wherein the first signal generator compares a difference between an input voltage and the reference voltage with one of the first periodic signal and a second periodic signal having a substantially similar cycle as the first periodic signal, and in accordance with a timing at which a large/small relationship between the difference and the one of the first periodic signal and the second periodic signal is reversed, the first signal generator adjusts timing at which the timing control signal changes between the first level and the second level.

5. An output-voltage control device comprising:
   a comparator which generates a comparison result obtained by comparing a difference between an output voltage and a reference voltage with a first periodic signal;
   a first signal generator which generates a timing control signal, wherein in a mode in which an input voltage is higher than the output voltage, the timing control signal changes from a first level to a second level in a period in which the comparison result is at a third level and then changes to the first level, in a mode in which the input voltage is substantially equal to the output voltage, the timing control signal changes from the first level to the second level when the comparison result is at a fourth level and changes from the second level to the first level in a period in which the comparison result is at the third level after changing from the fourth level to the third level, and in a mode in which the input voltage is lower than the output voltage, the timing control signal changes from the first level to the second level and then changes to the first level in a period in which the comparison result is at the fourth level; and
   a second signal generator which generates control signals for controlling the output voltage in accordance with the comparison result and the timing control signal.

6. The output-voltage control device according to claim 5, wherein the first signal generator: generates a first comparison signal by adjusting, in accordance with the input voltage and the output voltage, the timing at which the timing control signal changes between the first level and the second level; generates a second comparison signal having a time difference relative to the first comparison signal; and generates the timing control signal in accordance with the first comparison signal and the second comparison signal.

7. The output-voltage control device according to claim 5, wherein the first signal generator: generates a first comparison signal by adjusting, in accordance with the input voltage and the reference voltage, the timing at which the timing control signal changes between the first level and the second level; generates a second comparison signal having a time difference relative to the first comparison signal; and generates the timing control signal in accordance with the first comparison signal and the second comparison signal.

8. The output-voltage control device according to claim 5, wherein the second signal generator outputs, as the control signals, a first state signal, a second state signal, and a third state signal for preferentially and exclusively switching a first state, a third state, and a second state in which order, wherein the first state is in a period from first timing, at which the timing control signal changes from the first level to the second level, to fourth timing, at which the comparison result changes from the fourth level to the third level, the second state is in a period from the forth timing to second timing, at which the timing control signal changes from the second level to the first level, and the third state is in a period from third timing, at which the comparison result changes from the third level to the fourth level, to the first timing and in a period from the second timing to the third timing.

9. The output-voltage control device according to claim 5, wherein the first periodic signal comprises a current detection signal obtained by detecting current flowing through a coil electrically coupled to the output-voltage control device.

10. An output-voltage control method, comprising:
    generating a comparison result by comparing a difference between an output voltage and a reference voltage with a first periodic signal, the comparison result being generated after a given time passes from first timing of the first periodic signal;
    generating a timing control signal which is at a first level before the given time passes from the first timing and which changes from the first level to a second level in a period in which the comparison result is output after the given time passes;
    generating a control signal for controlling the output voltage in accordance with the comparison result and the timing control signal: and
    adjusting a timing at which the timing control signal changes between the first level and the second level in accordance with an input voltage and one of the output voltage and the reference voltage.

11. An output-voltage control method comprising:
    generating a comparison result by comparing a difference between an output voltage and a reference voltage with a first periodic signal;
    generating a timing control signal, wherein in a mode in which an input voltage is higher than the output voltage, the timing control signal changes from a first level to a second level in a period in which the comparison result is at a third level and then changes to the first level, in a mode in which the input voltage is substantially equal to the output voltage, the timing control signal changes from the first level to the second level when the comparison result is at a fourth level and changes from the second level to the first level in a period in which the comparison result is at the third level after changing from the fourth level to the third level, and in a mode in which the input voltage is lower than the output voltage, the timing control signal changes from the first level to the second level and then changes to the first level in a period in which the comparison result is at the fourth level; and
    generating control signals for controlling the output voltage in accordance with the comparison result and the timing control signal.

12. The output-voltage control method according to claim 11, wherein a first state signal, a second state signal, and a third state signal for preferentially and exclusively switching a first state, a third state, and a second state in which order are generated as the control signals, wherein the first state is in a period from first timing, at which the timing control signal changes from the first level to the second level, to fourth timing, at which the comparison result changes from the fourth level to the third level, the second state is in a period from the forth timing to second timing, at which the timing control signal changes from the second level to the first level, and the third state is in a period from third timing, at which the comparison result changes from the third level to the fourth level, to the first timing and in a period from the second timing to the third timing.

13. An electronic apparatus, comprising:
an output-voltage control device including:
a comparator which generates a comparison result after a given time passes from first timing of a first periodic signal, the comparison result being obtained by comparing a difference between an output voltage and a reference voltage with the first periodic signal, a first signal generator which generates a timing control signal which is at a first level before the given time passes from the first timing and which changes from the first level to a second level in a period in which the comparator outputs the comparison result after the given time passes, and a second signal generator which generates a control signal for controlling the output voltage in accordance with the comparison result and the timing control signal, the first signal generator generating a comparison signal by adjusting a timing at which the timing control signal changes between the first level and the second level in accordance with an input voltage and one of the output voltage and the reference voltage; and
a coil which is electrically coupled to the output-voltage control device.

14. The electronic apparatus according to claim 13, wherein the first signal generator adjusts timing at which the timing control signal changes between the first level and the second level, in accordance with current flowing from an output terminal of the electronic apparatus to a load coupled to the output terminal.

15. The electronic apparatus according to claim 13, wherein the first signal generator compares a difference between an input voltage and the output voltage with one of the first periodic signal and a second periodic signal having a substantially similar cycle as the first periodic signal, and in accordance with a timing at which a large/small relationship between the difference and the one of the first periodic signal and the second periodic signal is reversed, the first signal generator adjusts timing at which the timing control signal changes between the first level and the second level.

16. The electronic apparatus according to claim 13, wherein the first signal generator compares a difference between an input voltage and the reference voltage with one of the first periodic signal and a second periodic signal having a substantially similar cycle as the first periodic signal, and in accordance with a timing at which a large/small relationship between the difference and the one of the first periodic signal and the second periodic signal is reversed, the first signal generator adjusts timing at which the timing control signal changes between the first level and the second level.

17. An electronic apparatus comprising:
an output-voltage control device including a comparator which generates a comparison result obtained by comparing a difference between an output voltage and a reference voltage with a first periodic signal, a first signal generator which generates a timing control signal, wherein in a mode in which an input voltage is higher than the output voltage, the timing control signal changes from a first level to a second level in a period in which the comparison result is at a third level and then changes to the first level, in a mode in which the input voltage is substantially equal to the output voltage, the timing control signal changes from the first level to the second level when the comparison result is at a fourth level and changes from the second level to the first level in a period in which the comparison result is at the third level after changing from the fourth level to the third level, and in a mode in which the input voltage is lower than the output voltage, the timing control signal changes from the first level to the second level and then changes to the first level in a period in which the comparison result is at the fourth level, and a second signal generator which generates control signals for controlling the output voltage in accordance with the comparison result and the timing control signal; and a coil which is electrically coupled to the output-voltage control device.

18. The electronic apparatus according to claim 17, wherein the first signal generator: generates a first comparison signal by adjusting, in accordance with the input voltage and the output voltage, the timing at which the timing control signal changes between the first level and the second level; generates a second comparison signal having a time difference relative to the first comparison signal; and generates the timing control signal in accordance with the first comparison signal and the second comparison signal.

19. The electronic apparatus according to claim 17, wherein the first signal generator: generates a first comparison signal by adjusting, in accordance with the input voltage and the reference voltage, the timing at which the timing control signal changes between the first level and the second level; generates a second comparison signal having a time difference relative to the first comparison signal; and generates the timing control signal in accordance with the first comparison signal and the second comparison signal.

20. The electronic apparatus according to claim 17, wherein the second signal generator outputs, as the control signals, a first state signal, a second state signal, and a third state signal for preferentially and exclusively switching a first state, a third state, and a second state in which order, wherein the first state is in a period from first timing, at which the timing control signal changes from the first level to the second level, to fourth timing, at which the comparison result changes from the fourth level to the third level, the second state is in a period from the forth timing to second timing, at which the timing control signal changes from the second level to the first level, and the third state is in a period from third timing, at which the comparison result changes from the third level to the fourth level, to the first timing and in a period from the second timing to the third timing.

* * * * *